United States Patent
Grip et al.

(10) Patent No.: US 10,315,756 B2
(45) Date of Patent: Jun. 11, 2019

(54) EMERGENCY LANDING STABILITY SYSTEM FOR AIRCRAFT

(71) Applicant: The Boeing Company, Chicago, IL (US)

(72) Inventors: Robert E. Grip, Rancho Palos Verdes, CA (US); Steven R. Kent, Downey, CA (US); Ted K. Rothaupt, Lancaster, CA (US); Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 15/132,930

(22) Filed: Apr. 19, 2016

(65) Prior Publication Data
US 2017/0297682 A1   Oct. 19, 2017

(51) Int. Cl.
*B64C 25/32* (2006.01)
*B64C 25/52* (2006.01)
*B64C 7/00* (2006.01)
*B64C 25/30* (2006.01)
*B64C 1/00* (2006.01)

(52) U.S. Cl.
CPC ............. *B64C 25/32* (2013.01); *B64C 7/00* (2013.01); *B64C 25/30* (2013.01); *B64C 25/52* (2013.01); *B64C 2001/0045* (2013.01); *Y02T 50/12* (2013.01)

(58) Field of Classification Search
CPC .. B64F 1/02; B64F 1/007; B64F 1/125; B64C 25/52; B64C 25/68; B64C 25/32; B64C 7/00
See application file for complete search history.

(56) References Cited

U.S. PATENT DOCUMENTS

| | | | | |
|---|---|---|---|---|
| 2,403,754 A | * | 7/1946 | Pierson | B64C 35/002 244/106 |
| 6,290,174 B1 | * | 9/2001 | Gioia | B64C 35/002 244/105 |
| 6,592,073 B1 | * | 7/2003 | Meekins | B64C 11/001 244/105 |
| 7,252,264 B2 | * | 8/2007 | Nattinger | B63H 9/0607 114/39.21 |
| 8,177,162 B2 | * | 5/2012 | Karkow | B64C 35/001 244/105 |

* cited by examiner

*Primary Examiner* — Justin M Benedik
(74) *Attorney, Agent, or Firm* — Walters & Wasylyna LLC

(57) ABSTRACT

An aircraft emergency landing stability system includes an aircraft a fuselage and landing gear, and a landing stability apparatus coupled to the fuselage, wherein the landing stability structure mitigates a nose-down pitching moment of the aircraft created in response to contact with a landing surface during an emergency landing.

23 Claims, 38 Drawing Sheets

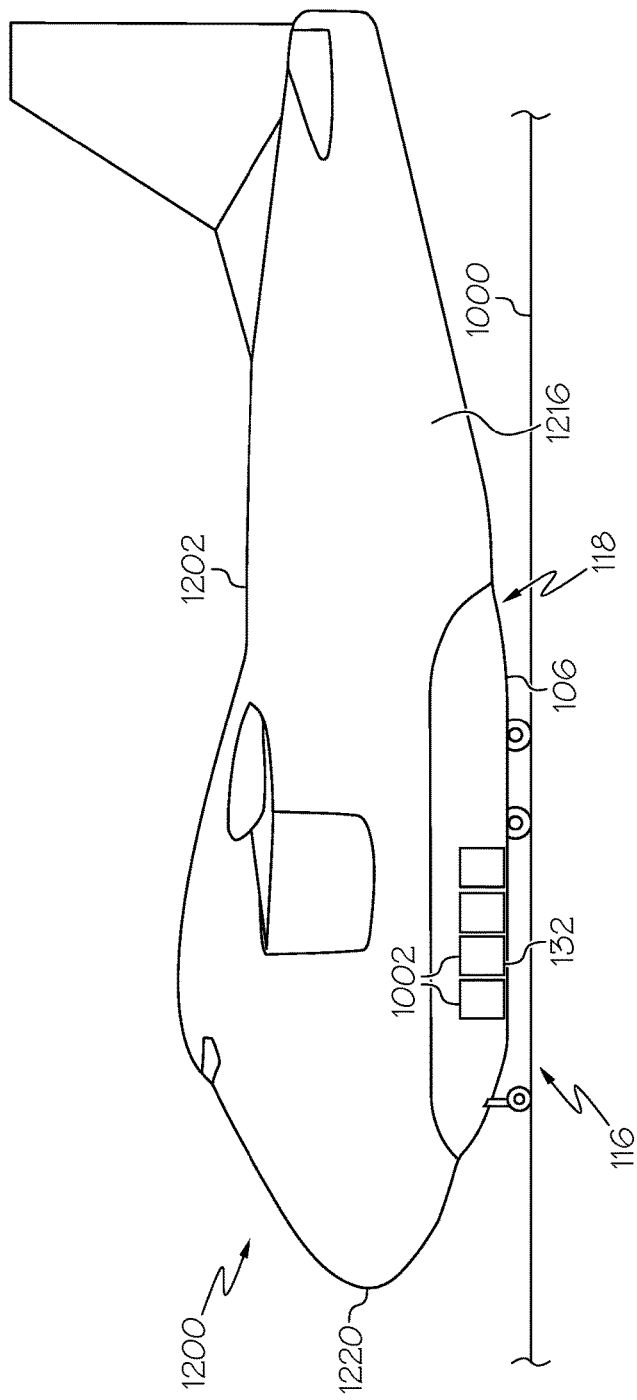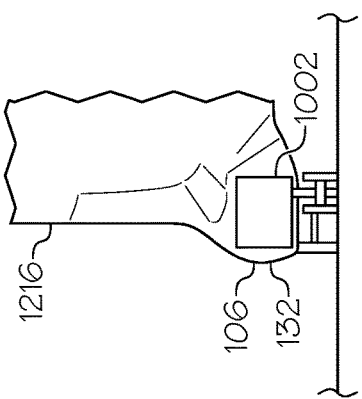

EMERGENCY LANDING STABILITY SYSTEM FOR AIRCRAFT

FIELD

The present disclosure is generally related to aircrafts and, more particularly, to an aircraft emergency landing stability system to mitigate a nose-down pitching moment created during an emergency landing.

BACKGROUND

As illustrated in FIG. 1, for a variety of reasons an aircraft 1300 may be forced to make an emergency landing. During the emergency landing, the aircraft 1300 typically approaches a landing surface 1000 at an angle of attack $A_A$ of between approximately 10-degrees and approximately 12-degrees.

When the aircraft 1300 makes contact (e.g., impacts) the landing surface 1000 (e.g., at the angle of attack $A_A$), the area (e.g., a contact surface) of the aircraft 1300 that makes initial contact with the landing surface 1000 (e.g., an initial contact surface 1302) is typically a distance $D_1$ aft (rearward) of a center of gravity CG of the aircraft 1300. Shortly after impact (e.g., as the aircraft 1300 begins to slow), the surface of the aircraft 1300 in primary contact with the landing surface 1000 may move forward, but still remains aft of the center of gravity CG. For example, the contact surface that makes secondary contact with the landing surface 1000 (e.g., a secondary contact surface 1304) is typically located a distance $D_2$ aft of a center of gravity CG of the aircraft 1300.

Upon contact with the landing surface 1000 (e.g., by the initial contact surface 1302 and then by the secondary contact surface 1304), a reaction force $F_R$ (having horizontal and vertical components) results from contact with the landing surface 1000 acting through the contact surface of the aircraft 1300 and an inertial force $F_I$ (having opposite horizontal and vertical components) results from the inertia of the aircraft 1300 acting through the center of gravity CG. At impact, the distance $D_1$ between the inertial force $F_I$ and the reaction force $F_R$ tends to create a nose-down pitching moment $M_1$. As the emergency landing continues, the distance $D_2$ between the inertial force $F_I$ and the reaction force $F_R$ tends to continue this nose-down pitching moment $M_1$. This nose-down pitching moment $M_1$ may cause the aircraft 1300 rotate in a forward direction and drive a nose of the aircraft 1300 into the landing surface 1000.

During a ground forced landing (a gear-up or belly landing on the ground), the nose-down rotation of the aircraft 1300 may damage the aircraft 1300 and/or injure the pilot and flight crew, as the nose crashes into the ground. During a water ditching landing (a forced landing on water), this nose-down rotation may cause the aircraft 1300 to completely flip over, as the nose plows into the water, and bring the aircraft 1300 to rest in an inverted (upside down) position in the water. In this scenario, in addition to damaging the aircraft 1300, the pilot and flight crew may become trapped within the inverted, and submerged, aircraft 1300.

Accordingly, those skilled in the art continue with research and development efforts in the field of aircraft emergency landings.

SUMMARY

In one example, the disclosed aircraft emergency landing stability system includes an aircraft a fuselage and landing gear, and a landing stability apparatus coupled to the fuselage, wherein the landing stability structure mitigates a nose-down pitching moment of the aircraft created in response to contact with a landing surface during an emergency landing.

In another example, the disclosed aircraft emergency landing stability system includes an aircraft including a fuselage and landing gear, and a pair of sponsons projecting downwardly and outwardly from a fuselage-underside surface of the fuselage, wherein the pair of sponsons locates a secondary contact surface of the aircraft forward of a center of gravity of the aircraft to mitigate a nose-down pitching moment of the aircraft created in response to contact with a landing surface during an emergency landing.

In another example, the disclosed aircraft emergency landing stability system includes an aircraft including a fuselage and landing gear, and a blister projecting downwardly from a fuselage-underside surface of the fuselage proximate to a nose of the fuselage, wherein the blister locates a secondary contact surface of the aircraft forward of a center of gravity of the aircraft to mitigate a nose-down pitching moment of the aircraft created in response to contact with a landing surface during an emergency landing.

In another example, the disclosed aircraft emergency landing stability system includes an aircraft including a fuselage and landing gear, and at least one skid deployable from a fuselage-underside surface of the fuselage, wherein the skid locates a secondary contact surface of the aircraft forward of a center of gravity of the aircraft to mitigate a nose-down pitching moment of the aircraft created in response to contact with a landing surface during an emergency landing.

In another example, the disclosed aircraft emergency landing stability system includes an aircraft including a fuselage and landing gear, and at least one ski deployable from a fuselage-underside surface of the fuselage, wherein the ski locates a secondary contact surface of the aircraft forward of a center of gravity of the aircraft to mitigate a nose-down pitching moment of the aircraft created in response to contact with a landing surface during an emergency landing.

In yet another example, the disclosed aircraft emergency landing stability system includes an aircraft including a fuselage and landing gear, and a drag device deployable from the fuselage aft of the center of gravity of the aircraft, wherein the drag device produces hydrodynamic drag sufficient to create a nose-up pitching moment to mitigate a nose-down pitching moment of the aircraft created in response to contact with a landing surface during an emergency landing.

Other examples of the disclosed system and apparatus will become apparent from the following detailed description, the accompanying drawings and the appended claims.

BRIEF DESCRIPTION OF THE DRAWINGS

FIG. 23 is a schematic side elevation view of another example of the disclosed landing stability apparatus;

FIG. 24 is a partial schematic front view of the landing stability apparatus of FIG. 23;

DETAILED DESCRIPTION

Figure 1:
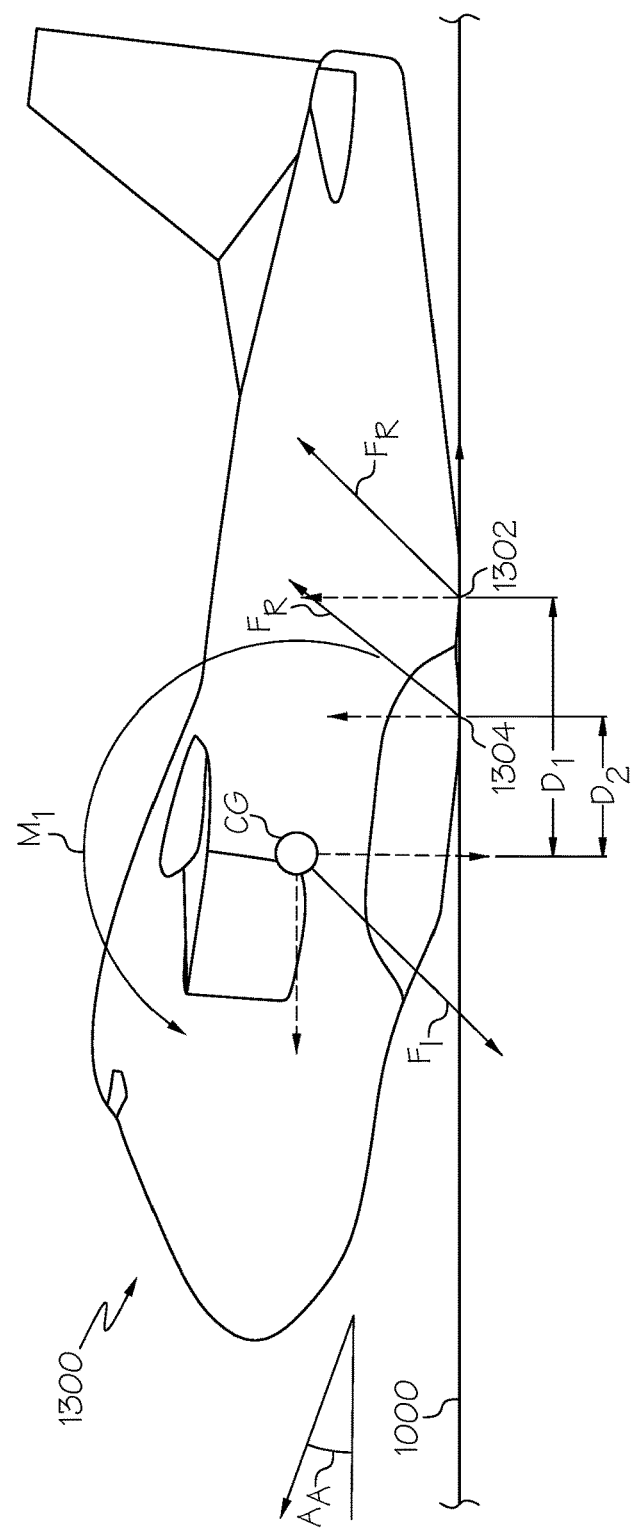
FIG. 1 is a schematic illustration of one example of an aircraft making an emergency landing.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Figure 3:
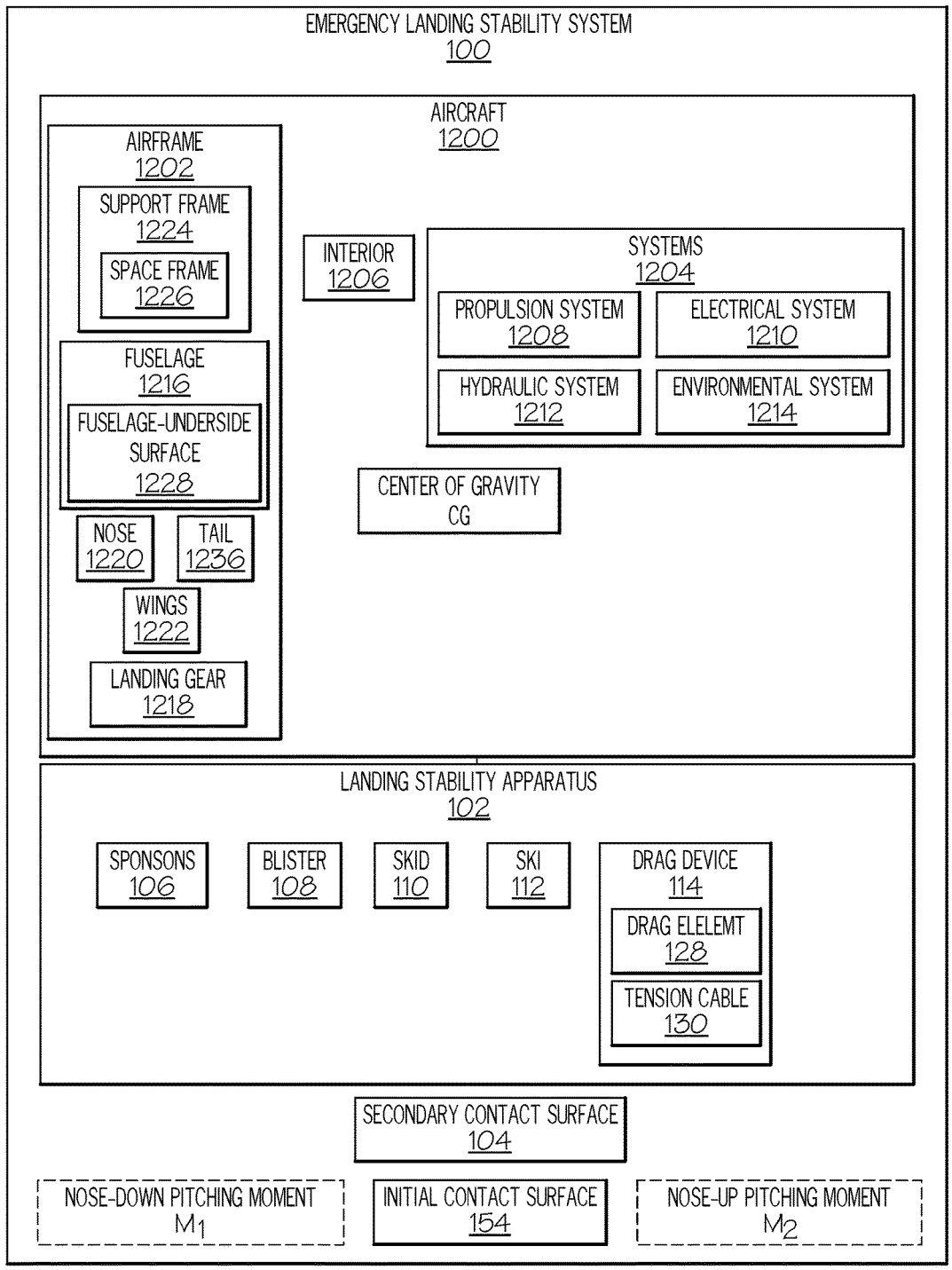
FIG. 3 is a schematic block diagram of one example of the disclosed emergency landing stability system for an aircraft.

In FIG. 3, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 3 may be combined in various ways without the need to include other features described in FIG. 3, other drawing figures, and/or the accompanying disclosure, even though such combination or combinations are not explicitly illustrated herein. Similarly, additional features not limited to the examples presented, may be combined with some or all of the features shown and described herein.

Figure 2:
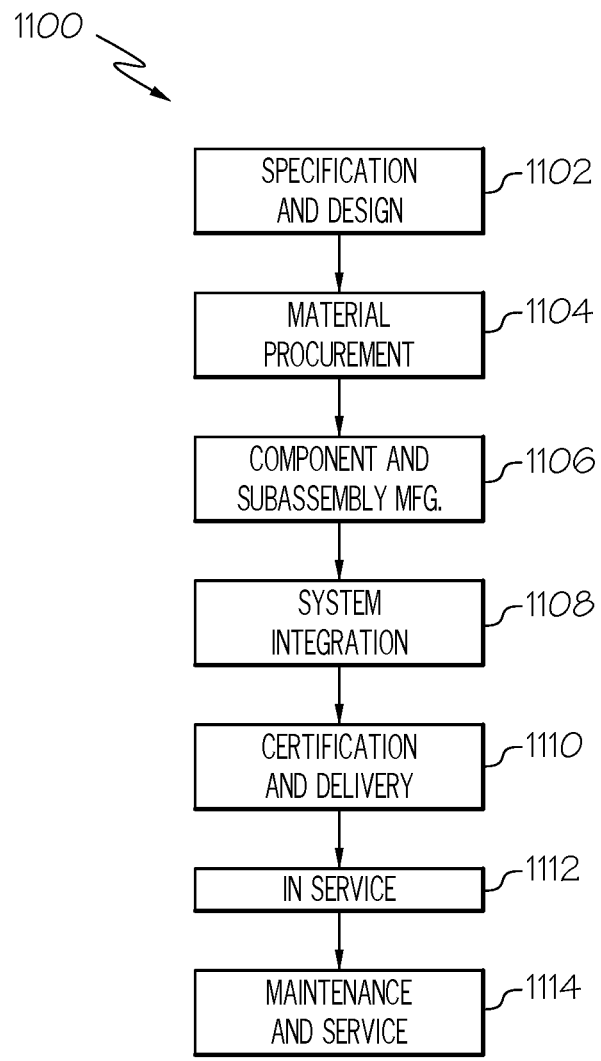
FIG. 2 is a flow diagram of one example of an aircraft production and service methodology.

In FIG. 2, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 2 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Referring to FIGS. 2 and 3, examples of an emergency landing stability system 100 disclosed herein may be described in the context of an aircraft manufacturing and service method 1100 as shown in FIG. 2, and an aircraft 1200 as shown in FIG. 3.

Referring to FIG. 2, during pre-production, the illustrative method 1100 may include specification and design, as shown at block 1102, of the aircraft 1200, which may include design of the emergency landing stability system 100, and material procurement, as shown at block 1104. During production, component and subassembly manufacturing, as shown at block 1106, and system integration, as shown at block 1108, of the aircraft 1200 may take place. Integration or application of the emergency landing stability system 100 described herein may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of aircraft 1200. The emergency landing stability system 100 may be maintained as a portion of routine maintenance and service (block 1114).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Referring to FIG. 3, the aircraft 1200 produced by illustrative method 1100 include an airframe 1202, a plurality of high-level systems 1204 and an interior 1206. Examples of the high-level systems 1204 may include one or more of a propulsion system 1208, an electrical system 1210, a hydraulic system 1212 and an environmental system 1214. Any number of other systems (not explicitly illustrated) may also be included.

The system and apparatus shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the system and apparatus disclosed herein may be utilized during production stages (blocks 1108 and 1110). Similarly, one or more examples of the system and apparatus may be utilized, for example and without limitation, while aircraft 1200 is in service (block 1112) and during maintenance and service stage (block 1114).

Referring to FIG. 3, one example of the emergency landing stability system 100 for aircraft 1200 is disclosed. The emergency landing stability system 100 includes the aircraft 1200 including a fuselage 1216 and landing gear 1218. The emergency landing stability system 100 also includes a landing stability apparatus 102 coupled to the fuselage 1216. The landing stability apparatus 102 mitigates a nose-down pitching moment $M_1$ of the aircraft 1200 created in response to contact with a landing surface 1000 during an emergency landing.

Throughout the present disclosure, the disclosed landing stability apparatus 102 may also be referred to as a landing stability structure. The landing stability apparatus 102 (landing stability structure) may be rigidly connected (e.g., structurally) to the aircraft 1200, deployed from the aircraft 1200, or a combination thereof.

As used herein, the term emergency landing refers to any landing made by the aircraft 1200 in response to a technical problem and/or system failure. The emergency landing in which the landing surface 1000 is the ground may be referred to as a forced ground landing. The emergency landing in which the landing surface 1000 is water may be referred to as a ditching water landing. The forced landing may include a gear-up or belly landing in which the aircraft 1200 lands without the landing gear 1218 fully extended and uses its underside (or belly) as its primary landing device.

Certain embodiments of the disclosed landing stability apparatus 102 may be particularly advantageous where the landing surface 1000 is water. Certain embodiments of the disclosed landing stability apparatus 102 may be particularly advantageous where the landing surface 1000 is the ground. Certain embodiments of the disclosed landing stability apparatus 102 may be particularly advantageous where the landing surface 1000 is water or the ground.

Generally, in an emergency landing situation (e.g., during either a gear-up forced ground landing or a water ditching landing), the aircraft 1200 is in a controlled flight and will have a nose-high attitude (e.g., at an angle of attack $A_A$). Therefore, initial contact of the aircraft 1200, for example, by an initial contact surface 154, with the landing surface 1000 (e.g., the ground or water) will be aft (e.g., behind) a center of gravity CG of the aircraft 1200. As the aircraft 1200 settles, the aircraft 1200 will start to affect a nose-down rotation and a secondary contact surface 104 will come in contact with the landing surface 1000.

As an example, during the emergency landing, particularly, during a ditching water landing, if the magnitude of the drag force (e.g., the horizontal component of the reaction force $F_R$) and forward momentum (e.g., the horizontal component of the inertial force $F_I$) of the aircraft 1200 causing the nose-down pitching moment $M_1$ is large enough to overcome the pitching moment in the opposite direction (e.g., a nose-up pitching moment $M_2$) due to the aircraft weight (e.g., the vertical component of the inertial force $F_I$) and hydrodynamic lifting force (e.g., the vertical component of the reaction force $F_R$), the aircraft 1200 may continue to pitch forward (rotating the tail 1236 over the nose 1220). While the velocity of the aircraft 1200 may be lower following impact with the landing surface 1000, the drag force may still be quite large, which may cause the nose 1220 to be significantly submerged.

It should be noted that the flip-over behavior is a dynamic phenomenon that may depend on various external forces, such as hydrodynamic forces, inertial forces and moments at various times throughout the emergency landing. Thus, even though the forces and moments may be neutral, the aircraft may still have a rotational velocity that will result in the aircraft flipping over.

In certain embodiments, the landing stability apparatus 102 disclosed herein reduces the nose-down pitching moment $M_1$ of the aircraft 1200 created in response to contact with the landing surface 1000 during the emergency landing. During the ditching water landing, the nose-down pitching moment $M_1$ may be sufficiently reduced to minimize or eliminate the likelihood of the aircraft 1200 flipping over, for example, due to the magnitude of the inertial force $F_I$ (acting in a forward direction) and the reaction force $F_R$ due to drag (acting in a rearward direction). As illustrated by example, during the emergency landing, the nose-down pitching moment $M_1$ of the aircraft 1200 that utilizes the disclosed emergency landing stability system 100 (e.g., incorporating the landing stability apparatus 102) is substantially smaller than the nose-down pitching moment $M_1$ of the baseline aircraft 1300 that does not utilize the disclosed emergency landing stability system 100 (FIG. 1).

In other embodiments, the landing stability apparatus 102 may also create a nose-up pitching moment $M_2$ (also referred to herein as a tail-down pitching moment) to counter the nose-down pitching moment $M_1$ of the aircraft 1200 created in response to contact with the landing surface 1000 during the emergency landing. During the ditching water landing, the nose-up pitching moment $M_2$ may be sufficient to overcome the nose-down pitching moment $M_1$ of the aircraft 1200 and minimize or eliminate the likelihood of the aircraft 1200 flipping over, for example, due to the magnitude of the inertial force $F_I$ (acting in a forward direction) and the reaction force $F_R$ due to drag (acting in a rearward direction). As illustrated by example, during the emergency landing, the nose-up pitching moment $M_2$ of the aircraft 1200 that utilizes the disclosed emergency landing stability system 100 (e.g., incorporating the landing stability apparatus 102) acts opposite to the nose-down pitching moment $M_1$ of the baseline aircraft 1300 that does not utilize the disclosed emergency landing stability system 100 (FIG. 1).

In one example, the airframe 1202 includes the fuselage 1216, the landing gear 1218, a nose 1220 and a pair of wings 1222. The airframe 1202 also includes an underlying structural support frame 1224. A plurality of skin panels (not explicitly illustrated) is coupled to the support frame 1224, for example, to form the fuselage 1216, the nose 1220, and the pair of wings 1222. The support frame 1224 may also serve as a support structure for the landing stability apparatus 102.

In one example, the wings 1222 are connected proximate to (e.g., at or near) a top of the fuselage 1216 (e.g., the wing root is attached near the top of the fuselage instead of near the bottom of the fuselage), referred to herein as high-wings. For aircraft with high wings 1222, the location of the center of gravity CG is usually relatively high. This is because a substantial amount of the weight of the aircraft 1200 is located in the wings 1222 (e.g., wing structure, fuel, engines mounted below the wings, etc.). These factors may combine to cause high-wing aircraft to be more vulnerable to the flip-over scenario described above (e.g., flipping over during the ditching water landing due to the nose-down pitching moment $M_1$).

Referring to FIG. 3, in one example, the landing stability apparatus 102 locates an secondary contact surface 104 of the aircraft 1200 forward of a center of gravity CG of the aircraft 1200 (e.g., by a sufficient distance $D_3$) to mitigate the nose-down pitching moment $M_1$.

As used herein, the secondary contact surface 104 refers to the area (e.g., surface area) of the aircraft 1200 that makes secondary contact with the landing surface 1000 during the emergency landing. As an example, the secondary contact surface 104 is the contact surface of the aircraft 1200 (e.g., of the fuselage 1216) that makes secondary contact with the landing surface 1000.

One advantage to this configuration is that the landing stability apparatus 102 passively achieves nose-over prevention during the emergency landing. This may be important in that ditching water landings may cause of various system failures. During systems failures, having a passive system to prevent the nose-over event may add another level of reliability to the aircraft 1200.

In certain embodiments, the landing stability apparatus 102 locates the secondary contact surface 104 of the aircraft 1200 a sufficient distance, for example distance $D_3$, forward of the center of gravity CG of the aircraft 1200 to mitigate the nose-down pitching moment $M_1$, for example, by sufficiently reducing the nose-down pitching moment $M_1$ to prevent the aircraft from flipping over.

In certain embodiments, the landing stability apparatus 102 locates the secondary contact surface 104 of the aircraft 1200 a sufficient distance, for example distance $D_3$ forward of the center of gravity CG of the aircraft 1200 to mitigate the nose-down pitching moment $M_1$, for example, by creating a nose-up pitching moment $M_2$ (also referred to herein as a tail-down pitching moment) sufficient to reduce the nose-down pitching moment $M_1$ and prevent the aircraft from flipping over.

In certain embodiments, the landing stability apparatus 102 creates the nose-up (tail-down) pitching moment $M_2$ sufficient to counter (e.g., completely overcome) the nose-down pitching moment $M_1$ created during the emergency landing prevent the aircraft from flipping over.

Referring to FIGS. 11, 12, 17, 20, 22, 26, 30, 32, 34, 36 and 38, in the various embodiments disclosed herein, the particular distance $D_3$ of the secondary contact surface 104 forward of the center of gravity CG may vary depending on numerous factors, such as the shape of the aircraft 1200 (e.g., the length and/or height of the fuselage 1216), the location (e.g., the vertical and/or horizontal position) of the center of gravity CG relative to the aircraft 1200, the speed of the aircraft 1200 upon emergency landing, the angle of attack $A_A$ of the aircraft 1200 at impact with the landing surface 1000 and the like. Generally, the distance $D_3$ of the secondary contact surface 104 forward of the center of gravity CG is sufficient to locate a contact force $F_C$ forward of the center of gravity CG, such that the reaction force $F_R$ passes forward of the center of gravity CG.

Figure 4:
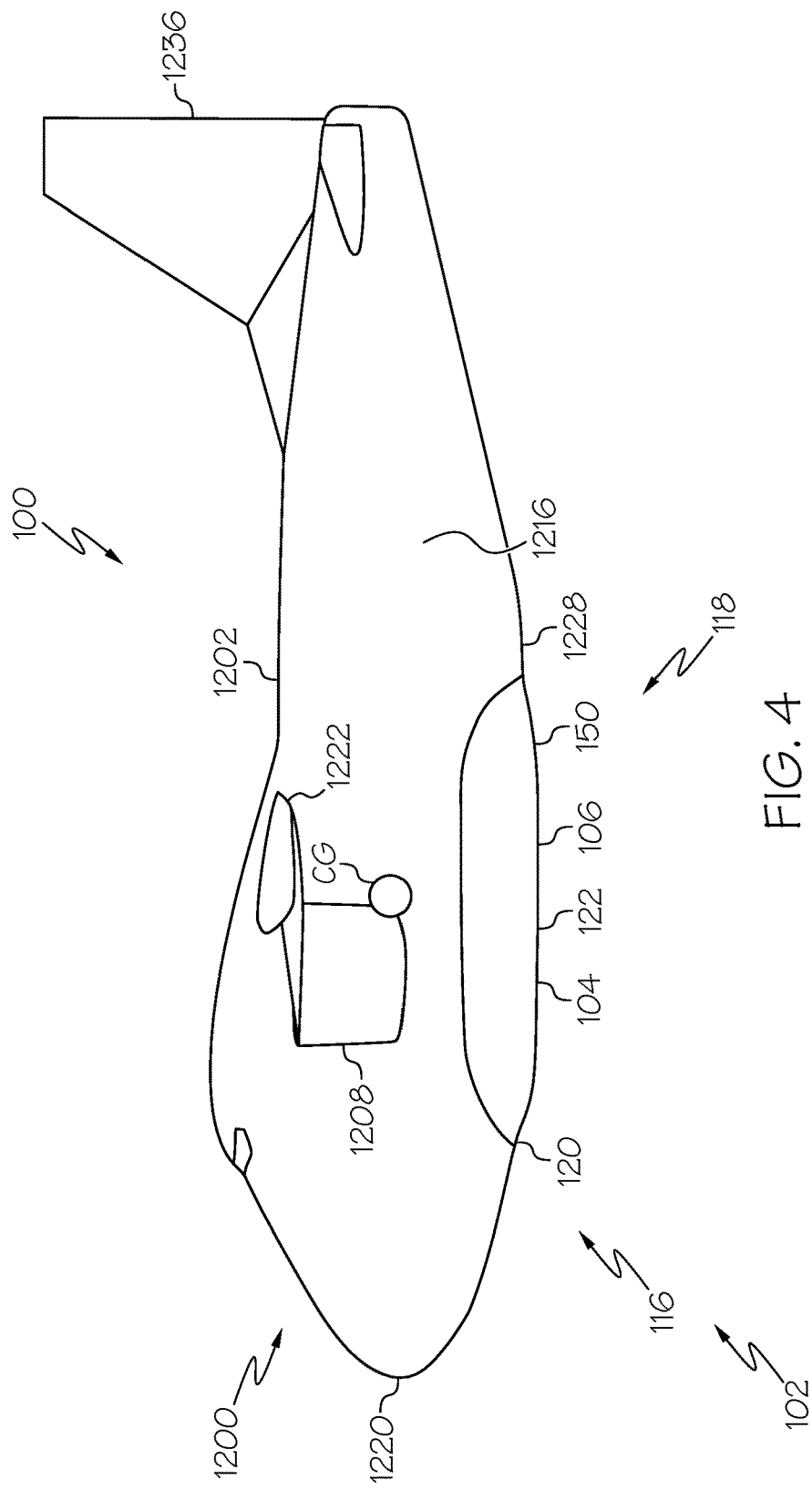
FIG. 4 is a schematic side elevation view of one example of the disclosed landing stability apparatus of the emergency landing stability system.
Figure 5:
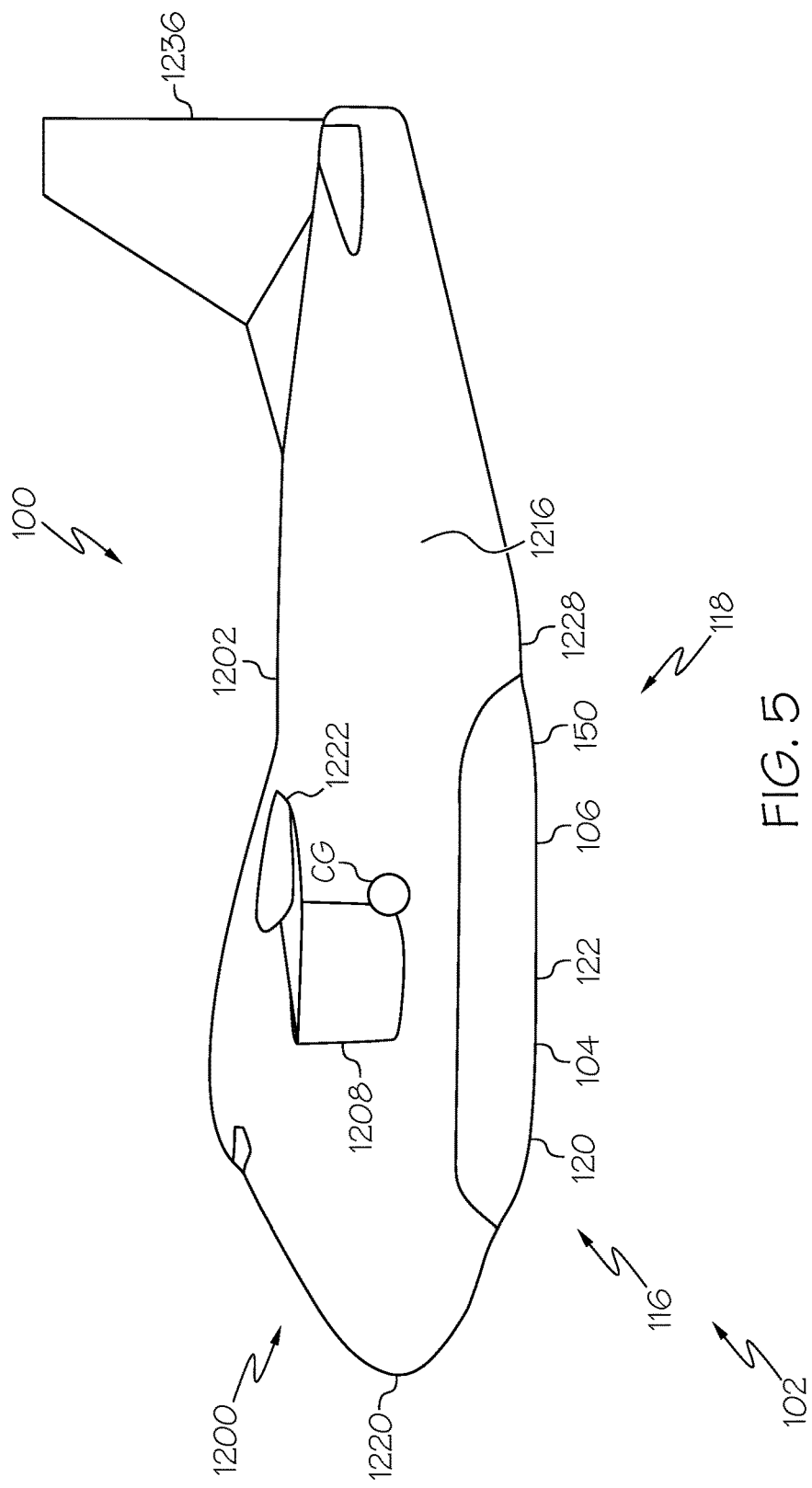
FIG. 5 is a schematic side elevation view of another example of the disclosed landing stability apparatus.
Figure 10:
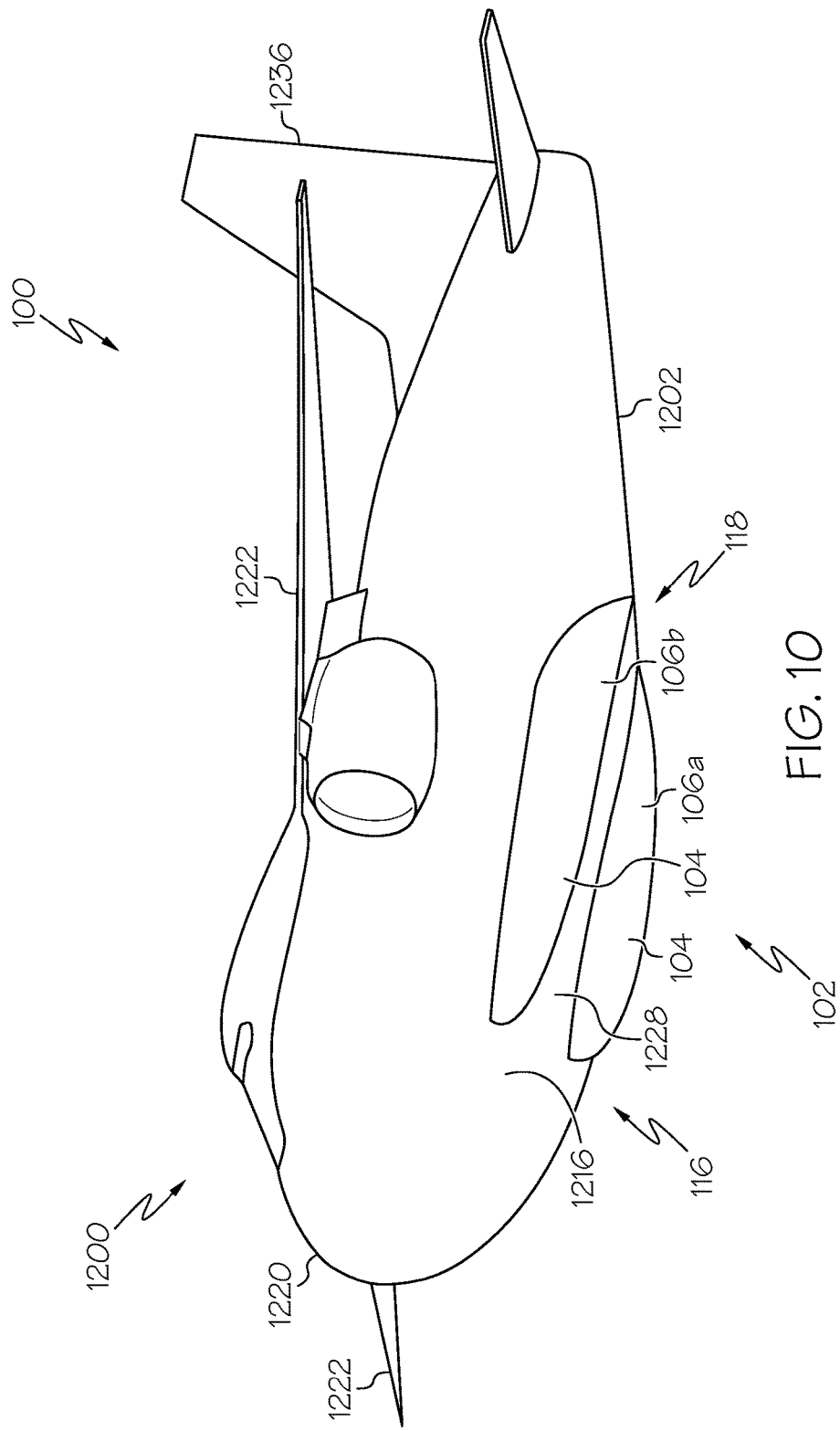
FIG. 10 is a schematic side and bottom perspective view of the landing stability apparatus of FIG. 4.

Referring to FIGS. 4 and 5, and with reference to FIG. 3, in one example, the landing stability apparatus 102 includes a pair of sponsons 106 projecting downwardly and outwardly from a fuselage-underside surface 1228 of the fuselage 1216 (or the aircraft 1200). Each one of the pair of sponsons 106 may be identified individually as a first (e.g., right) sponson 106a and a second (e.g., left) sponson 106b (FIG. 10).

Figure 6:
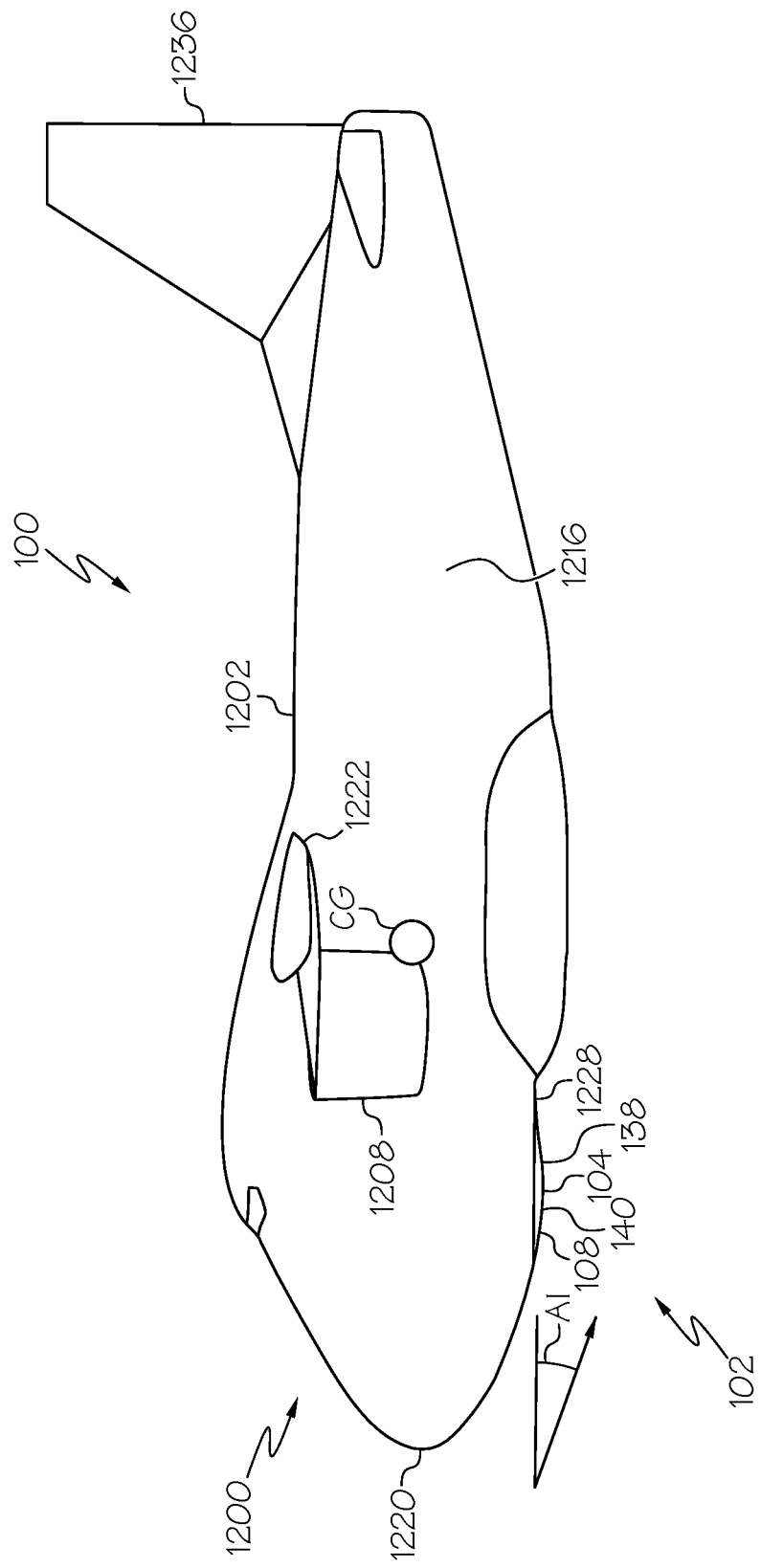
FIG. 6 is a schematic side elevation view of another example of the disclosed landing stability apparatus.

Referring to FIG. 6, and with reference to FIG. 3, in one example, the landing stability apparatus 102 includes a blister 108 projecting downwardly from the fuselage-underside surface 1228 of the fuselage 1216 (or the aircraft 1200) proximate to the nose 1220 of the fuselage 1216 (aircraft 1200).

Figure 7:
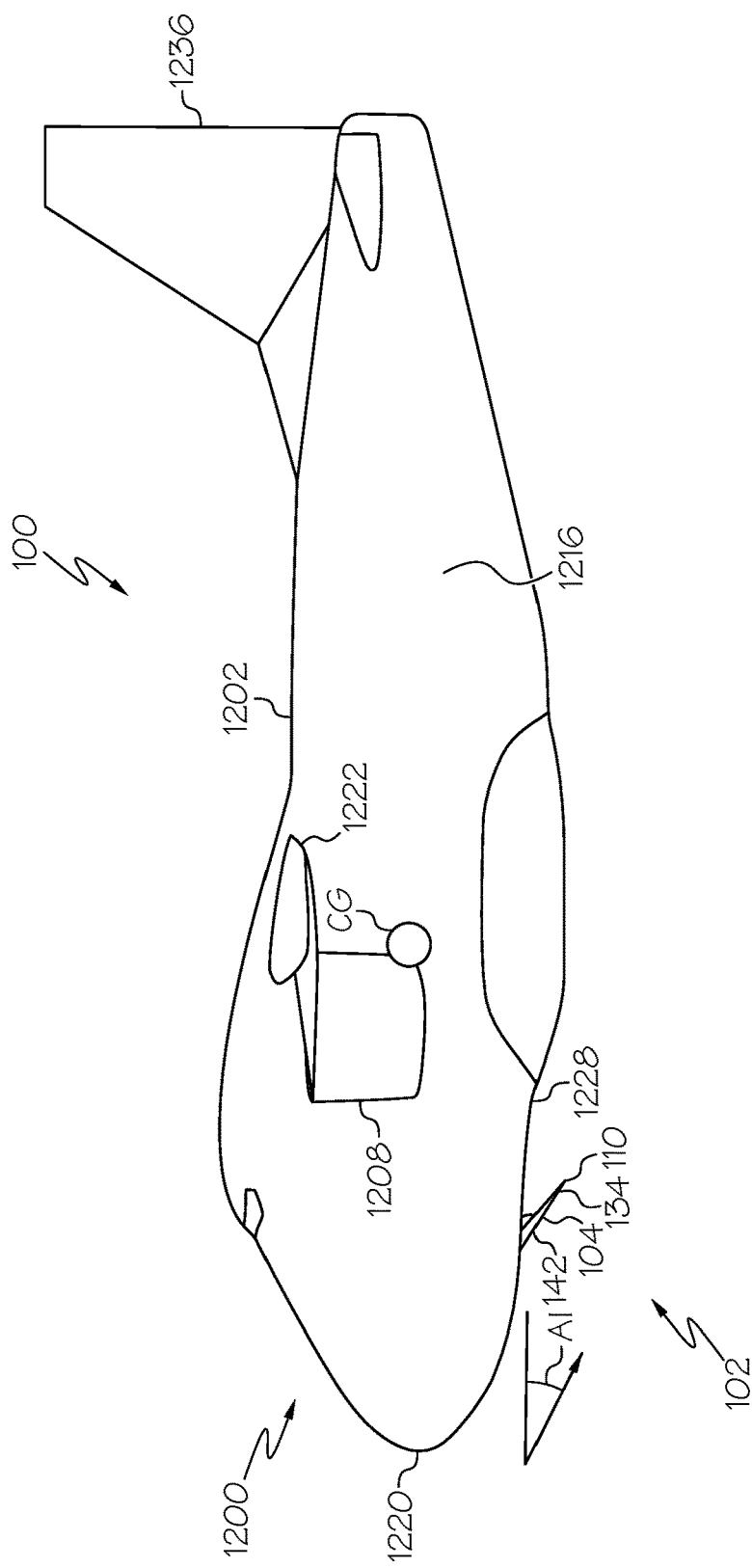
FIG. 7 is a schematic side elevation view of another example of the disclosed landing stability apparatus.
Figure 16:
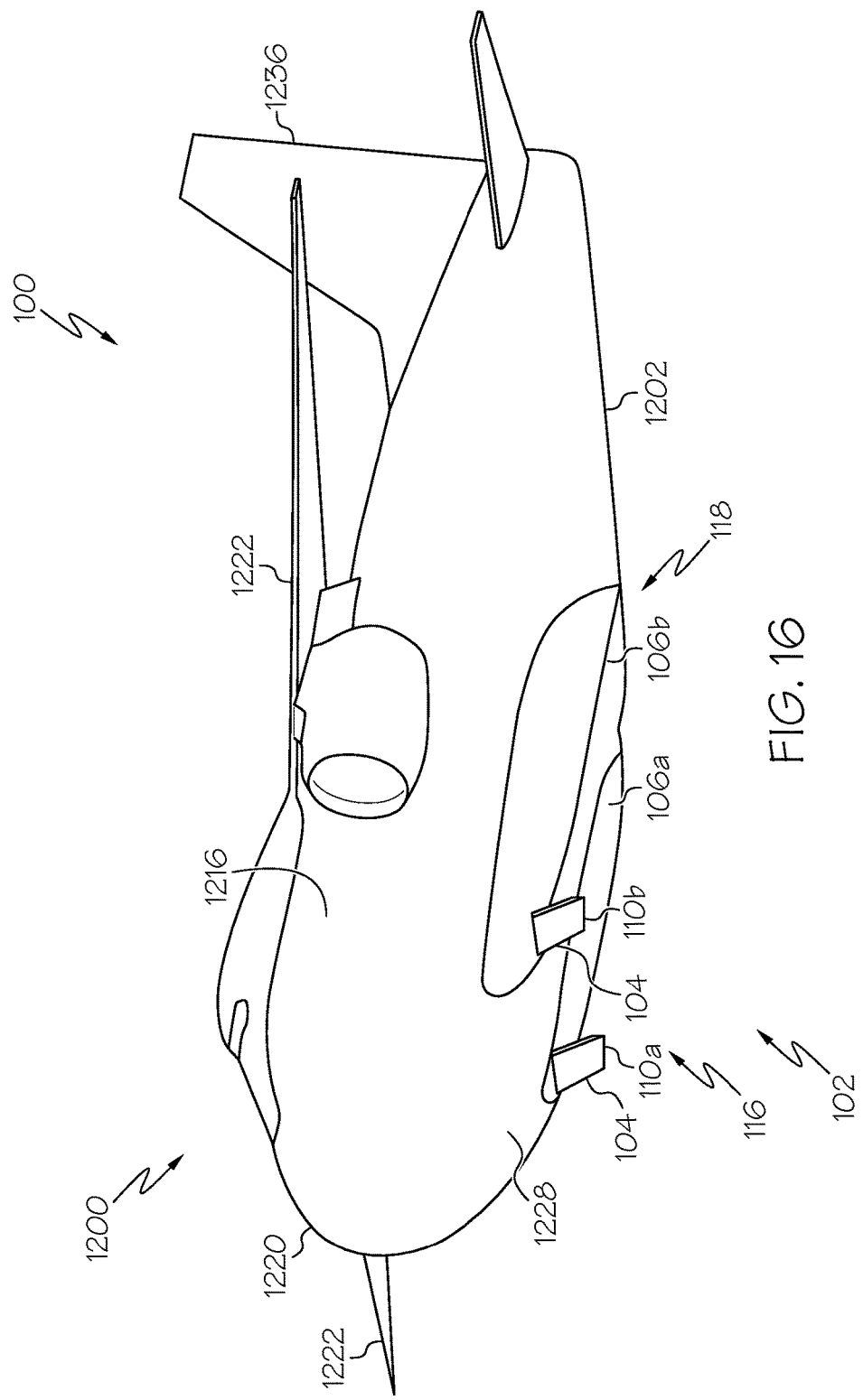
FIG. 16 is a schematic side and bottom perspective view of the landing stability apparatus of FIG. 15.
Figure 35:
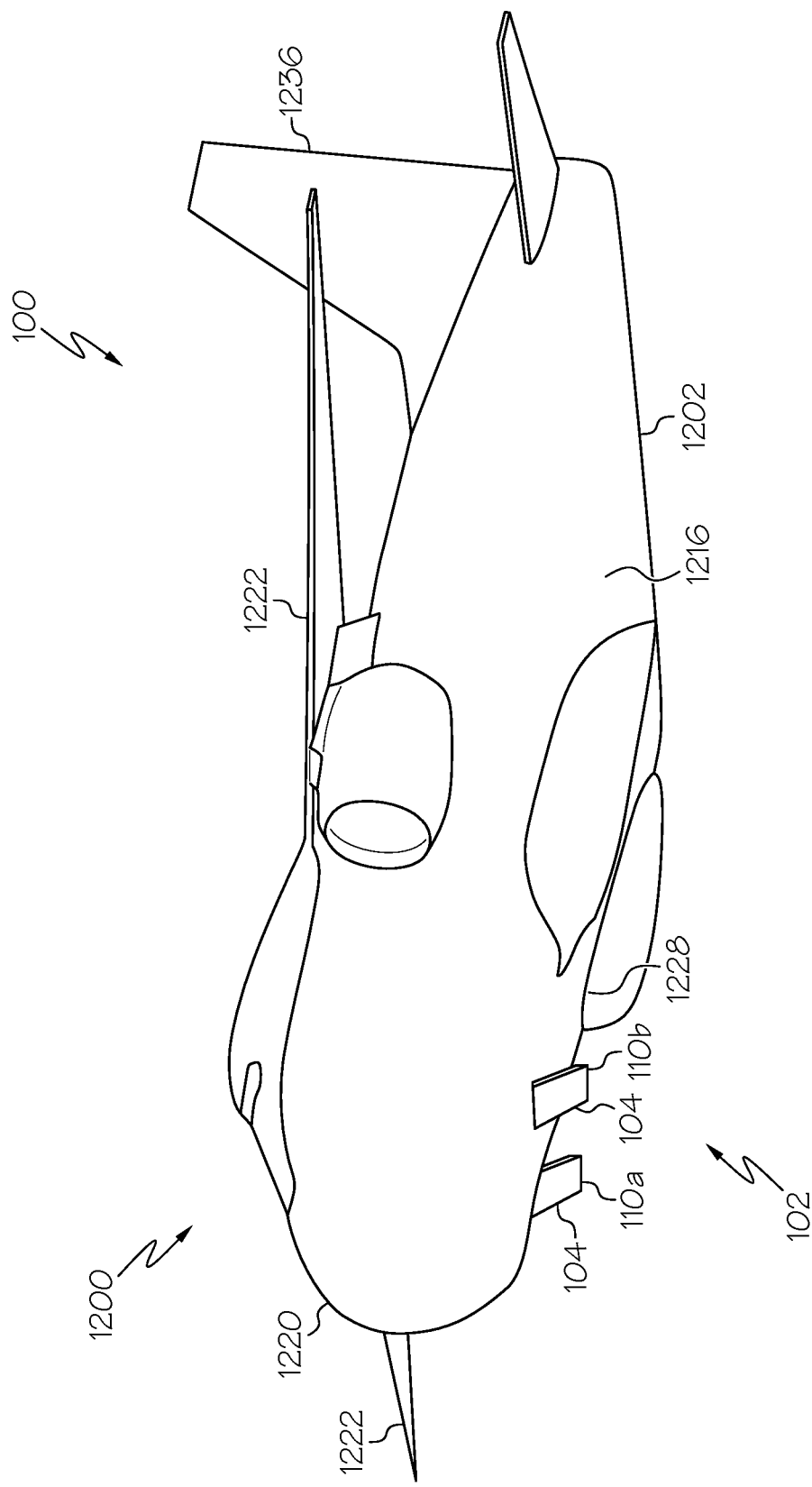
FIG. 35 is a schematic side and bottom perspective view of the landing stability apparatus of FIG. 7.

Referring to FIG. 7, and with reference to FIG. 3, in one example, the landing stability apparatus 102 includes at least one skid 110 deployable from the fuselage-underside surface 1228 of the fuselage 1216 (aircraft 1200). Each one of a pair of skids 110 may be identified individually as a first (e.g., right) skid 110a and a second (e.g., left) skid 110b (FIGS. 16 and 35).

Figure 8:
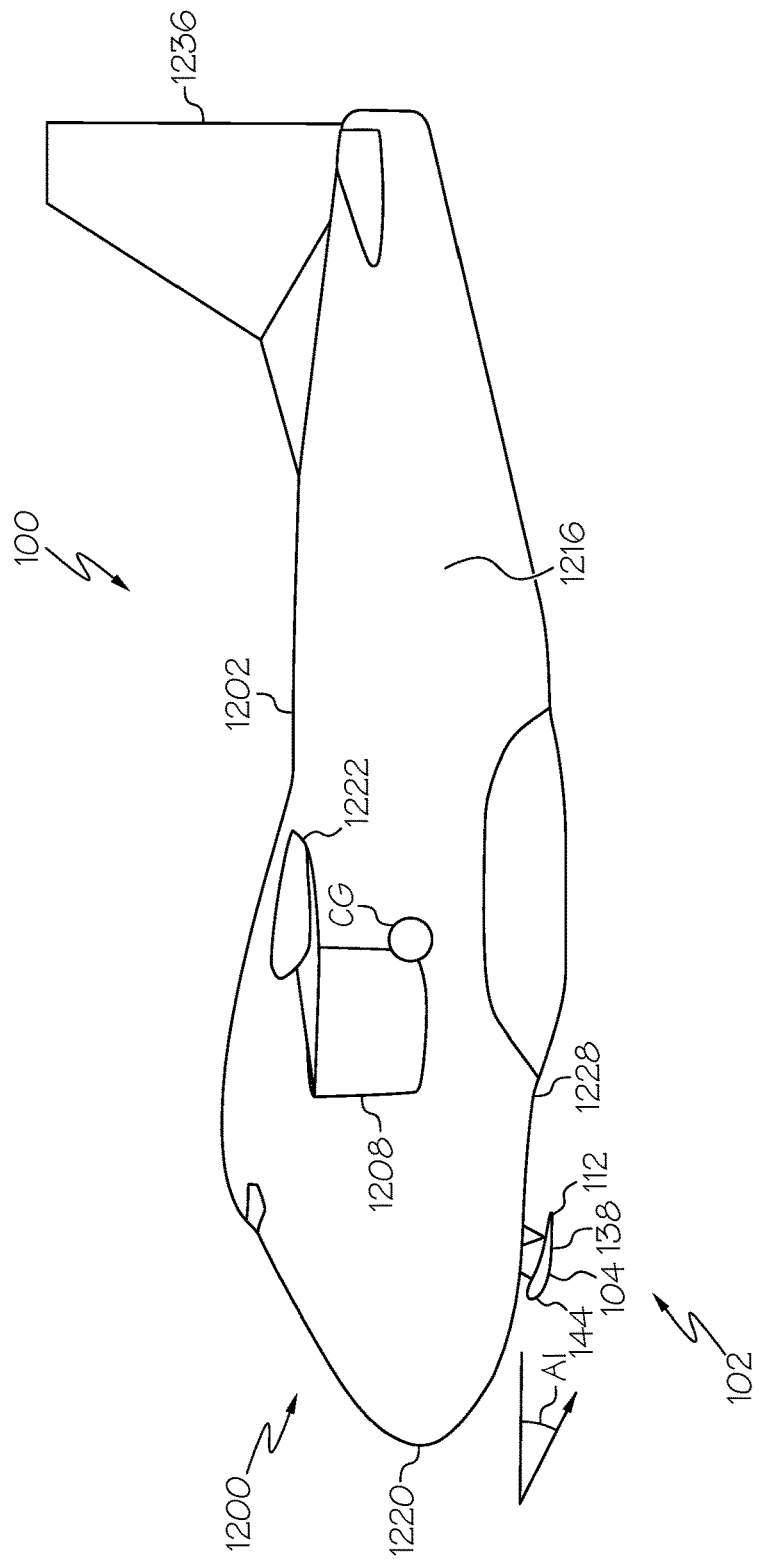
FIG. 8 is a schematic side elevation view of another example of the disclosed landing stability apparatus.
Figure 19:
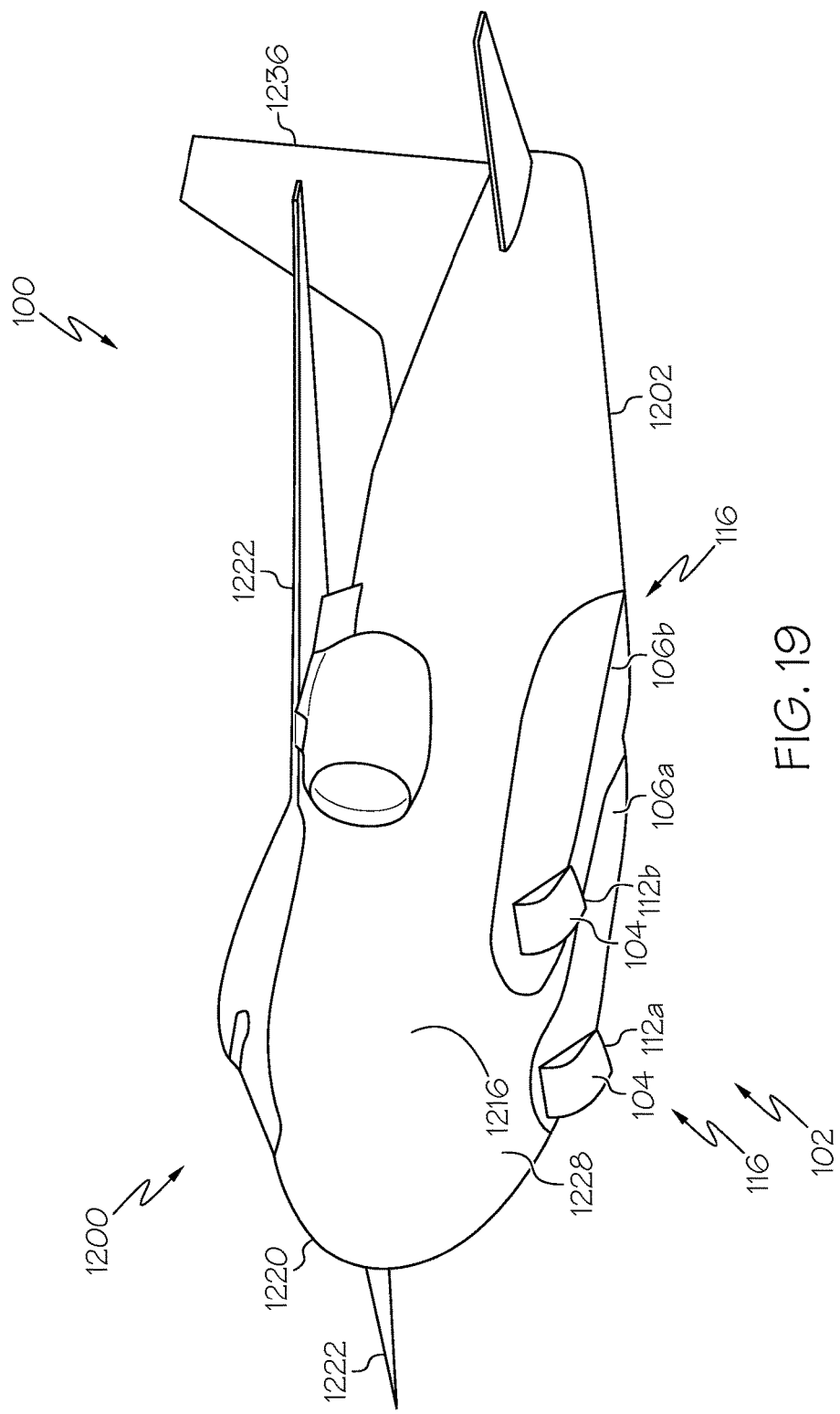
FIG. 19 is a schematic side and bottom perspective view of the landing stability apparatus of FIG. 18.
Figure 37:
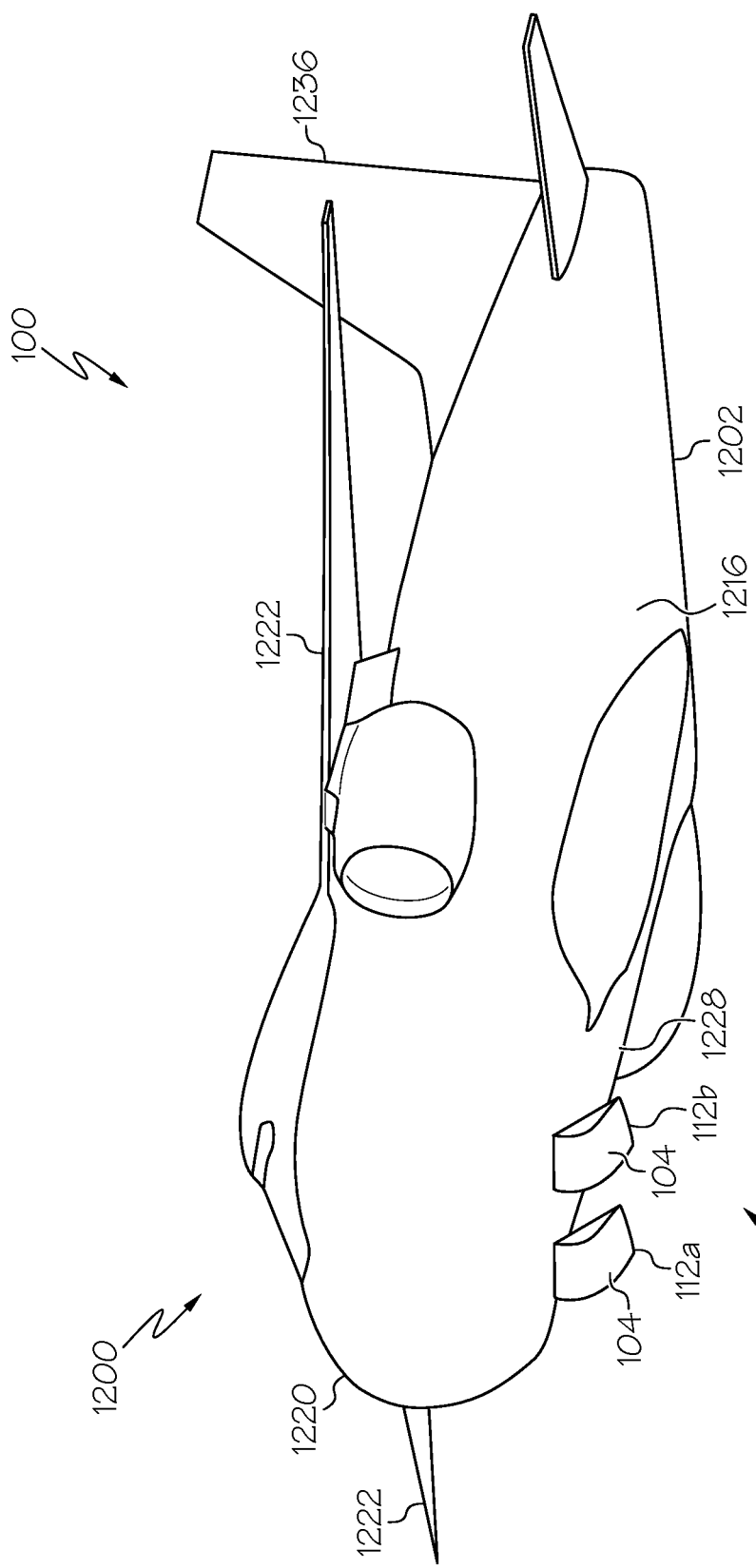
FIG. 37 is a schematic side and bottom perspective view of the landing stability apparatus of FIG. 8.

Referring to FIG. 8, and with reference to FIG. 3, in one example, the landing stability apparatus 102 includes at least one ski 112 deployable from the fuselage-underside surface 1228 of the fuselage 1216 (aircraft 1200). Each one of a pair of skis 112 may be identified individually as a first (e.g., right) ski 112a and a second (e.g., left) ski 112b (FIGS. 19 and 37).

Figure 9:
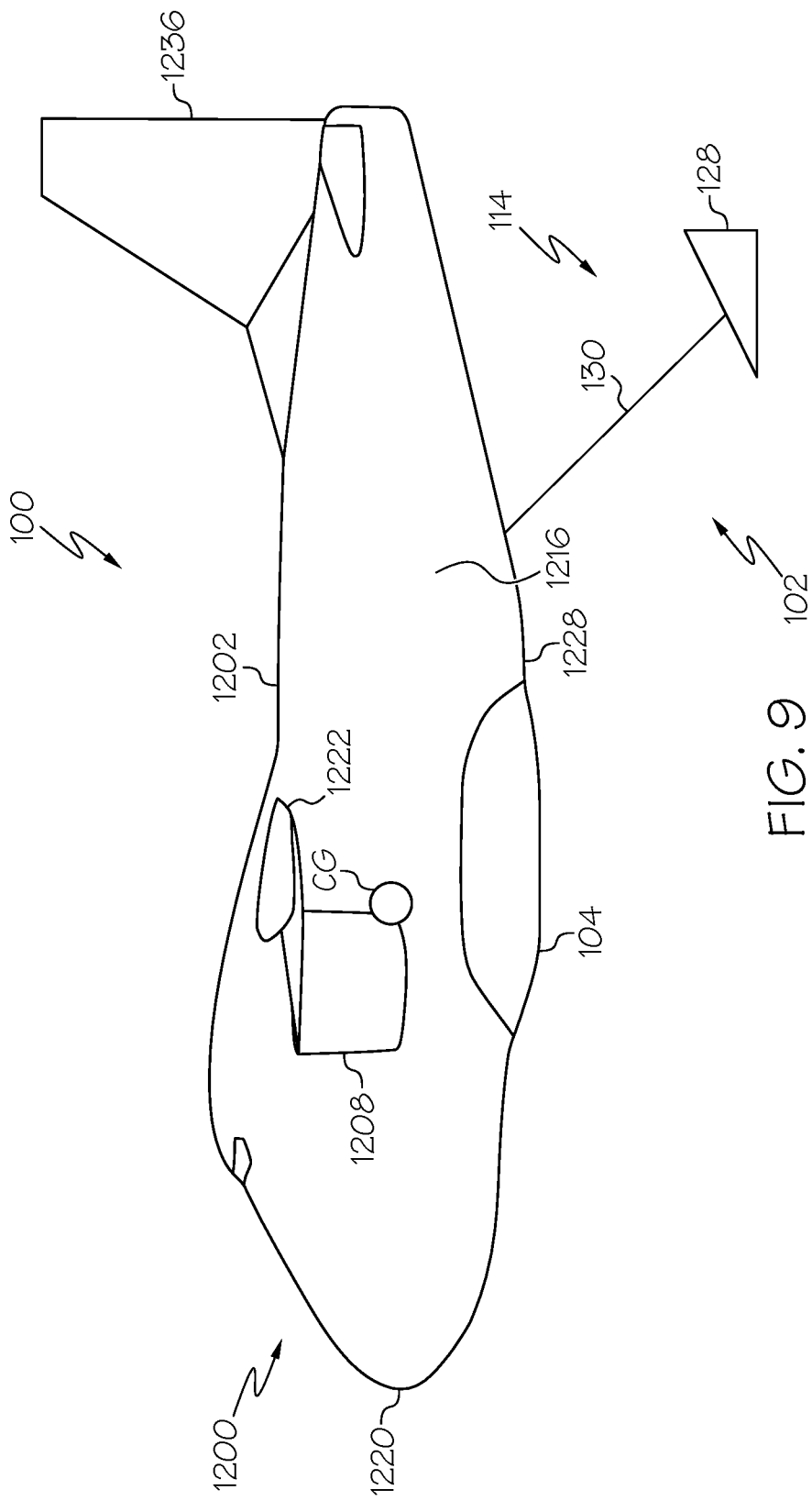
FIG. 9 is a schematic side elevation view of another example of the disclosed landing stability apparatus.

Referring to FIG. 9, and with reference to FIG. 3, in one example, the landing stability apparatus 102 includes a drag device 114 deployable from the fuselage 1216 aft of the center of gravity CG of the aircraft 1200. The drag device 114 produces a hydrodynamic drag (e.g., the horizontal component of the reaction force $F_R$) sufficient to create the nose-up pitching moment $M_2$ (to counter and/or overcome the nose-down pitching moment $M_1$).

Referring to FIGS. 4 and 5, and with reference to FIG. 3, in one example, the landing stability apparatus 102 includes at least one of the pair of sponsons 106, the blister 108, the skid 110, the ski 112 and the drag device 114. The combination or arrangement of different landing stability apparatus 102 may allow for a hierarchy of structure to be designed.

Referring to FIGS. 4, 5 and 10-12, and with reference to FIG. 3, in one example, the emergency landing stability system 100 includes the aircraft 1200 including the fuselage 1216 and the landing gear 1218. The emergency landing stability system 100 also includes the pair of sponsons 106 projecting downwardly and outwardly from the fuselage-underside surface 1228 of the fuselage 1216 (aircraft 1200). The pair of sponsons 106 locates the secondary contact surface 104 of the aircraft 1200 forward of the center of gravity CG of the aircraft 1200 to mitigate the nose-down pitching moment $M_1$ of the aircraft 1200 created in response to contact with the landing surface 1000 during the emergency landing.

Referring to FIGS. 4 and 5, the pair of sponsons 106 may have a lengthened profile shape (e.g., a sponson-profile shape). The sponson-profile shape (e.g., a bottom or underside surface profile shape of the sponsons 106) may be elongated as compared to a baseline fuselage-profile shape (e.g., a bottom or underside surface profile shape of the baseline fuselage) formed by the baseline fuselage and main landing gear sponsons (not explicitly identified) of the baseline aircraft 1300 (as illustrated in FIG. 1). Thus, the sponson-profile shape may form at least a portion of the fuselage-profile shape, thereby altering the baseline fuselage-profile shape forward of the center of gravity CG. The sponson-profile shape may be smooth. The sponson-profile shape may be designed to minimize both aerodynamic drag (e.g., during flight) and hydrodynamic drag (e.g., during contact with water). As illustrated in FIG. 4, as one example, elongated sponsons 106 may extend proximate to the nose 1220 of the aircraft 1200. As illustrated in FIG. 5, as another example, further elongated sponsons 106 may extend to the nose 1220.

Figure 11:
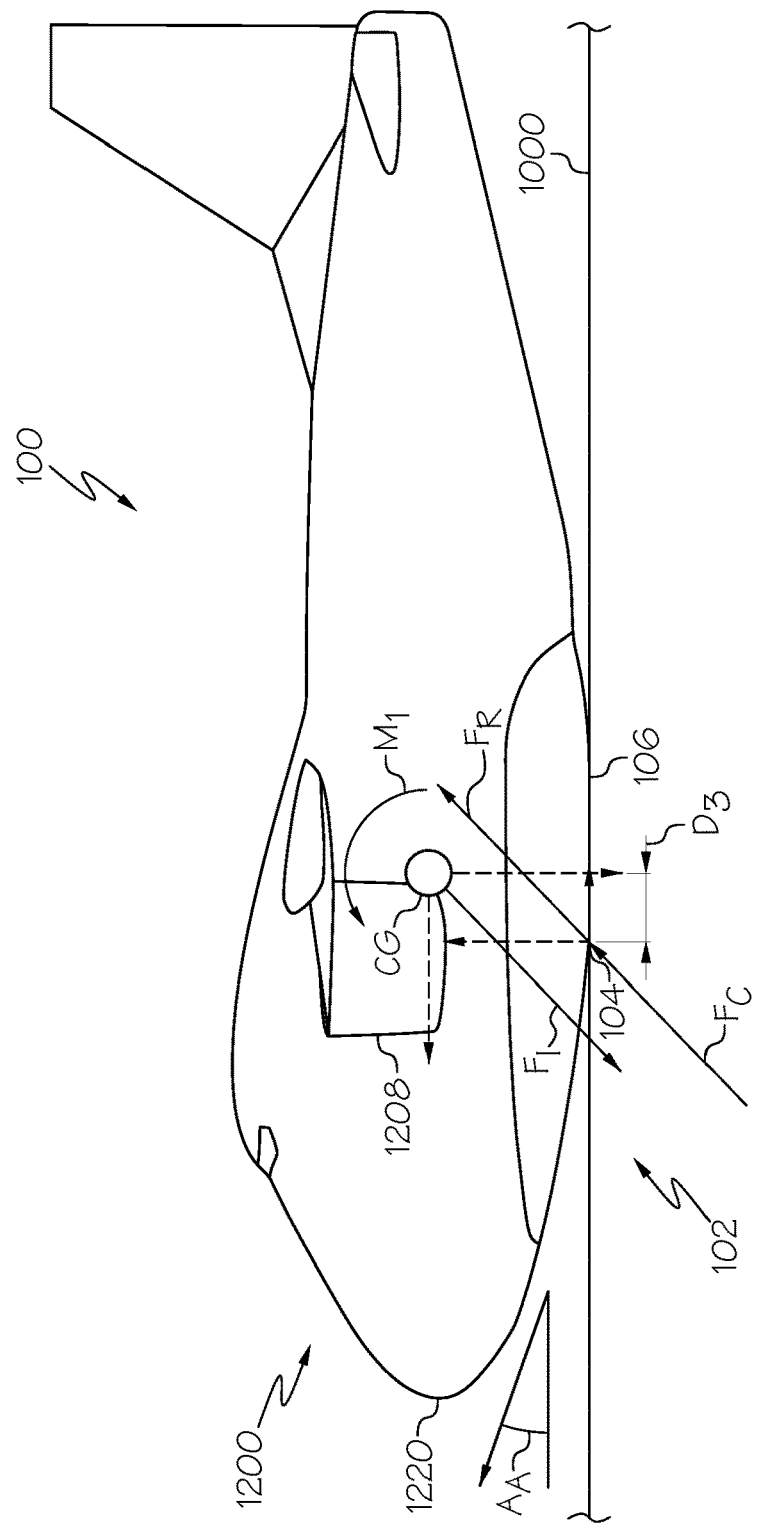
FIG. 11 is a schematic side elevation view of the landing stability apparatus of FIG. 4 illustrating the aircraft making an emergency landing.

Referring to FIG. 11, and with reference to FIGS. 3 and 4, lengthening the sponsons 106 may improve the pitch stability during the ditching water landing so that the likelihood of a flip-over event is reduced. As the aircraft 1200 begins to rotate forward, the water contacts the lengthened sponsons 106 at a location (the secondary contact surface 104) forward of the center of gravity CG (e.g., compared to the baseline aircraft 1300 illustrated in FIG. 1). The secondary contact surface 104 (e.g., area of contact with the water) being located forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location closer to the center of gravity CG of the aircraft 1200. This reduces the nose-down pitching moment $M_1$.

Figure 12:
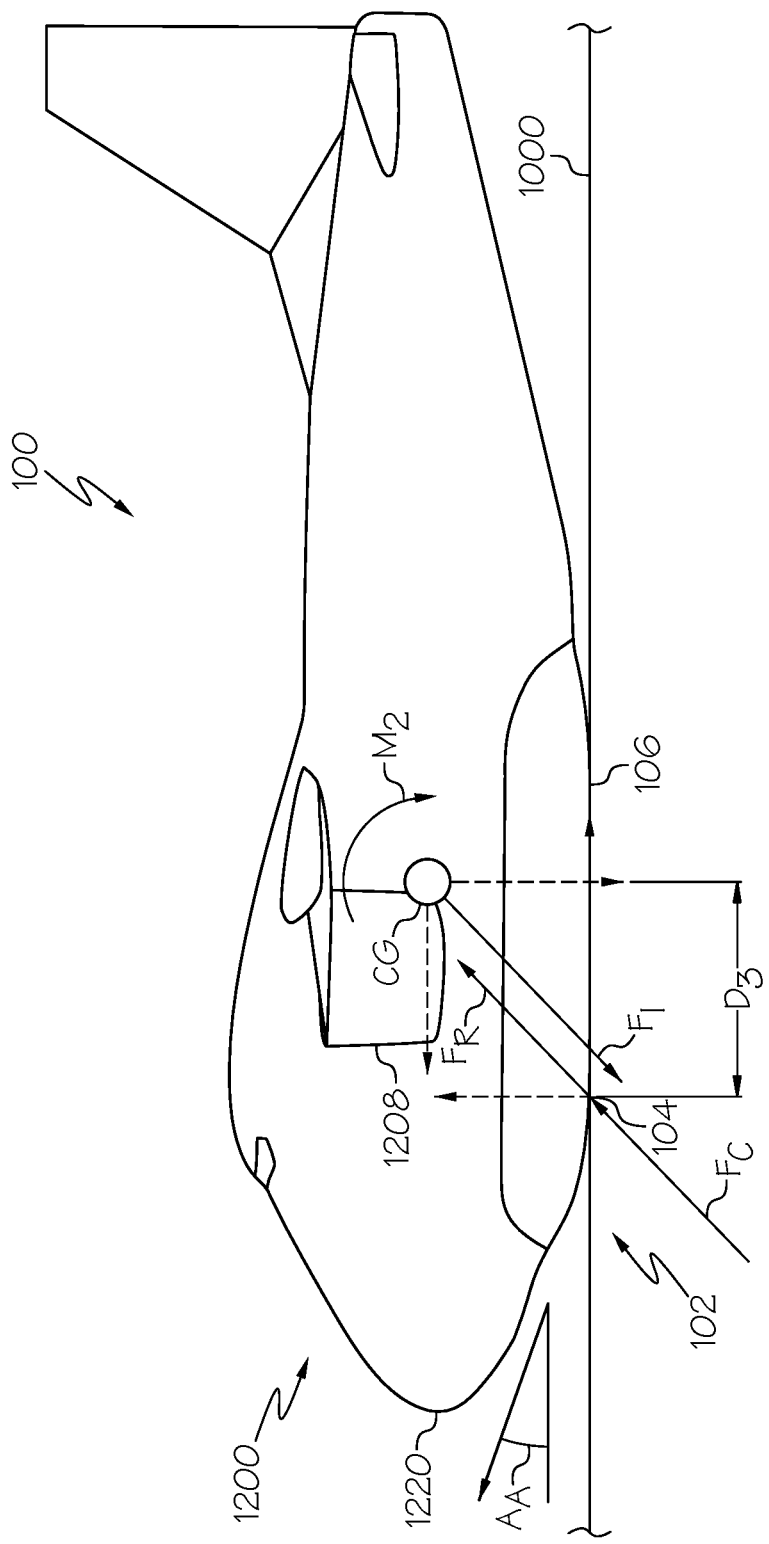
FIG. 12 is a schematic side elevation view of the landing stability apparatus of FIG. 5 illustrating the aircraft making an emergency landing.

Referring to FIG. 12, and with reference to FIGS. 3 and 5, further lengthening the sponsons 106 may further improve the pitch stability during the ditching water landing so that the likelihood of a flip-over event is further reduced. As the aircraft 1200 begins to rotate forward, the water contacts the further lengthened sponsons 106 at a location (the secondary contact surface 104) further forward of the center of gravity CG (e.g., compared to the baseline aircraft 1300 illustrated in FIG. 1 and the lengthened sponsons 106 illustrated in FIGS. 4 and 11). The secondary contact surface 104 being located further forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

Referring to FIGS. 11 and 12, in one example, the pair of sponsons 106 locates the secondary contact surface 104 sufficiently forward (by distance $D_3$) of the center of gravity CG of the aircraft 1200 to mitigate (e.g., counter) the nose-down pitching moment $M_1$ (FIG. 11). The further forward (e.g., the greater the distance $D_3$), the greater the reduction in the nose-down pitching moment $M_1$, for example, even overcoming the nose-down pitching moment $M_1$ by creating the nose-up pitching moment $M_2$ (FIG. 12). As described herein above, the particular distance $D_3$ of the secondary contact surface 104 forward of the center of gravity CG by the sponsons 106 may vary depending on numerous factors. Generally, the distance $D_3$ of the secondary contact surface 104 forward of the center of gravity CG is sufficient to locate a contact force $F_C$ forward of the center of gravity CG, such that the reaction force $F_R$ passes forward of the center of gravity CG.

Referring to FIGS. 4, 5 and 10, and with reference to FIG. 3, in one example, each one of the pair of sponsons 106 (e.g., first sponson 106a and second sponson 106b) includes a forward portion 116 and an aft portion 118. The forward portion 116 is located forward of the center of gravity CG of the aircraft 1200. The secondary contact surface 104 is located on the forward portion 116.

Figure 13:
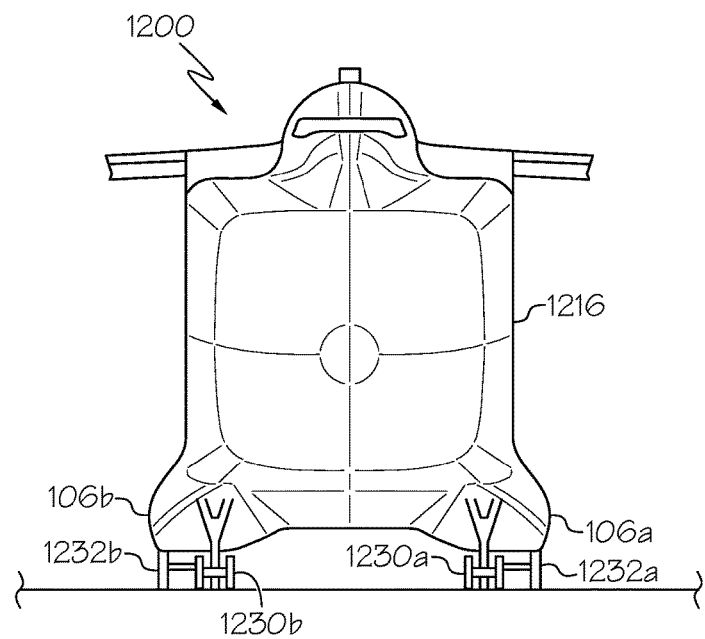
FIG. 13 is a schematic partial front view of the landing stability apparatus of FIG. 4 illustrating one example of landing gear of the aircraft.
Figure 14:
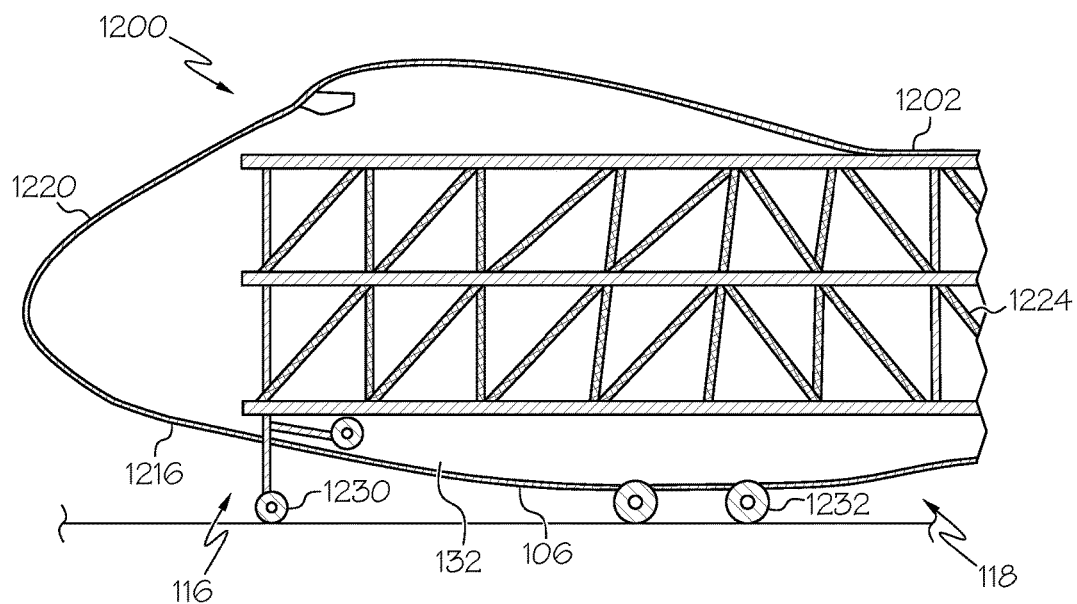
FIG. 14 is a schematic partial side elevation view, in section, of the landing stability apparatus of FIG. 4 illustrating one example of a support structure of the aircraft.

Referring to FIGS. 13 and 14, and with reference to FIGS. 3-5 and 10, in one example, the landing gear 1218 includes a pair of nose landing gear 1230. The forward portion 116 of each one of the pair of sponsons 106 accommodates one of the pair of nose landing gear 1230. Each one of the pair of nose landing gear 1230 is identified individually as a first (e.g., right) nose landing gear 1230a and a second (e.g., left) nose landing gear 1230b (FIG. 13).

Each one of the sponsons 106 may include an interior volume 132. The interior volume 132 of the forward portion 116 of each one of the sponsons 106 may be shaped and sized to provide sufficient space to accommodate the nose landing gear 1230, when retracted. The nose landing gear 1230 may swing or pivot in the aft direction, when retracted into the sponsons 106, and swing or pivot in the forward direction, when deployed from the sponsons 106.

Referring to FIGS. 13 and 14, and with reference to FIGS. 3, in one example, the landing gear 1218 also includes a pair of main landing gear 1232. The aft portion 118 of each one of the pair of sponsons 106 accommodates one of the pair of main landing gear 1232. Each one of the pair of main landing gear 1232 is identified individually as a first (e.g., right) main landing gear 1232a and a second (e.g., left) main landing gear 1232b (FIG. 14).

The interior volume 132 of the aft portion 118 of each one of the sponsons 106 may be shaped and sized to provide sufficient space to accommodate the main landing gear 1232, when retracted.

The landing gear 1218 may also include a landing gear actuation system (not explicitly illustrated) operably coupled to the nose landing gear 1230 and/or the main landing gear 1232 for deploying and retracting the nose landing gear 1230 and/or the main landing gear 1232.

The pair of nose landing gear 1230 may be spaced laterally inward (e.g., closer to a centerline of the fuselage 1216) relative to the pair of main landing gear 1232, as best illustrated in FIG. 13.

Referring to FIG. 14, and with reference to FIGS. 3-5 and 13, in one example, the pair of sponsons 106 is integral to the fuselage 1216.

Each one of the sponsons 106 may include (e.g., may be formed from) one or more sponson skin panels (not explicitly illustrated). The sponsons skin panels may be integrated with (e.g., joined to) one or more fuselage skin panels (not explicitly illustrated) forming the fuselage 1216.

Referring to FIG. 14, and with reference to FIGS. 3-5 and 13, in one example, the aircraft 1200 includes the airframe 1202. Each one of the pair of sponsons 106 is structurally connected to the airframe 1202. Each one of the pair of nose landing gear 1230 is structurally connected to the airframe 1202.

Each one of the pair of sponsons 106 may be structurally connected to and supported by the support frame 1224 of the airframe 1202. Each one of the pair of nose landing gear 1230 may be structurally connected to and supported by the support frame 1224 of the airframe 1202. Structurally connecting the sponsons 106 and the landing gear 1218 to the support frame 1224 may offer weight advantages as the support frame 1224 serves as the backup structure for both components.

The support frame 1224 may be a space frame 1226 (FIG. 3). The space frame 1226 may include is a truss-like, lightweight rigid structure constructed from interlocking struts in a geometric pattern.

Structurally connecting the sponsons 106 to the support frame 1224 may provide sufficient structural robustness to the sponsons 106 to sustain the forces applied to the sponsons 106 upon contact (e.g., impact) with the landing surface 1000 during the emergency landing. Structurally connecting the landing gear 1218 (e.g., the nose landing gear 1230) to the support frame 1224 may provide sufficient robustness to the landing gear 1218 to sustain the loads applied to the landing gear 1218 during a regular landing.

Additionally, a forward portion-underside surface 120 and an aft portion-underside surface 150 of the sponsons 106 may include landing gear doors (not explicitly illustrated) for deployment of the nose landing gear 1230 and the main landing gear 1232. The landing gear doors may be structurally interconnected to the support frame 1224 to provide sufficient robustness to the sponsons 106 to sustain the forces applied to the sponsons 106 upon contact with the landing surface 1000.

Referring to FIGS. 11 and 12, since the sponsons 106 project below the bottom of the aircraft 1200 (e.g., from the fuselage-underside surface 1228), the sponsons 106 may act similar to water skis to provide hydrodynamic lift sufficient to support the aircraft 1200 during at least a portion of the touch-down sequence of the ditching water landing (e.g., at least the higher-speed portion). Thus, the sponsons 106 may prevent the fuselage skin panels from contacting the landing surface 1000 (e.g., water), at least during the higher-speed portion of the ditching water landing, and may support the aircraft 1200 above the water surface upon landing. As such, at least a portion of the fuselage skin panels forming the fuselage-underside surface 1228 (FIGS. 3 and 10) may be lightweight since they will not be required to sustain impact or support the aircraft 1200 on the water.

In certain types of aircraft 1200 (e.g., cargo aircraft), the aircraft 1200 may be unpressurized. Since the fuselage skin panels may not contact the landing surface 1000 (e.g., the ground or water) during the emergency landing, the fuselage skin panels may be sized for differential air loads, which may be very light compared to pressurization loads, thus offering further weight advantages.

Generally, there may be two approaches to the design of fuselage skin panels forming the fuselage-underside surface 1228. In the first approach, the fuselage skin panels are designed to withstand hydrodynamic loads and maintain integrity when the speed of the aircraft 1200 reduces to a point that the contact area of the sponsons 106 with the surface of the water is not sufficient to maintain the rest of the fuselage 1216 above the water. At this speed and slower, the fuselage skin panels will also be in contact with the water. As the speed of the aircraft 1200 further decreases, the fuselage 1216 will displace an increasing volume of water, until the aircraft 1200 is at rest and floating in the water. At rest, the fuselage 1216 will displace a volume of water equal to the weight of the aircraft 1200. In this scenario, the fuselage skin panels may be designed to sustain a pressure greater than the design air load pressures, but not as much as the sponson skin panels are designed for, since the sponsons 106 are designed to withstand hydrodynamic forces as the aircraft 1200 first contacts the water (e.g., at approximately 140 knots).

In the second approach, the fuselage skin panels are not designed to withstand hydrodynamic loads. As the fuselage skin panels contact the water, they may be demolished and ripped off by wave peaks or splashing. The departure of the fuselage skin panels may have little bearing on the hydrodynamic behavior of the aircraft 1200 since it is supported primarily by the sponsons 106.

Referring to FIGS. 4 and 5, and with reference to FIG. 3, in one example, the forward portion 116 of each one of the pair of sponsons 106 includes the forward portion-underside surface 120. The secondary contact surface 104 is located on the forward portion-underside surface 120. The aft portion 118 of each one of the pair of sponsons 106 includes the aft portion-underside surface 150.

Referring to FIGS. 4 and 5, and with reference to FIGS. 11 and 12, in one example, at least the forward portion-underside surface 120 is structurally reinforced to withstand a contact force $F_C$ (FIGS. 11 and 12) applied to the forward portion 116 in response to contact with the landing surface 1000. The aft portion-underside surface 150 may also be structurally reinforced to withstand an additional contact force applied to the aft portion 118 in response to contact with the landing surface 1000.

It can be appreciated that ditching loads (e.g., water contact loads) may be extremely high pressure. Furthermore, the surface area of the sponsons 106 (e.g., the surface area of the forward portion-underside surface 120) that makes secondary contact with the water at high-pressure loads (e.g., the secondary contact surface 104) is small relative to the entire fuselage-underside surface 1228. Accordingly, any weight penalty for reinforcing the forward portion-underside surface 120 is much smaller than that of reinforcing the entire fuselage-underside surface 1228, thereby affording additional weight advantages.

Referring to FIGS. 4 and 5, and with reference to FIG. 3, in one example, the forward portion-underside surface 120 at least partially defines the sponson-profile shape. The sponson-profile shape includes a non-zero angle of incidence $A_I$. The particular angle of incidence $A_I$ of the sponson-profile shape of the forward portion-underside surface 120 may vary depending on numerous aerodynamic and/or hydrodynamic factors.

In one example, at least a portion of the forward portion-underside surface 120 includes a high friction surface. The high friction surface may be advantageous to reduce the velocity of the aircraft 1200 following impact with the landing surface 1000. The high friction surface may be particularly advantageous during forced ground landings to reduce the velocity of the aircraft 1200 following impact with the ground. The aft portion-underside surface 150 may also include the high friction surface.

Referring to FIGS. 4 and 5, and with reference to FIG. 3, in one example, the forward portion 116 of each one of the pair of sponsons 106 includes at least one sponson-underside skin panel 122. The aft portion 118 of each one of the pair of sponsons 106 may also include at least one sponson-underside skin panel 122. The sponson-underside skin panel 122 forming at least a portion of the forward portion-underside surface 120 may be structurally reinforced. The sponson-underside skin panel 122 forming at least a portion of the forward portion-underside surface 120 may include the high friction surface (or material). As one example, the high friction surface (or material) is a surface or material having a coefficient of friction of at least approximately 0.6. As another example, the high friction surface is a surface having a coefficient of friction greater than approximately 0.6. As one specific example, the high friction surface includes a rubber material.

Figure 41:
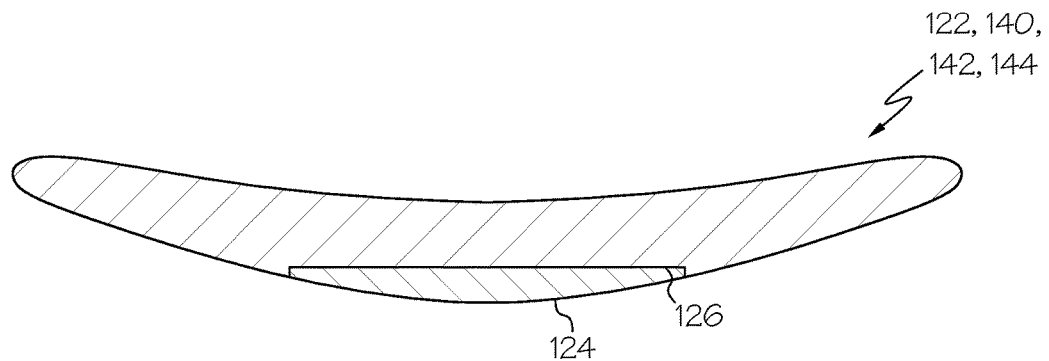
FIG. 41 is a schematic section view of one example of a multi-layer skin panel.

Referring to FIG. 41, and with reference to FIGS. 3-5, in one example, the sponson-underside skin panel 122 includes an exterior layer 124 including a non-deformable, low friction surface (or material) and an interior layer 126 including a deformable, high friction surface (or material). As one example, the low friction surface (or material) is a surface or material having a coefficient of friction less than approximately 0.6. The exterior layer 124 forms at least a portion of the forward portion-underside surface 120. The exterior layer 124 may also form at least a portion of the aft portion-underside surface 150.

The exterior layer 124 forming the forward portion-underside surface 120 may be made of a smooth, rigid material. The exterior layer 124 may be thin (e.g., approximately 0.04 inches) enough to provide a smooth aero surface, but will wear away quickly upon scraping on the runway. During the ditching water landing, the exterior layer 124 may minimize the drag force and, thus, also minimize the nose-down pitching moment $M_1$. During a gear-up forced ground landing, the exterior layer 124 may be quickly worn (e.g., ground) away by contact with the landing surface 1000, thereby exposing the interior layer 126. The interior layer 126 may include a soft material having a coefficient of friction sufficient to decelerate the aircraft 1200.

The high friction surface and/or the high friction material of the interior layer 126 may have a coefficient of friction designed bring the aircraft 1200 to a controlled stop. It may be advantageous to having higher coefficients of friction in those contact areas that are aft of the center of gravity CG as compared to those that are more forward, for example, for directional stability reasons.

Figure 15:
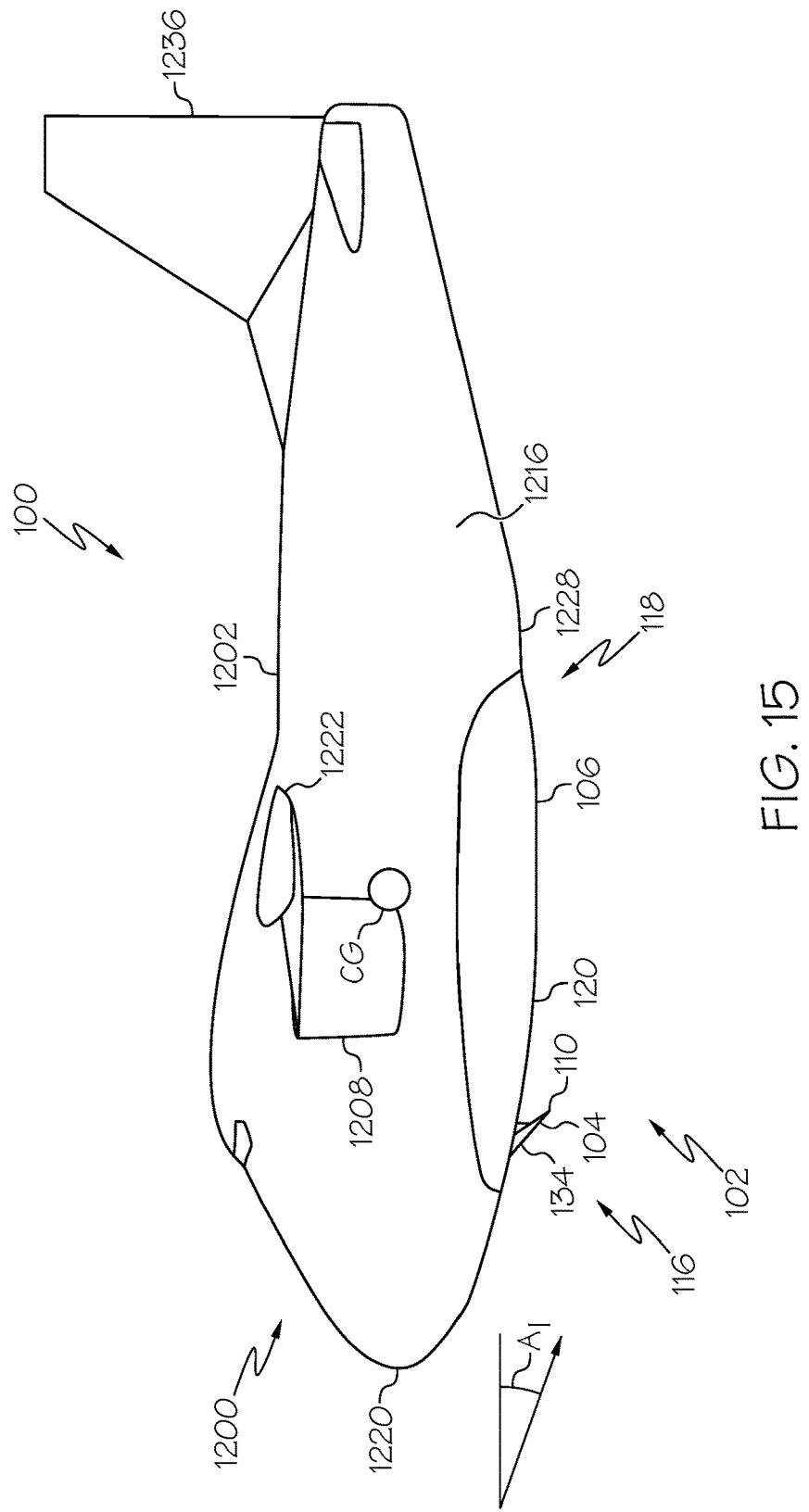
FIG. 15 is a schematic side elevation view of another example of the disclosed landing stability apparatus.
Figure 17:
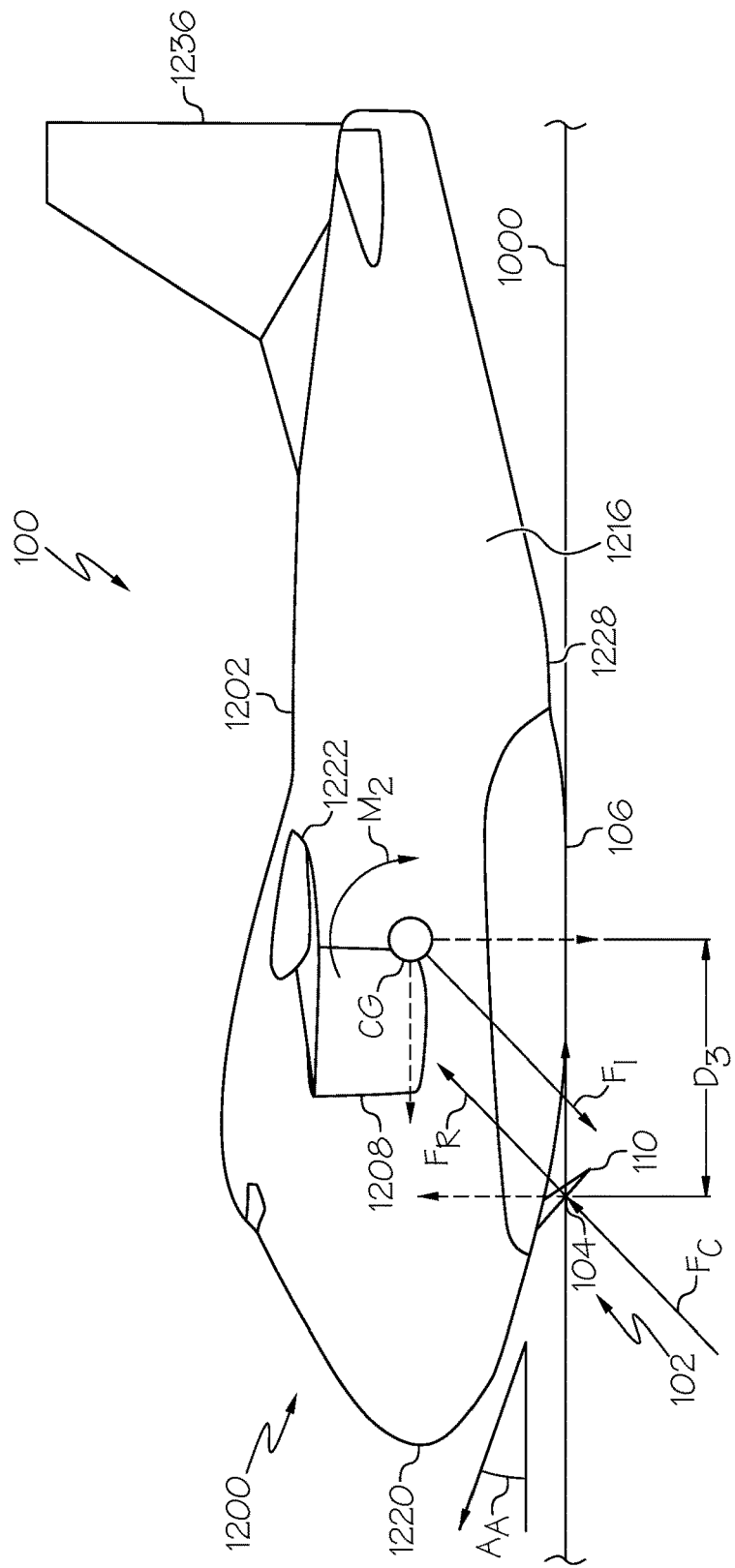
FIG. 17 is a schematic side elevation view of the landing stability apparatus of FIG. 15 illustrating the aircraft making an emergency landing.

Referring to FIGS. 15-17, and with reference to FIG. 3, in one example, the emergency landing stability system 100 also includes the skid 110 deployable from the forward portion 116 of each one of the pair of sponsons 106. The secondary contact surface 104 is located on the skid 110.

Referring to FIG. 17, and with reference to FIG. 15, the location of the skid 110 may improve the pitch stability during the ditching water landing so that the likelihood of the flip-over event is reduced. As the aircraft 1200 begins to rotate forward, the water contacts the skid 110 at a location (the secondary contact surface 104) further forward of the center of gravity CG (e.g., compared to the baseline aircraft 1300 illustrated in FIG. 1, the lengthened sponsons 106 illustrated in FIGS. 4 and 11 and the further lengthened sponsons 106 illustrated in FIGS. 6 and 12). The secondary contact surface 104 being located even further forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location even further forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

Referring to FIG. 15, and with reference to FIG. 3, in one example, the skid 110 includes a skid-underside surface 134. The secondary contact surface 104 is located on the skid-underside surface 134. The skid-underside surface 134 defines a skid-profile shape. When deployed, the skid 110 includes (e.g., the skid-profile shape forms) a non-zero angle of incidence $A_I$. The particular angle of incidence $A_I$ of the skid-profile shape of the skid-underside surface 134 may vary depending on numerous aerodynamic and/or hydrodynamic factors. As one example, angle of incidence $A_I$ is approximately 45-degrees. As another example, angle of incidence $A_I$ is less than approximately 45-degrees. When retracted, the skid 110 (e.g., the skid-profile shape) forms at least a portion of the sponson-profile shape. When retracted, the skid-underside surface 134 may form at least a portion of the forward portion-underside surface 120 of the sponson 106.

The skid 110 may be structurally connected to and supported by the support frame 1224 of the airframe 1202. Structurally connecting the sponsons 106 and the skid 110 to the support frame 1224 may offer weight advantages as the support frame 1224 serves as the backup structure for both components. Structurally connecting the skid 110 to the support frame 1224 may provide sufficient structural robustness to the skid 110 to sustain the forces applied to the skid 110 upon contact (e.g., impact) with the landing surface 1000 during the emergency landing.

The emergency landing stability system 100 may also include a skid actuation system (not explicitly illustrated) operably coupled to the skid 110 for deploying and retracting the skid 110.

Figure 18:
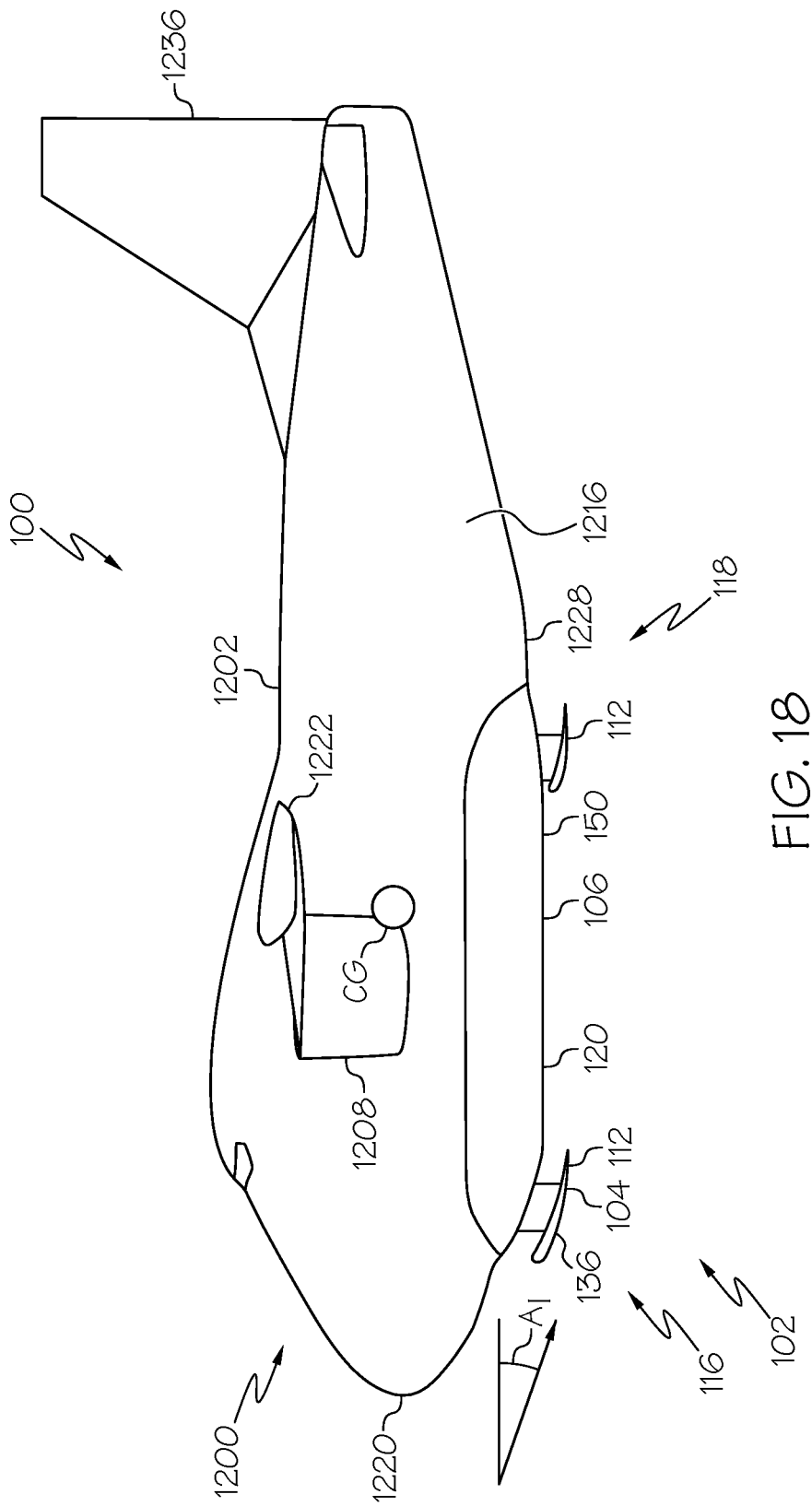
FIG. 18 is a schematic side elevation view of another example of the disclosed landing stability apparatus.
Figure 20:
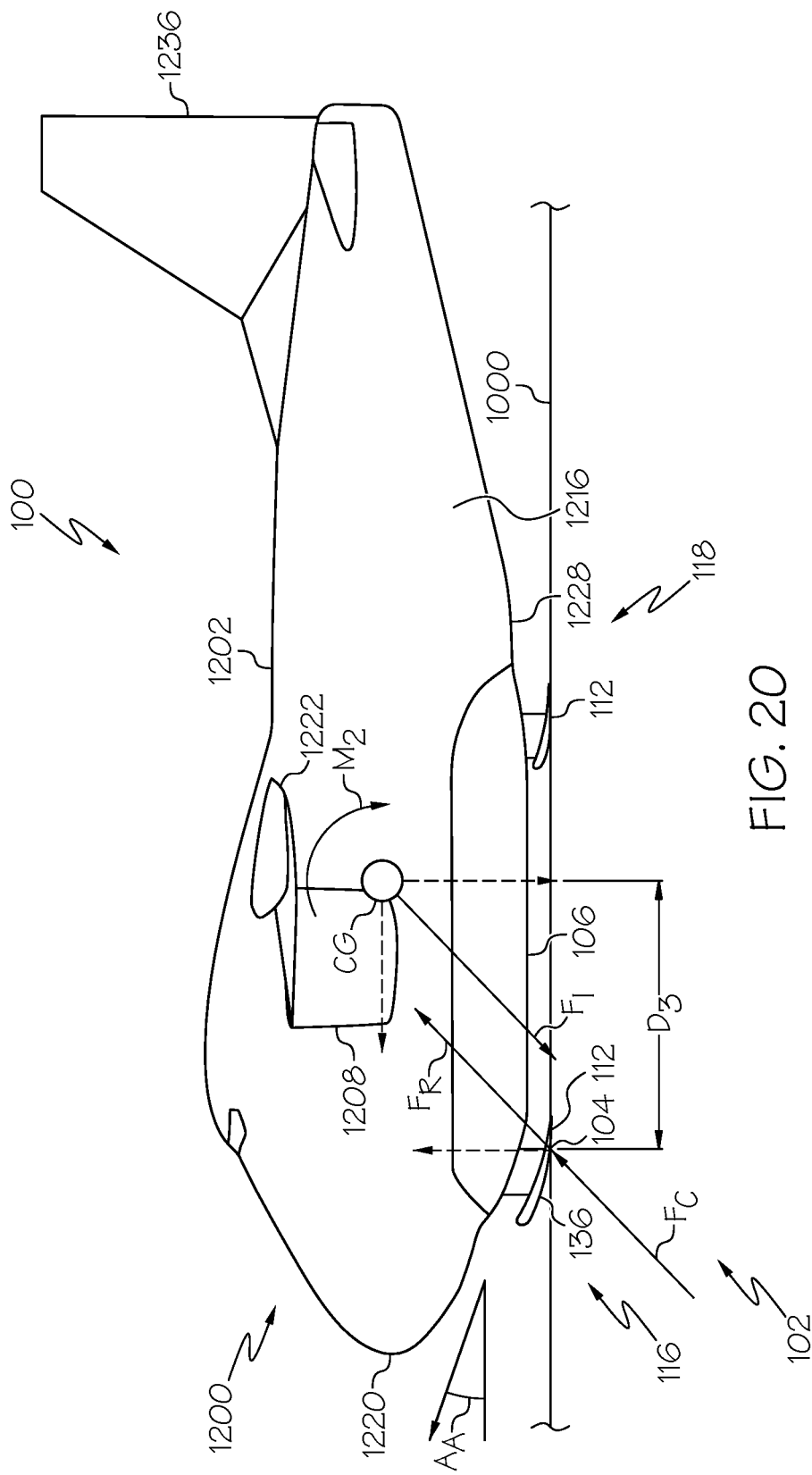
FIG. 20 is a schematic side elevation view of the landing stability apparatus of FIG. 18 illustrating the aircraft making an emergency landing.

Referring to FIGS. 18-20, and with reference to FIG. 3, in one example, the emergency landing stability system 100 may also include a (e.g., a forward) ski 112 deployable from the forward portion 116 of each one of the pair of sponsons 106. The secondary contact surface 104 is located on the ski 112.

Referring to FIG. 20, and with reference to FIG. 18, the location of the ski 112 may improve the pitch stability during the ditching water landing so that the likelihood of the flip-over event is reduced. As the aircraft 1200 begins to rotate forward, the water contacts the ski 112 at a location (the secondary contact surface 104) further forward of the center of gravity CG (e.g., compared to the baseline aircraft 1300 illustrated in FIG. 1, the lengthened sponsons 106 illustrated in FIGS. 4 and 11 and the further lengthened sponsons 106 illustrated in FIGS. 6 and 12). The secondary contact surface 104 being located even further forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location even further forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

In one example, the ski 112 includes a ski-underside surface 136. The secondary contact surface 104 is located on the ski-underside surface 136. The ski-underside surface 136 defines a ski-profile shape. When deployed, the ski 112 includes (e.g., the ski-profile shape forms) a non-zero angle of incidence $A_I$. The particular angle of incidence $A_I$ of the ski-profile shape of the ski-underside surface 136 may vary depending on numerous aerodynamic and/or hydrodynamic factors. As one example, angle of incidence $A_I$ is approximately 30-degrees. As another example, angle of incidence $A_I$ is less than approximately 30-degrees. When retracted, the ski 112 (e.g., the ski-profile shape) forms at least a portion of the sponson-profile shape. When retracted, the ski-underside surface 136 of the forward ski 112 may form at least a portion of the forward portion-underside surface 120 of the sponson 106.

The emergency landing stability system 100 may also include another (e.g., an aft) ski 112 deployable from the aft portion 118 of each one of the pair of sponsons 106. When retracted, the another ski 112 (e.g., the ski-profile shape) may form at least a portion of the sponson-profile shape. When retracted, the ski-underside surface 136 of the aft ski 112 may form at least a portion of the aft portion-underside surface 150 of the sponson 106.

The ski 112 (e.g., the forward and aft skis 112) may be structurally connected to and supported by the support frame 1224 of the airframe 1202. Structurally connecting the sponsons 106 and the ski 112 to the support frame 1224 may offer weight advantages as the support frame 1224 serves as the backup structure for both components. Structurally connecting the ski 112 to the support frame 1224 may provide sufficient structural robustness to the ski 112 to sustain the forces applied to the ski 112 upon contact (e.g., impact) with the landing surface 1000 during the emergency landing.

The emergency landing stability system 100 may also include a ski actuation system (not explicitly illustrated) operably coupled to the ski 112 for deploying and retracting the ski 112.

Figure 21:
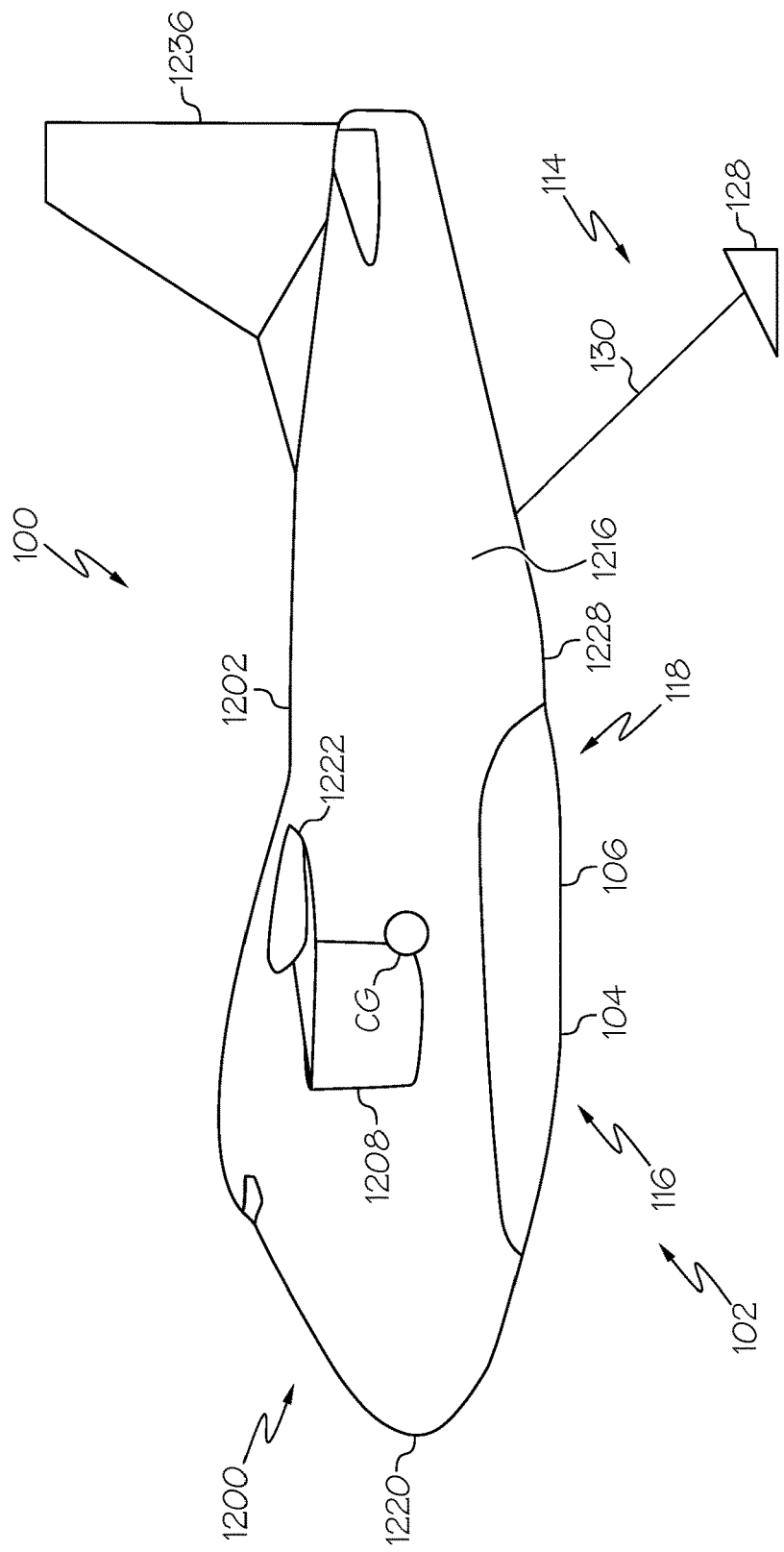
FIG. 21 is a schematic side elevation view of another example of the disclosed landing stability apparatus.
Figure 22:
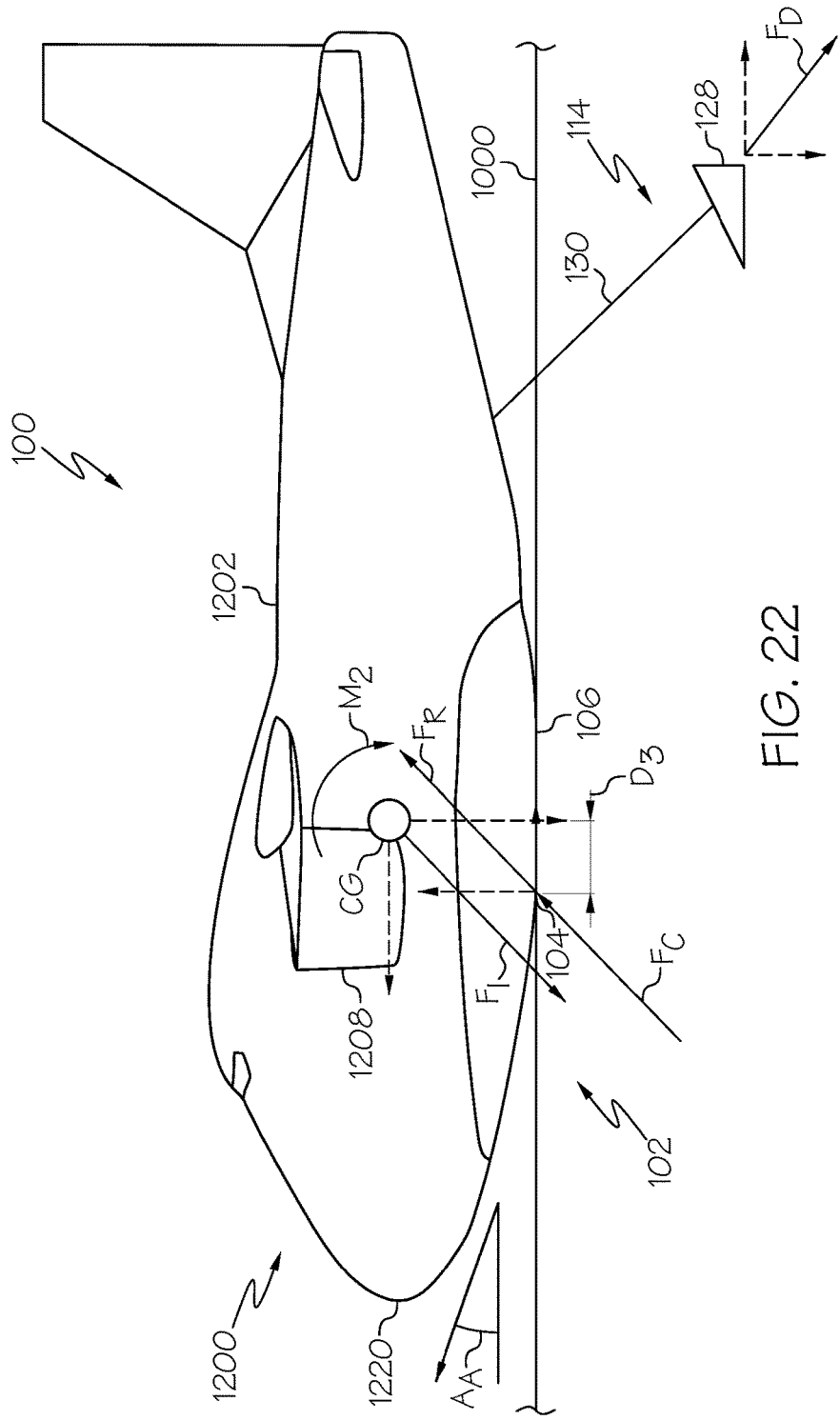
FIG. 22 is a schematic side elevation view of the landing stability apparatus of FIG. 21 illustrating the aircraft making an emergency landing.

Referring to FIGS. 21 and 22, and with reference to FIG. 3, in one example, the emergency landing stability system 100 also includes at least one hydrodynamic drag element 128, and at least one tension cable 130 interconnecting the hydrodynamic drag element 128 to the fuselage 1216 (aircraft 1200). The hydrodynamic drag element 128 includes a shape configured to produce a hydrodynamic force $F_D$ (FIG. 22) acting downwardly and sufficient to create the nose-up pitching moment $M_2$ (FIG. 22).

Referring to FIGS. 23 and 24, and with reference to FIGS. 3 and 5, in one example, each one of the pair of sponsons 106 defines the interior volume 132. The interior volume 132 is sufficient to accommodate at least one cargo container 1002.

The internal volume 132 of the sponsons 106 may be sufficient to enclose at least one cargo container 1002. As one example, the cargo container 1002 may be any one of various container types of a unit load device (ULD). As examples, the ULD may include LD-1, LD-2, etc. For example, each one of the sponsons 106 may have a length of approximately twenty feet, which may define the interior volume 132 sufficient to accommodate eight LD-3 cargo containers.

Each one of the sponsons 106 may include at least one cargo door (not explicitly illustrated). The cargo door may be located on a side of the sponsons to accommodate side loading of the cargo containers 1002 within the interior volume 132 of the sponsons 106 (e.g., by a forklift).

Figure 25:
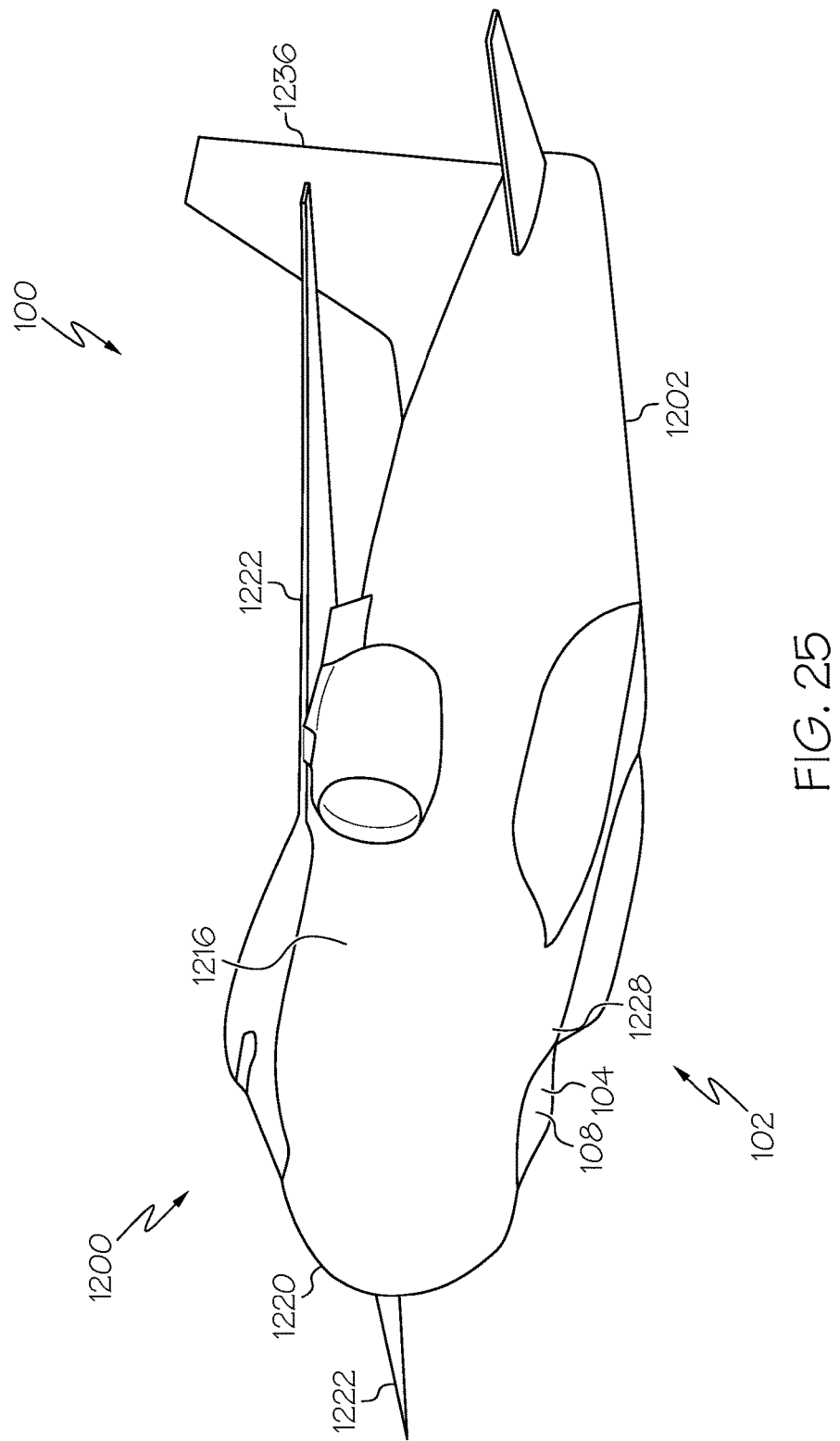
FIG. 25 is a schematic side and bottom perspective view of the landing stability apparatus of FIG. 6.
Figure 26:
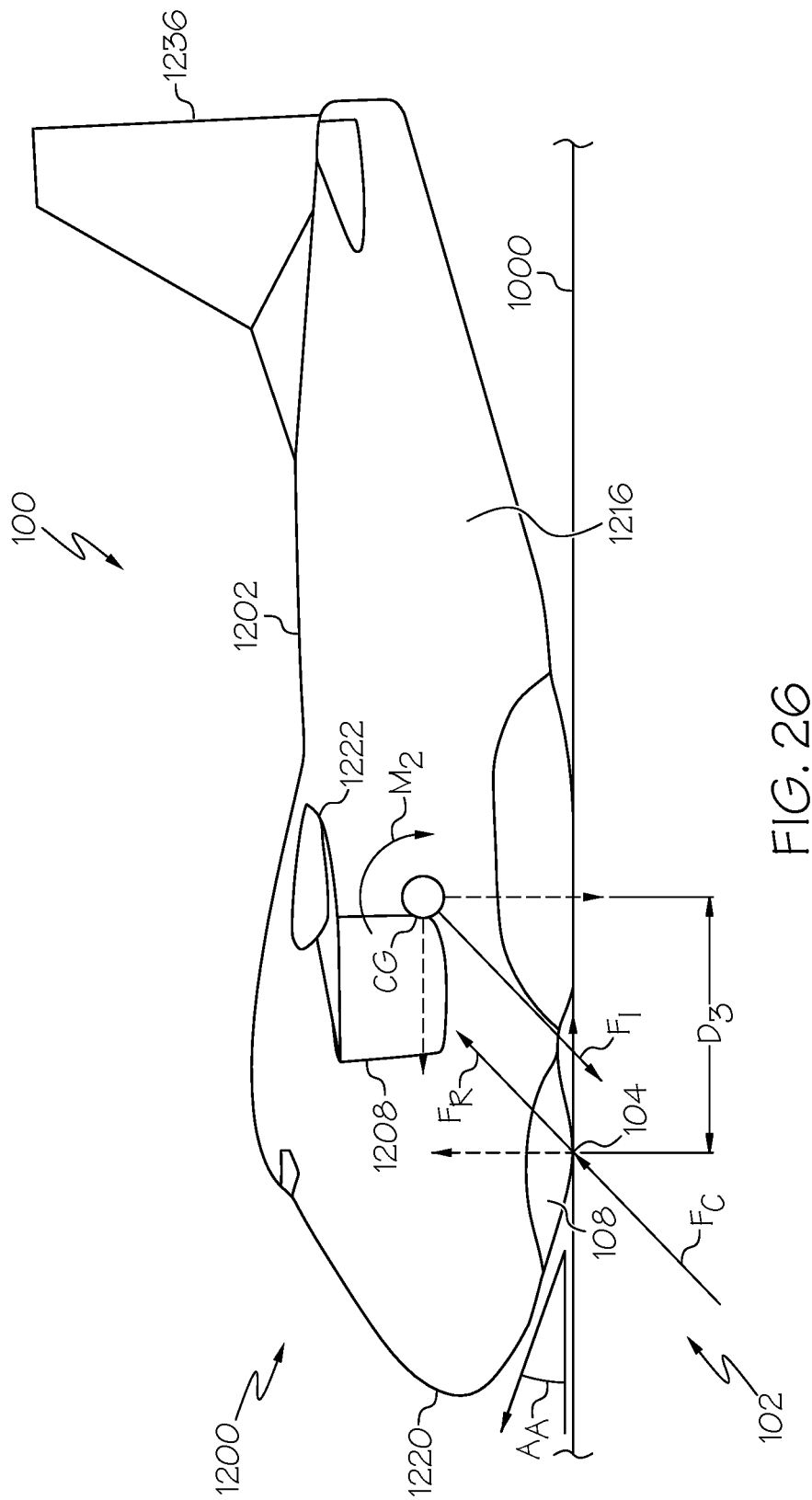
FIG. 26 is a schematic side elevation view of the landing stability apparatus of FIG. 6 illustrating the aircraft making an emergency landing.

Referring to FIGS. 6, 25 and 26, and with reference to FIG. 3, in one example, the emergency landing stability system 100 includes the aircraft 1200 including the fuselage 1216 and the landing gear 1218. The emergency landing stability system 100 also includes the blister 108 projecting downwardly from the fuselage-underside surface 1228 of the fuselage 1216 (aircraft 1200) proximate to the nose 1220. The blister 108 locates the secondary contact surface 104 of the aircraft 1200 forward of the center of gravity CG of the aircraft 1200 to mitigate the nose-down pitching moment $M_1$ of the aircraft 1200 created in response to contact with the landing surface 1000 during the emergency landing.

Referring to FIG. 26, and with reference to FIG. 6, the location of the blister 108 may improve the pitch stability during the ditching water landing so that the likelihood of the flip-over event is reduced. As the aircraft 1200 begins to rotate forward, the water contacts the blister 108 at a location (the secondary contact surface 104) even further forward of the center of gravity CG (compared to the baseline aircraft 1300 illustrated in FIG. 1, the lengthened sponsons 106 illustrated in FIGS. 4 and 11 and the further lengthened sponsons 106 illustrated in FIGS. 6 and 12). The secondary contact surface 104 being located even further forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location even further forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

Referring to FIGS. 6, 25 and 26, the blister 108 may be located further forward (e.g., proximate to the nose 1220) or further aft. The shape and/or location of the blister 108 may also be such that it extends into the nose area. Moving the location of the secondary contact surface 104 provided by the blister 108 further forward may further reduce the contact force $F_C$ (FIG. 26) resulting from the nose-down pitching moment $M_1$ caused by the inertial force $F_I$ of the aircraft 1200 acting through the center of gravity CG.

The shape of the blister 108 may be sized such that the aircraft cross section approximates the "area rule." For example, if the cross sectional area of the aircraft 1200 varies gradually with the longitudinal axis of the aircraft 1200, induced drag may be reduced. The cross sectional area of the blister 108 may be sized such that the shape of the blister 108 aft of the nose landing gear 1230 may decrease at a rate such that the increase in cross sectional area of the main landing gear sponsons (not explicitly identified) and the wing result in a gradually varying aircraft cross sectional area.

In one example, the blister 108 locates the secondary contact surface 104 sufficiently forward (by distance $D_3$) of the center of gravity CG of the aircraft 1200 to mitigate (e.g., counter) the nose-down pitching moment $M_1$ (FIG. 11). In one example, the blister 108 is located forward of the center of gravity CG of the aircraft 1200. The secondary contact surface 104 is located on the blister 108. As described herein above, the particular distance $D_3$ of the secondary contact surface 104 forward of the center of gravity CG by the blister 108 may vary depending on numerous factors. Generally, the distance $D_3$ of the secondary contact surface 104 forward of the center of gravity CG is sufficient to locate a contact force $F_C$ forward of the center of gravity CG, such that the reaction force $F_R$ passes forward of the center of gravity CG.

Figure 27:
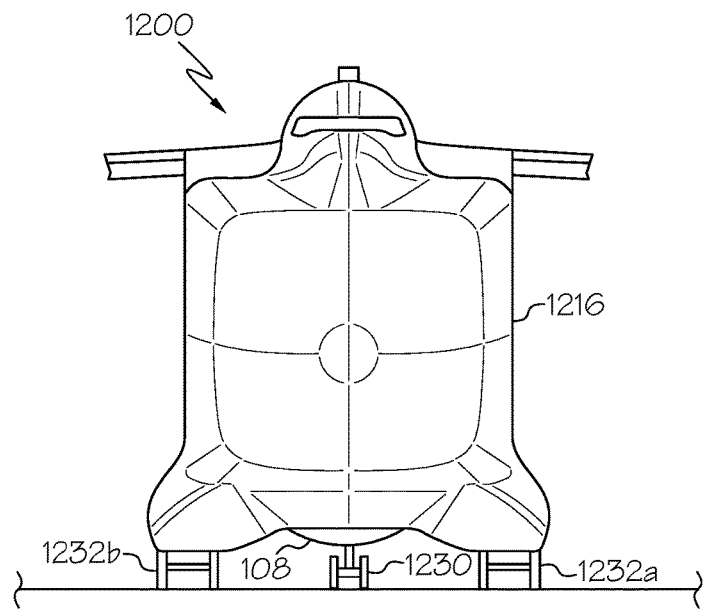
FIG. 27 is a schematic partial front view of the landing stability apparatus of FIG. 6 illustrating one example of the landing gear of the aircraft.
Figure 28:
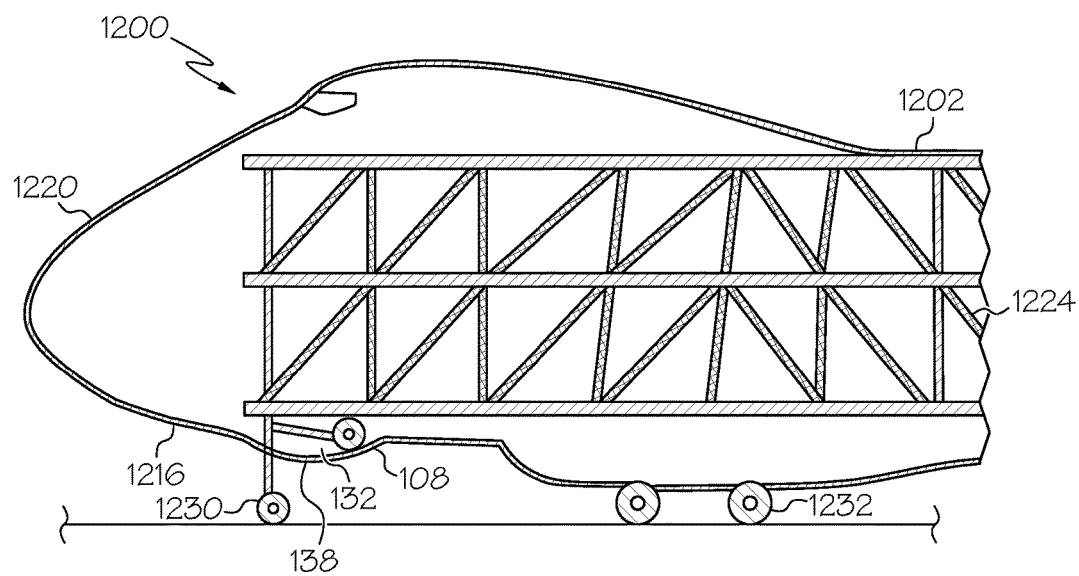
FIG. 28 is a schematic partial side elevation view, in section, of the landing stability apparatus of FIG. 4 illustrating one example of the support structure of the aircraft.

Referring to FIGS. 27 and 28, and with reference to FIGS. 3, 6, 25 and 26, in one example, the landing gear 1218 includes a single (e.g., one) nose landing gear 1230. The blister 108 accommodates the nose landing gear 1230.

The blister 108 may include the interior volume 132. The interior volume 132 of the blister 108 may be shaped and sized to provide sufficient space to accommodate the nose landing gear 1230, when retracted. The nose landing gear 1230 may swing or pivot in the aft direction, when retracted into the blister 108, and swing or pivot in the forward direction, when deployed from the blister 108.

Referring to FIG. 28, and with reference to FIGS. 3, 6 and 25-28, in one example, the blister 108 is integral to the fuselage 1216.

The blister 108 may include (e.g., may be formed from) one or more blister skin panels (not explicitly illustrated). The blister skin panels may be integrated with (e.g., joined to) one or more fuselage skin panels (not explicitly illustrated) forming the fuselage 1216.

Referring to FIG. 28, and with reference to FIGS. 3, 6 and 25-28, in one example, blister 108 is structurally connected to the airframe 1202. The nose landing gear 1230 is structurally connected to the airframe 1202.

Referring to FIG. 28, and with reference to FIGS. 3, 6 and 25-28, in one example, the blister 108 is structurally connected to the airframe 1202. The nose landing gear 1230 is structurally connected to the airframe 1202.

The blister 108 may be structurally connected to and supported by the support frame 1224 of the airframe 1202. The nose landing gear 1230 may be structurally connected to and supported by the support frame 1224 of the airframe 1202. Structurally connecting the blister 108 and the landing gear 1218 to the support frame 1224 may offer weight advantages as the support frame 1224 serves as the backup structure for both components. Structurally connecting the sponsons 106 to the support frame 1224 may provide sufficient structural robustness to the sponsons 106 to sustain the forces applied to the sponsons 106 upon contact (e.g., impact) with the landing surface 1000 during the emergency landing.

Additionally, a blister-underside surface 138 may include landing gear doors (not explicitly illustrated) for deployment of the nose landing gear 1230. The landing gear doors may be structurally interconnected to the support frame 1224 to provide sufficient robustness to the blister 108 to sustain the forces applied to the sponsons 106 upon contact with the landing surface 1000.

Referring to FIG. 6, since the blister 108 project below the bottom of the aircraft 1200 (e.g., from the fuselage-underside surface 1228), the blister 108 may act similar to a water ski to provide hydrodynamic lift sufficient to support the aircraft 1200 during at least a portion of the touch-down sequence of the ditching water landing (e.g., at least the higher-speed portion). Thus, the blister 108 may prevent the fuselage skin panels from contacting the landing surface 1000 (e.g., water), at least during the higher-speed portion of the ditching water landing, and may support the aircraft 1200 above the water surface upon landing. As such, at least a portion of the fuselage skin panels forming the fuselage-underside surface 1228 may be lightweight since they will not be required to sustain impact or support the aircraft 1200 on the water.

Referring to FIGS. 6, and with reference to FIG. 26, in one example, the blister 108 includes the blister-underside surface 138. The secondary contact surface 104 is located on the blister-underside surface 138.

Referring to FIGS. 6, and with reference to FIG. 26, in one example, the blister-underside surface 138 may be structurally reinforced to withstand the contact force $F_C$ (FIG. 26) applied to the blister 108 in response to contact with the landing surface 1000.

It can be appreciated that ditching loads (e.g., water contact loads) may be extremely high pressure. Furthermore, the surface area of the blister 108 that makes secondary contact with the water at high-pressure loads (e.g., the secondary contact surface 104) is small relative to the entire fuselage-underside surface 1228. Accordingly, any weight penalty for reinforcing the blister-underside surface 138 is much smaller than that of reinforcing the entire fuselage-underside surface 1228, thereby affording additional weight advantages.

Referring to FIGS. 6, and with reference to FIG. 3, in one example, the blister-underside surface 138 at least partially defines a blister-profile shape. The blister-profile shape includes a non-zero angle of incidence $A_I$. The particular angle of incidence $A_I$ of the blister-profile shape of the blister-underside surface 138 may vary depending on numerous aerodynamic and/or hydrodynamic factors.

In one example, the blister-underside surface 138 includes the high friction surface. The high friction surface may be advantageous to reduce the velocity of the aircraft 1200 following impact with the landing surface 1000. The high friction surface may be particularly advantageous during forced ground landings to reduce the velocity of the aircraft 1200 following impact with the ground.

Referring to FIG. 6, and with reference to FIG. 3, in one example, the blister 108 includes at least one blister-underside skin panel 140. The blister-underside skin panel 140 forming at least a portion of the blister-underside surface 138 may be structurally reinforced. The blister-underside skin panel 140 forming at least a portion of the blister-underside surface 138 may include the high friction surface.

Referring to FIG. 41, in one example, the blister-underside skin panel 140 includes the exterior layer 124 including the non-deformable, low friction material, and the interior layer 126 including the deformable, high friction material. The exterior layer 124 forms at least a portion of the blister-underside surface 138.

Figure 29:
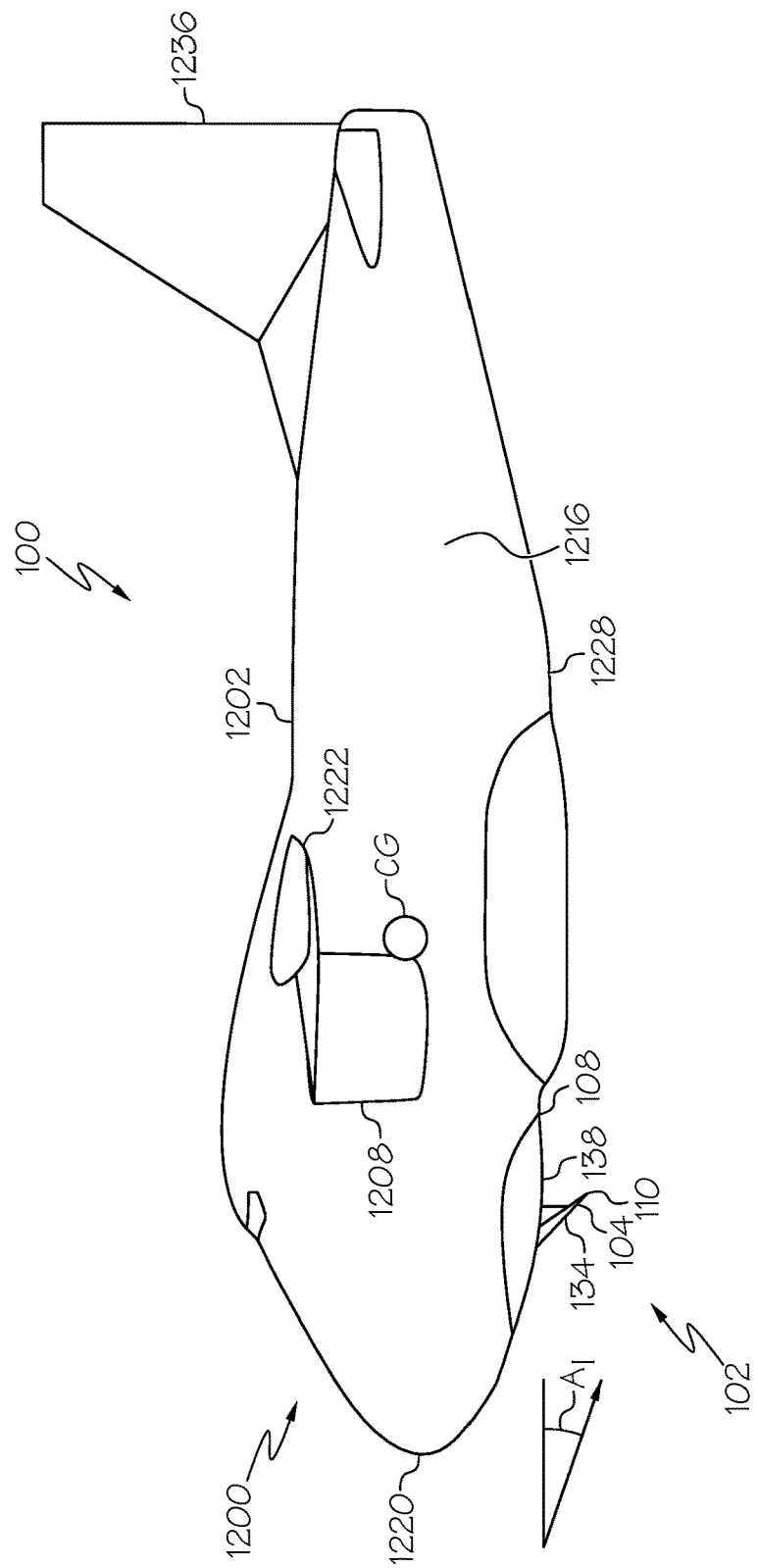
FIG. 29 is a schematic side elevation view of another example of the disclosed landing stability apparatus.
Figure 30:
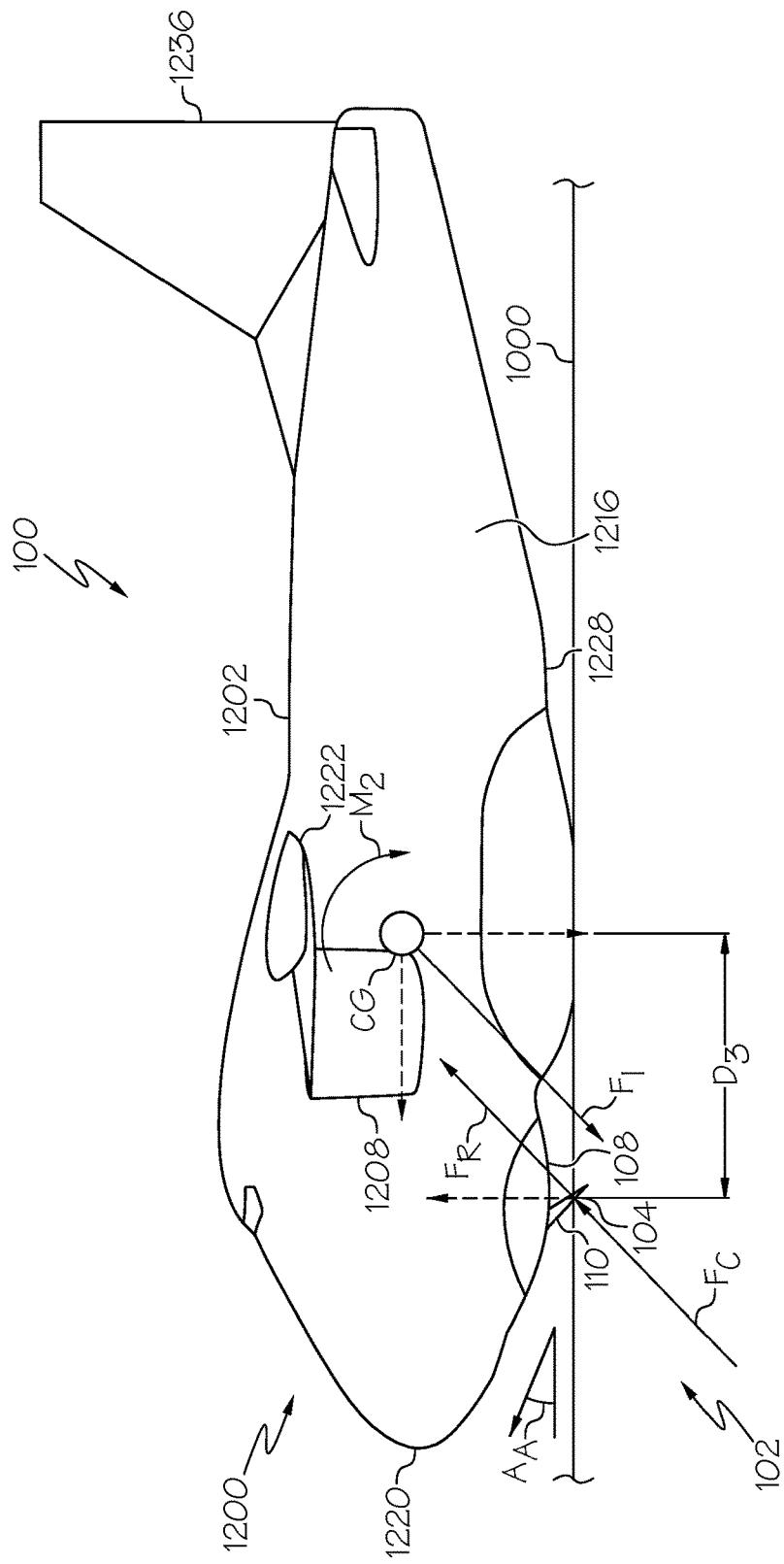
FIG. 30 is a schematic side elevation view of the landing stability apparatus of FIG. 29 illustrating the aircraft making an emergency landing.

Referring to FIGS. 29 and 30, and with reference to FIG. 3, in one example, the emergency landing stability system 100 also includes the skid 110 deployable from the blister 108. The secondary contact surface 104 is located on the skid 110.

Referring to FIG. 30, and with reference to FIG. 29, the location of the skid 110 may improve the pitch stability during the ditching water landing so that the likelihood of the flip-over event is reduced. As the aircraft 1200 begins to rotate forward, the water contacts the skid 110 at a location (the secondary contact surface 104) further forward of the center of gravity CG (e.g., compared to the baseline aircraft 1300 illustrated in FIG. 1, the lengthened sponsons 106 illustrated in FIGS. 4 and 11, the further lengthened sponsons 106 illustrated in FIGS. 6 and 12, the blister 108 illustrated in FIGS. 6 and 26, etc.). The secondary contact surface 104 being located even further forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location even further forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

Referring to FIG. 29, in one example, the skid 110 includes the skid-underside surface 134. The secondary contact surface 104 is located on the skid-underside surface 134. The skid-underside surface 134 defines the skid-profile shape. When deployed, the skid 110 includes (e.g., the skid-profile shape forms) a non-zero angle of incidence $A_I$. The particular angle of incidence $A_I$ of the skid-profile shape of the skid-underside surface 134 may vary depending on numerous aerodynamic and/or hydrodynamic factors. As one example, angle of incidence $A_I$ is approximately 45-degrees. As another example, angle of incidence $A_I$ is less than approximately 45-degrees. When retracted, the skid 110 (e.g., the skid-profile shape) forms at least a portion of the blister-profile shape. When retracted, the skid-underside surface 134 may form at least a portion of the blister-underside surface 138 of the blister 108.

The skid 110 may be structurally connected to and supported by the support frame 1224 of the airframe 1202. Structurally connecting the blister 108 and the skid 110 to the support frame 1224 may offer weight advantages as the support frame 1224 serves as the backup structure for both components.

Figure 31:
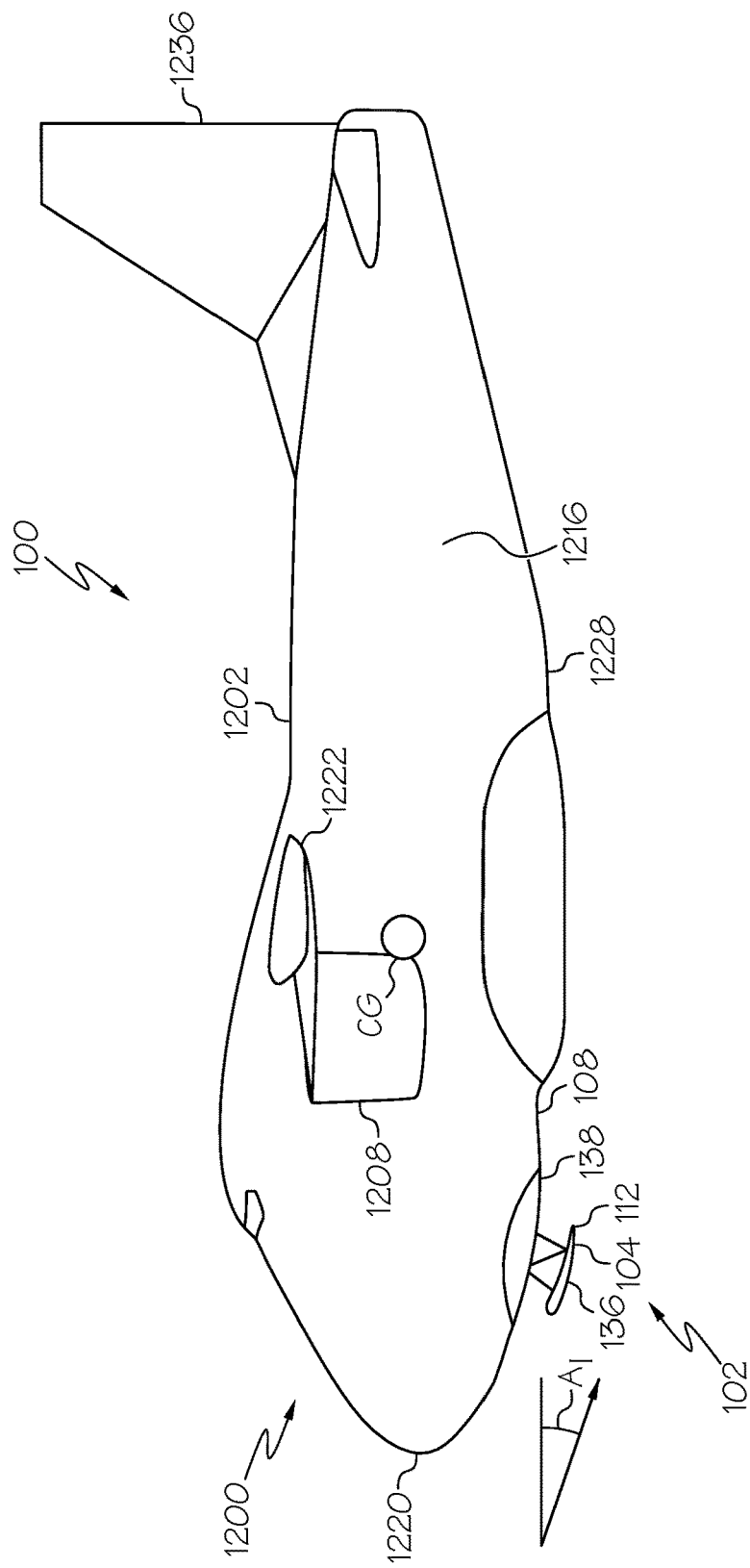
FIG. 31 is a schematic side elevation view of another example of the disclosed landing stability apparatus.
Figure 32:
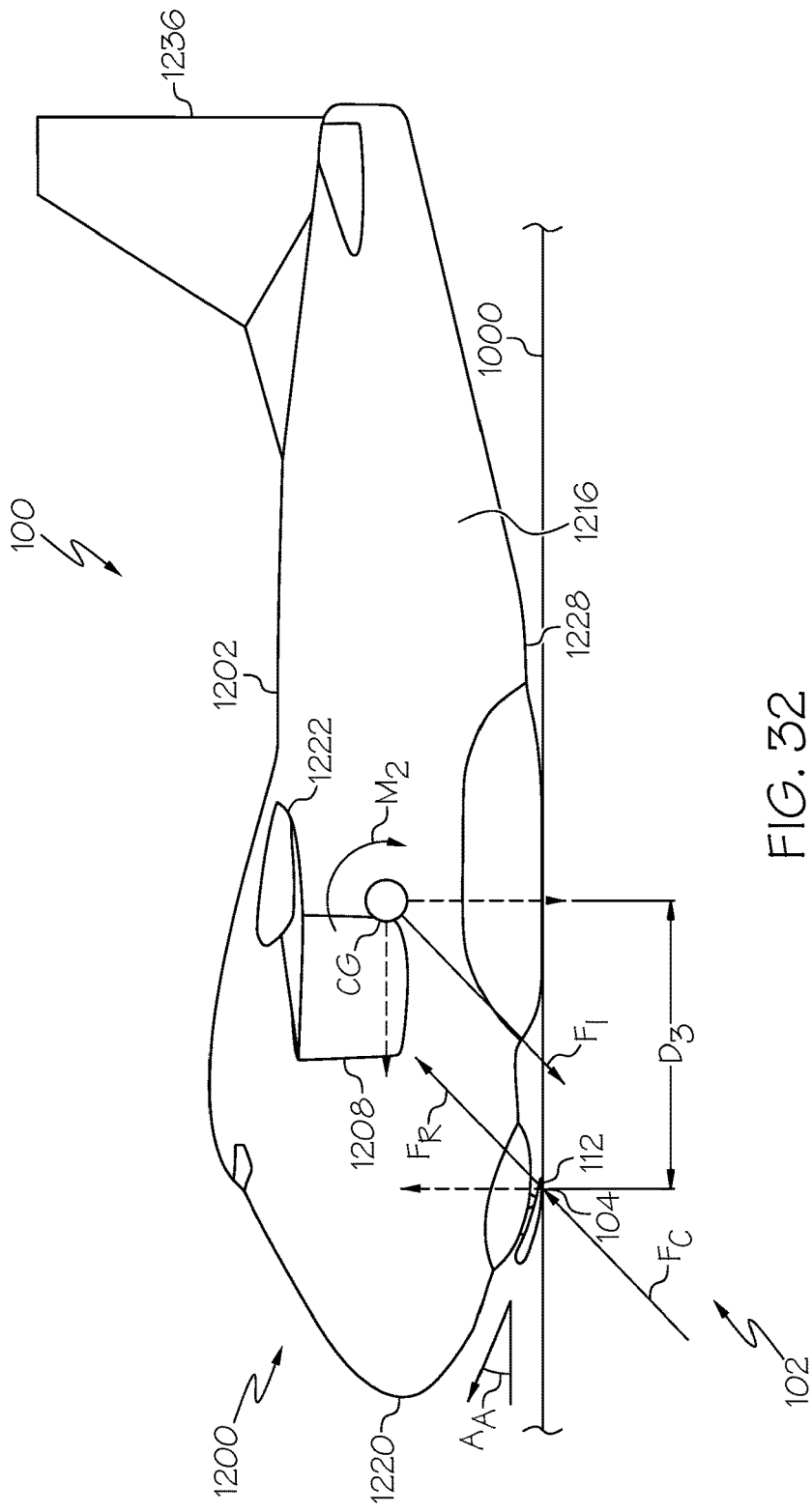
FIG. 32 is a schematic side elevation view of the landing stability apparatus of FIG. 31 illustrating the aircraft making an emergency landing.

Referring to FIGS. 31 and 32, and with reference to FIG. 3, in one example, the emergency landing stability system 100 also includes the ski 112 deployable from the blister 108. The secondary contact surface 104 is located on the ski 112.

Referring to FIG. 32, and with reference to FIG. 31, the location of the ski 112 may improve the pitch stability during the ditching water landing so that the likelihood of the flip-over event is reduced. As the aircraft 1200 begins to rotate forward, the water contacts the ski 112 at a location (the secondary contact surface 104) further forward of the center of gravity CG (e.g., compared to the baseline aircraft 1300 illustrated in FIG. 1, the lengthened sponsons 106 illustrated in FIGS. 4 and 11, the further lengthened sponsons 106 illustrated in FIGS. 6 and 12, the blister 108 illustrated in FIGS. 6 and 26, etc.). The secondary contact surface 104 being located even further forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location even further forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

Referring to FIG. 31, in one example, the ski 112 includes the ski-underside surface 136. The secondary contact surface 104 is located on the ski-underside surface 136. The ski-underside surface 136 defines the ski-profile shape. When deployed, the ski 112 includes (e.g., the ski-profile shape forms) a non-zero angle of incidence $A_I$. The particular angle of incidence $A_I$ of the ski-profile shape of the ski-underside surface 136 may vary depending on numerous aerodynamic and/or hydrodynamic factors. As one example, angle of incidence $A_I$ is approximately 30-degrees. As another example, angle of incidence $A_I$ is less than approximately 30-degrees. When retracted, the ski 112 (e.g., the ski-profile shape) forms at least a portion of the blister-profile shape. When retracted, the ski-underside surface 136 may form at least a portion of the blister-underside surface 138 of the blister 108.

The ski 112 may be structurally connected to and supported by the support frame 1224 of the airframe 1202. Structurally connecting the blister 108 and the ski 112 to the support frame 1224 may offer weight advantages as the support frame 1224 serves as the backup structure for both components.

Figure 33:
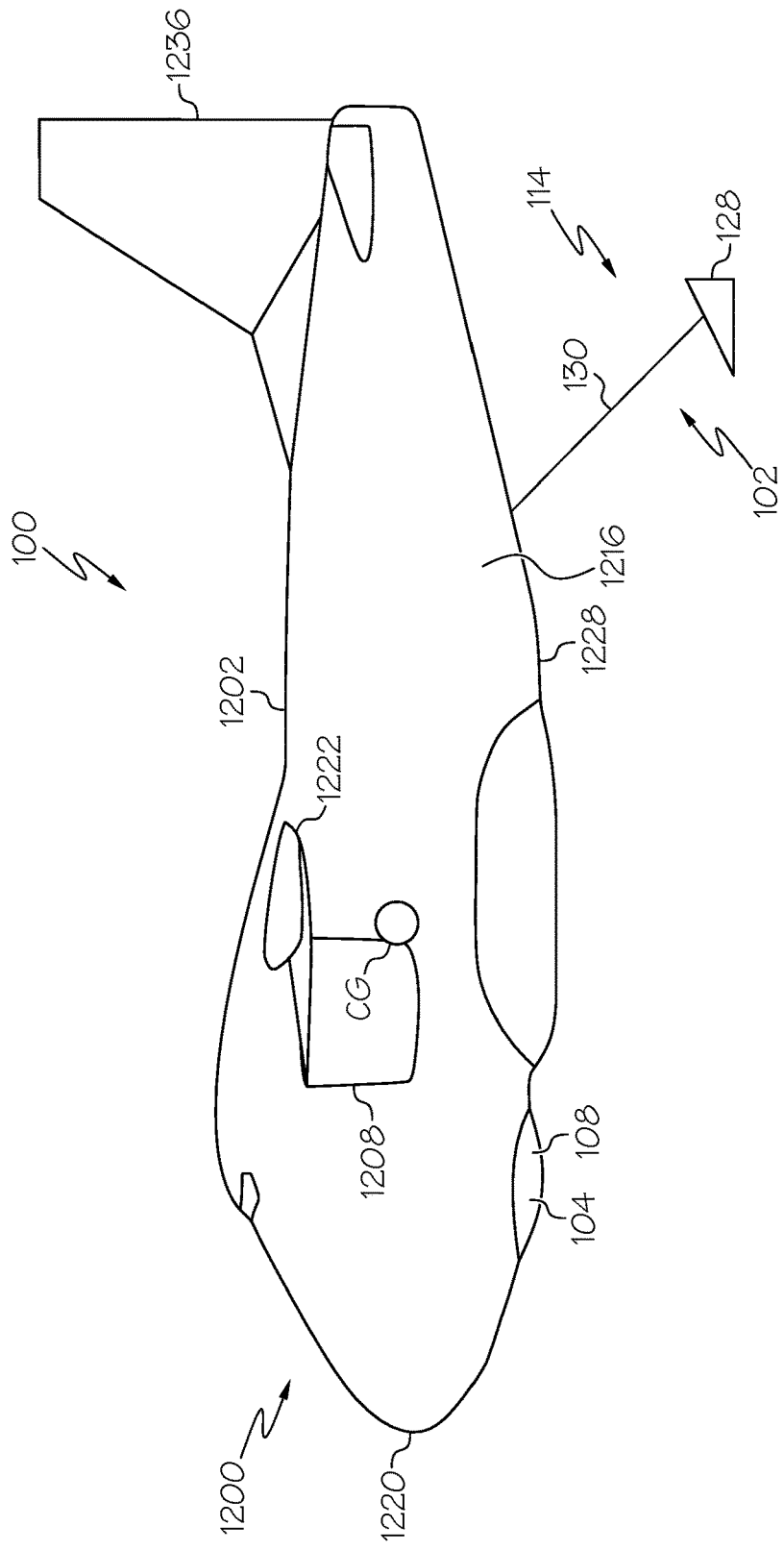
FIG. 33 is a schematic side elevation view of another example of the disclosed landing stability apparatus.
Figure 34:
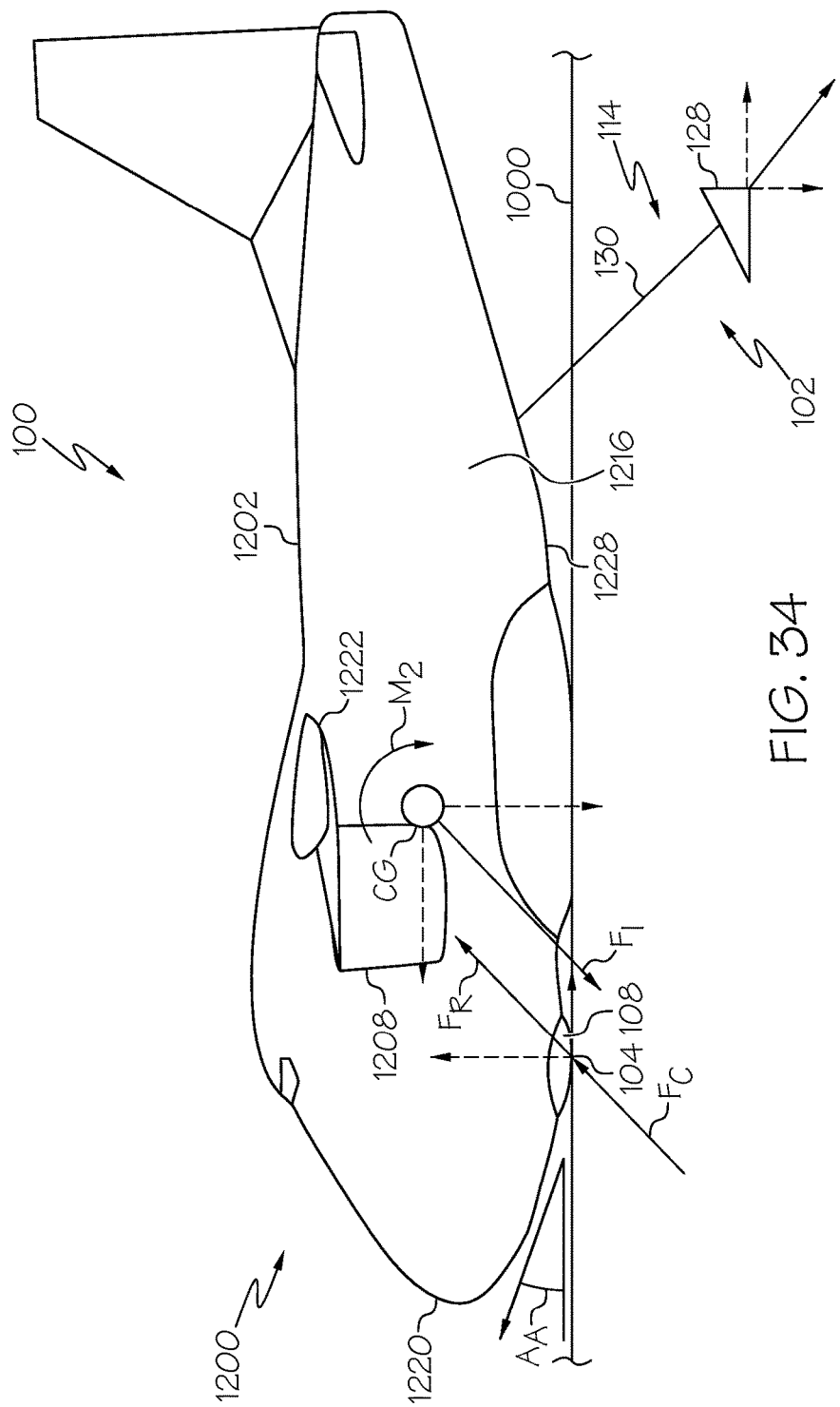
FIG. 34 is a schematic side elevation view of the landing stability apparatus of FIG. 33 illustrating the aircraft making an emergency landing.

Referring to FIGS. 33 and 34, and with reference to FIG. 3, in one example, the emergency landing stability system 100 also includes at least one hydrodynamic drag element 128, and at least one tension cable 130 interconnecting the hydrodynamic drag element 128 to the fuselage 1216 (aircraft 1200). The hydrodynamic drag element 128 includes a shape configured to produce the hydrodynamic force $F_D$ (FIG. 34) acting downwardly and sufficient to create the nose-up pitching moment $M_2$ (FIG. 34).

Figure 36:
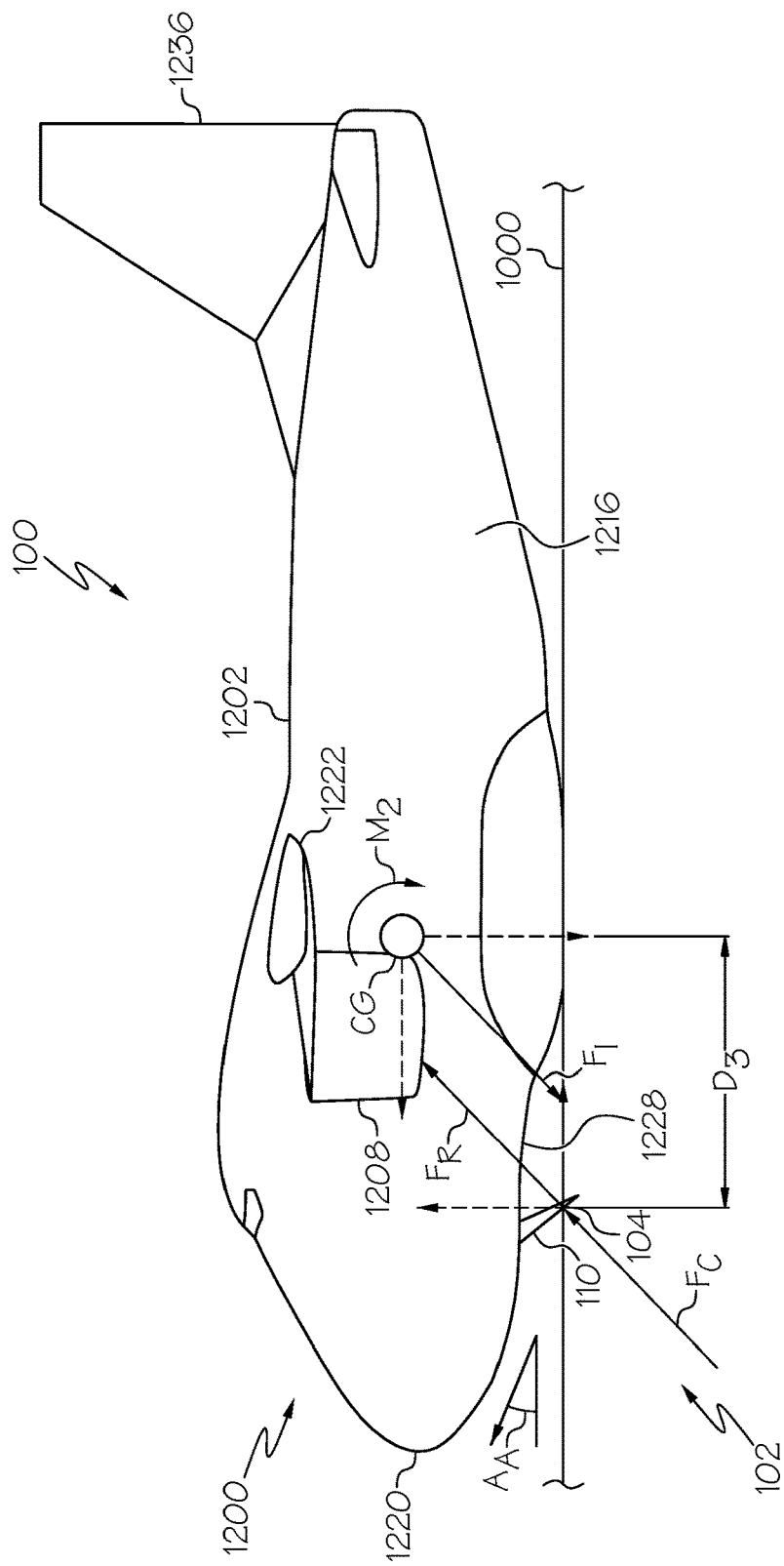
FIG. 36 is a schematic side elevation view of the landing stability apparatus of FIG. 7 illustrating the aircraft making an emergency landing.

Referring to FIGS. 7, 35 and 36, and with reference to FIG. 3, in one example, the emergency landing stability system 100 includes the aircraft 1200 including the fuselage 1216 and the landing gear 1218. The emergency landing stability system 100 also includes the skid 110 deployable from the fuselage-underside surface 1228 of the fuselage 1216 (aircraft 1200).

Referring to FIG. 36, and with reference to FIG. 7, in one example, the skid 110 locates the secondary contact surface 104 of the aircraft 1200 forward of the center of gravity CG of the aircraft 1200 to mitigate the nose-down pitching moment $M_1$ of the aircraft 1200 created in response to contact with the landing surface 1000 during the emergency landing.

The skid 110 may be structurally connected to and supported by the support frame 1224 of the airframe 1202. Structurally connecting the skid 110 to the support frame 1224 may offer weight advantages as the support frame 1224 serves as the backup structure. Structurally connecting the skid 110 to the support frame 1224 may provide sufficient structural robustness to the skid 110 to sustain the forces applied to the skid 110 upon contact (e.g., impact) with the landing surface 1000 during the emergency landing. The skid 110 may be connected to the fuselage 1216 (e.g., the support frame 1224) at a hinge joint such that the skid 110 swings downward.

Referring to FIG. 36, the location of the skid 110 may improve the pitch stability during the ditching water landing so that the likelihood of the flip-over event is reduced. As the aircraft 1200 begins to rotate forward, the water contacts the skid 110 at a location (the secondary contact surface 104) forward of the center of gravity CG. The secondary contact surface 104 being located forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

In one example, the skid 110 is located forward of the center of gravity CG of the aircraft 1200. The secondary contact surface 104 is located on the skid 110. As one example, the skid 110 may be located proximate to the nose 1220 of the aircraft 1200.

In one example, the skid 110 locates the secondary contact surface 104 sufficiently forward (by distance $D_3$) of the center of gravity CG of the aircraft 1200 to mitigate (e.g., counter) the nose-down pitching moment $M_1$, for example, even overcoming the nose-down pitching moment $M_1$ by creating the nose-up pitching moment $M_2$. As described herein above, the particular distance $D_3$ of the secondary contact surface 104 forward of the center of gravity CG by the skid 110 may vary depending on numerous factors. Generally, the distance $D_3$ of the secondary contact surface 104 forward of the center of gravity CG is sufficient to locate a contact force $F_C$ forward of the center of gravity CG, such that the reaction force $F_R$ passes forward of the center of gravity CG.

Referring to FIG. 7, and with reference to FIG. 36, in one example, the skid 110 includes the skid-underside surface 134. In one example, the skid-underside surface 134 is structurally reinforced to withstand the contact force $F_C$ (FIG. 36) applied to the skid 110 in response to contact with the landing surface 1000. In one example, the skid-underside surface 134 defines the skid-profile shape. When deployed, the skid 110 includes (e.g., the skid-profile shape forms) a non-zero angle of incidence $A_I$. The particular angle of incidence $A_I$ of the skid-profile shape of the skid-underside surface 134 may vary depending on numerous aerodynamic and/or hydrodynamic factors. As one example, angle of incidence $A_I$ is approximately 45-degrees. As another example, angle of incidence $A_I$ is less than approximately 45-degrees. When retracted, the skid 110 (e.g., the skid-profile shape) forms a portion of a fuselage-profile shape of the aircraft 1200. When retracted, the skid-underside surface 134 may form at least a portion of the fuselage-underside surface 1228 of the aircraft 1200.

Referring to FIG. 7, in one example, the angle of incident $A_I$ is variable.

Referring to FIG. 7, and with reference to FIG. 3, in one example, the skid 110 includes at least one skid-underside skin panel 142.

Referring to FIG. 41, and with reference to FIG. 7, in one example, the skid-underside skin panel 142 includes the exterior layer 124 including the non-deformable, low friction material, and the interior layer 126 including the deformable, high friction material. The exterior layer 124 forms at least a portion of the skid-underside surface 134.

In one example, the skid-underside surface 134 includes the high friction surface.

Referring to FIG. 35, in one example, the emergency landing stability system 100 includes a pair of spaced apart and approximately parallel skids 110 deployable from the fuselage-underside surface 1228 of the fuselage 1216 (aircraft 1200). The pair of skids 110 locates the secondary contact surface 104 of the aircraft 1200 forward of the center of gravity CG of the aircraft 1200 to mitigate the nose-down pitching moment $M_1$ of the aircraft 1200 created in response to contact with the landing surface 1000 during the emergency landing.

Figure 38:
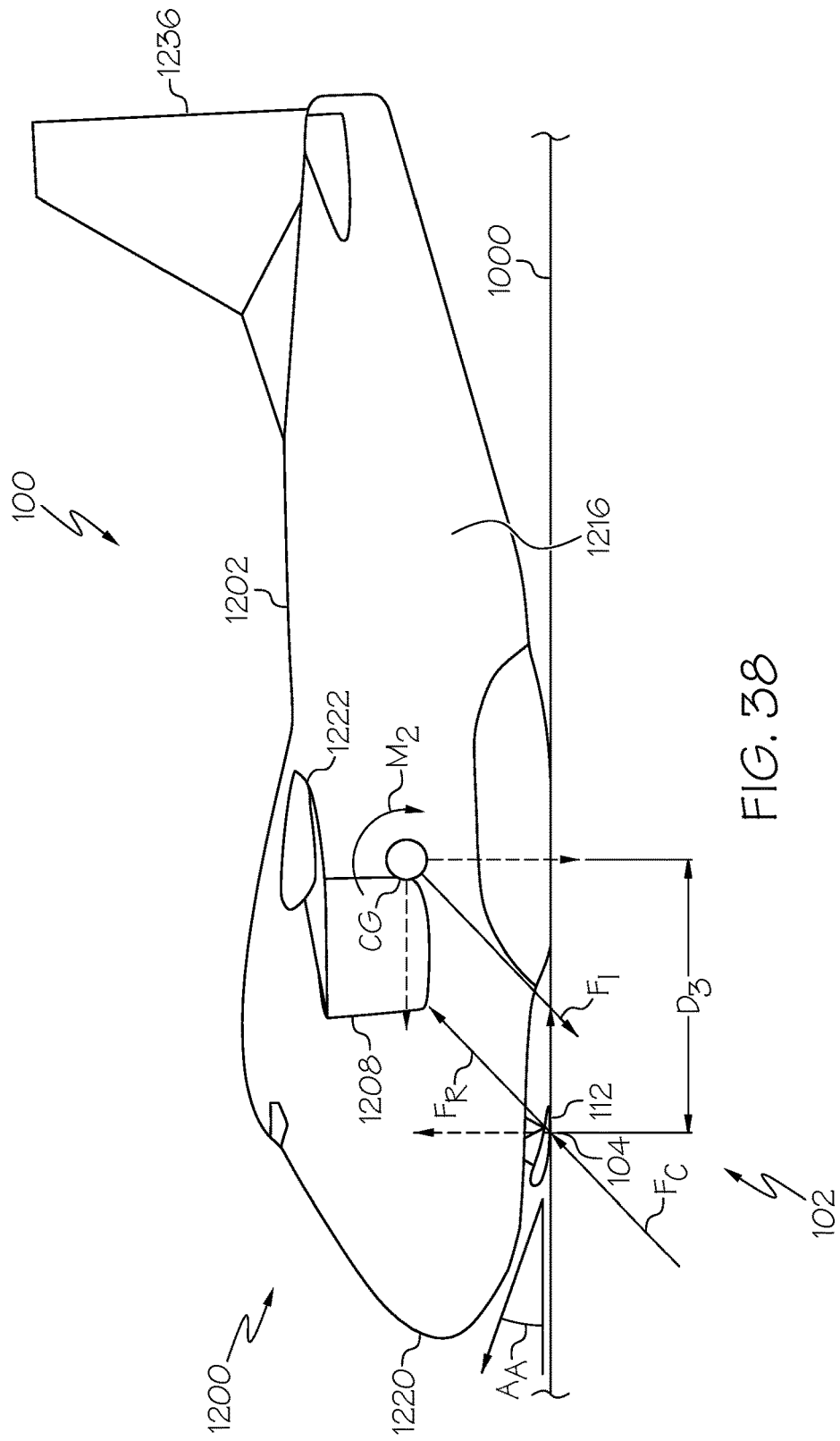
FIG. 38 is a schematic side elevation view of the landing stability apparatus of FIG. 8 illustrating the aircraft making an emergency landing.

Referring to FIGS. 8, 37 and 38, and with reference to FIG. 3, in one example, the emergency landing stability system 100 includes the aircraft 1200 including the fuselage 1216 and the landing gear 1218. The emergency landing stability system 100 also includes the ski 112 deployable from the fuselage-underside surface 1228 of the fuselage 1216 (aircraft 1200).

Referring to FIG. 38, and with reference to FIG. 8, in one example, the ski 112 locates the secondary contact surface 104 of the aircraft 1200 forward of the center of gravity CG of the aircraft 1200 to mitigate the nose-down pitching moment $M_1$ of the aircraft 1200 created in response to contact with the landing surface 1000 during the emergency landing.

The ski 112 may be structurally connected to and supported by the support frame 1224 of the airframe 1202.

Structurally connecting the ski 112 to the support frame 1224 may offer weight advantages as the support frame 1224 serves as the backup structure. Structurally connecting the skid 110 to the support frame 1224 may provide sufficient structural robustness to the skid 110 to sustain the forces applied to the skid 110 upon contact (e.g., impact) with the landing surface 1000 during the emergency landing. The ski 112 may be connected to the fuselage 1216 (e.g., the support frame 1224) by one or more springs (not explicitly illustrated) or another automatic deployment mechanisms. The springs may be secured, with the ski 112 in the retracted position, by one or more latches (not explicitly illustrated) configured to release the springs upon impact during an emergency landing and retain the springs during a normal landing. As one example, the landing stability system 100 includes one or more redundant latching mechanisms operably (releasably) coupled to the ski 112.

Referring to FIG. 38, the location of the ski 112 may improve the pitch stability during the ditching water landing so that the likelihood of the flip-over event is reduced. As the aircraft 1200 begins to rotate forward, the water contacts the ski 112 at a location (the secondary contact surface 104) forward of the center of gravity CG. The secondary contact surface 104 being located forward of the center of gravity CG, for example, by distance $D_3$, may cause the reaction force $F_R$, resulting from the upwardly acting hydrodynamic lift force (the vertical component) and the rearwardly acting drag force (the horizontal component), to pass through a location forward of the center of gravity CG of the aircraft 1200. This mitigates (e.g., reduces) the nose-down pitching moment $M_1$ and/or causes the nose-up pitching moment $M_2$, which is opposite to and overcomes the nose-down pitching moment $M_1$.

In one example, the ski 112 is located forward of the center of gravity CG of the aircraft 1200. The secondary contact surface 104 is located on the skid 110. As one example, the ski 112 may be located proximate to (e.g., deployable from) the nose 1220 of the aircraft 1200.

In one example, the ski 112 locates the secondary contact surface 104 sufficiently forward (by distance $D_3$) of the center of gravity CG of the aircraft 1200 to mitigate (e.g., counter) the nose-down pitching moment $M_1$, for example, even overcoming the nose-down pitching moment $M_1$ by creating the nose-up pitching moment $M_2$. As described herein above, the particular distance $D_3$ of the secondary contact surface 104 forward of the center of gravity CG by the ski 112 may vary depending on numerous factors. Generally, the distance $D_3$ of the secondary contact surface 104 forward of the center of gravity CG is sufficient to locate a contact force $F_C$ forward of the center of gravity CG, such that the reaction force $F_R$ passes forward of the center of gravity CG.

Referring to FIG. 8, and with reference to FIG. 38, in one example, the ski 112 includes the ski-underside surface 136. In one example, the ski-underside surface 136 is structurally reinforced to withstand the contact force $F_C$ (FIG. 38) applied to the ski 112 in response to contact with the landing surface 1000. In one example, the ski-underside surface 136 defines the ski-profile shape. When deployed, the ski 112 includes (e.g., the ski-profile shape forms) a non-zero angle of incidence $A_I$. The particular angle of incidence $A_I$ of the ski-profile shape of the ski-underside surface 136 may vary depending on numerous aerodynamic and/or hydrodynamic factors. As one example, angle of incidence $A_I$ is approximately 30-degrees. As another example, angle of incidence $A_I$ is less than approximately 30-degrees. When retracted, the ski 112 (e.g., the ski-profile shape) forms a portion of a fuselage-profile shape of the aircraft 1200. When retracted, the ski-underside surface 136 may form at least a portion of the fuselage-underside surface 1228 of the aircraft 1200.

Referring to FIG. 8, in one example, the angle of incident $A_I$ is variable. In one example, the ski 112 includes the foil shape. The ski 112 may also include other hydroplane shapes, which may be configured to produce more or less hydrodynamic lift and/or more or less hydrodynamic drag. More lift will allow the fuselage 1216 of the aircraft 1200 to remain elevated above the water at a lower speed until the fuselage skin panels forming the fuselage-underside surface 1228 contact the water. This characteristic may allow the fuselage skin panels to be designed for the lower hydrodynamic pressures that result from a lower speed.

Referring to FIG. 8, and with reference to FIG. 3, in one example, the ski 112 includes at least one ski-underside skin panel 144.

Referring to FIG. 41, in one example, the ski-underside skin panel 144 includes the exterior layer 124 including the non-deformable, low friction material, and the interior layer 126 including the deformable, high friction material. The exterior layer 124 forms at least a portion of the ski-underside surface 136.

In one example, the skid-underside surface 134 includes the high friction surface.

In one example, the ski 112 includes a material configured to deform elastically in response to a first stress less than a yield strength of the material and to deform plastically in response to a second stress greater than the yield strength. As one example, the spring stiffness in bending of an aft portion of the ski 112 may be designed to soften the impact from landing on the ground (e.g., during a gears-up forced landing). The ski 112 may be designed to behave elastically up to a certain load, and then absorb energy by deforming plastically as the strains in the material of the ski 112 exceed the yield stress of the material. This approach may be beneficial for materials with large plastic strain to failure, such as with many metals (e.g., aluminum, titanium, steel, etc.).

Referring to FIG. 37, in one example, the emergency landing stability system 100 includes a pair of spaced apart and approximately parallel skis 112 deployable from the fuselage-underside surface 1228 of the fuselage 1216 (aircraft 1200). The pair of skis 112 locates the secondary contact surface 104 of the aircraft 1200 forward of the center of gravity CG of the aircraft 1200 to mitigate the nose-down pitching moment $M_1$ of the aircraft 1200 created in response to contact with the landing surface 1000 during the emergency landing.

Figure 39:
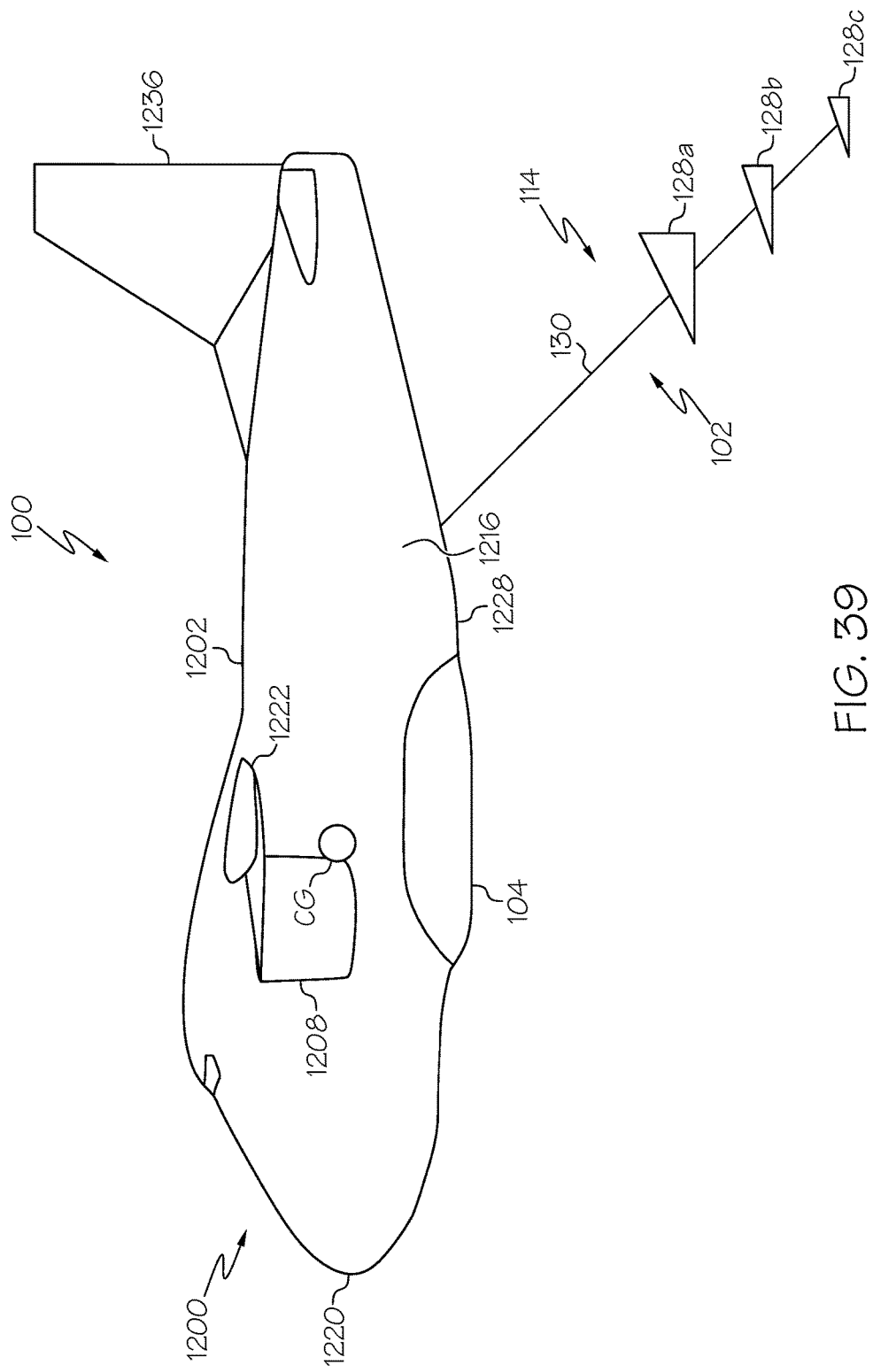
FIG. 39 is a schematic side elevation view of another example of the disclosed landing stability apparatus.
Figure 40:
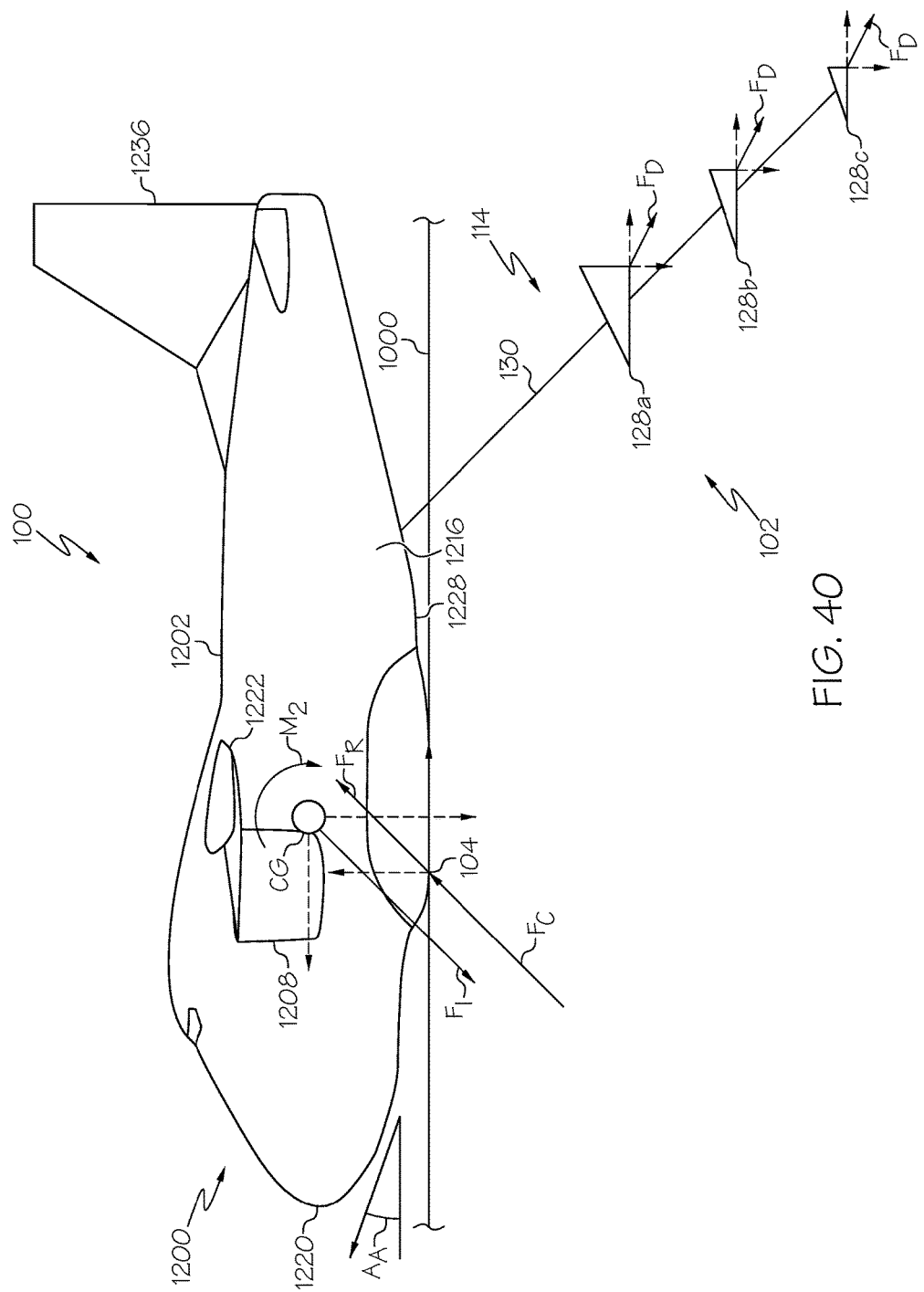
FIG. 40 is a schematic side elevation view of the landing stability apparatus of FIG. 39 illustrating the aircraft making an emergency landing.

Referring to FIGS. 39 and 40, and with reference to FIGS. 3 and 9, in one example, the emergency landing stability system 100 includes the aircraft 1200 including the fuselage 1216 and the landing gear 1218. The emergency landing stability system 100 also includes the drag device 114 deployable from the fuselage 1216 (aircraft 1200) aft of the center of gravity CG of the aircraft 1200. The drag device 114 produces (is configured to produce) a hydrodynamic drag (e.g., the hydrodynamic force $F_D$) sufficient to create the nose-up pitching moment $M_2$ to mitigate the nose-down pitching moment $M_1$ of the aircraft created in response to contact with the landing surface 1000 during the emergency landing.

Referring to FIG. 40, the drag device 114 being connected proximate to an aft portion of the fuselage 1216 may improve the pitch controllability in the event of the ditching water landing. The drag device 114 may be shaped such the hydrodynamic lift acts downward. The component of this downward force and the component of drag result in the hydrodynamic force $F_D$ that is in the aft direction, and declined downward. The resultant hydrodynamic force $F_D$ may pass through the aircraft 1200 aft of the center of gravity CG, which may result in the nose-up pitching moment $M_2$ being applied to the aircraft 1200. The nose-up pitching moment $M_2$ counteracts the nose-down pitching moment $M_1$ caused by the reaction force $F_R$ (e.g., at the secondary contact surface 104) and the inertial force $F_I$ of the aircraft 1200 acting through the center of gravity CG.

In one example, the hydrodynamic drag is sufficient to decelerate the aircraft 1200.

In one example, the drag device 114 includes the hydrodynamic drag element 128, and the tension cable 130 interconnecting the hydrodynamic drag element 128 to the fuselage 1216 (aircraft 1200).

Figure 42:
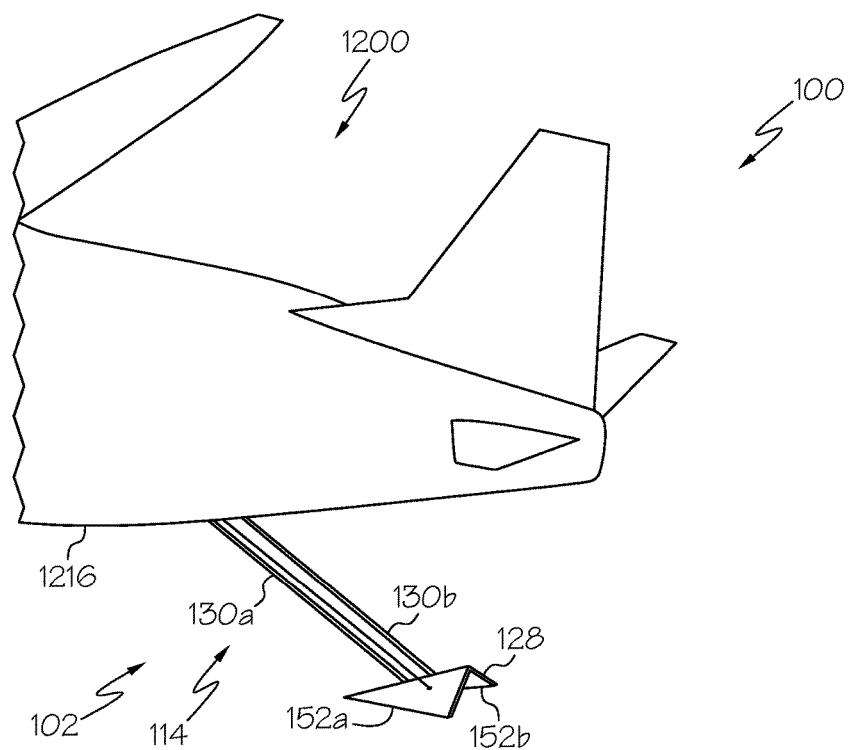
FIG. 42 is a partial schematic back and side view of another example of the disclosed landing stability apparatus.

Referring to FIG. 42, and with reference to FIGS. 39 and 40, in one example, the hydrodynamic drag element 128 includes a shape configured to produce a hydrodynamic force acting downwardly. In one example, the hydrodynamic drag element 128 includes an inverted V-shape. The hydrodynamic drag element 128 may include a first (e.g., left) triangular member 152a and a second (e.g., right) triangular member 152b. The first triangular member 152a and the second triangular member 152b may be disposed at a non-zero angle relative to each other to form a plow. The inverted V-shape may be designed to maintain a stable angle of attack in the water. Other shapes and configurations of the drag device 114 (of the hydrodynamic drag element 128) are also contemplated.

Referring to FIG. 39, in one example, the hydrodynamic drag element 128 includes a plurality of hydrodynamic drag elements 128 connected to the fuselage 1216 (aircraft 1200) by the tension cable 130. Each one of the plurality of hydrodynamic drag elements 128 may be identified individually as a first hydrodynamic drag element 128a, a second hydrodynamic drag element 128b, a third hydrodynamic drag element 128c, a fourth hydrodynamic drag element, etc.

Referring to FIG. 40, and with reference to FIG. 39, in one example, each one of the plurality of hydrodynamic drag elements 128 includes a different size. In one example, each outwardly successive one of the plurality of hydrodynamic drag members includes a shape configured to produce less hydrodynamic drag (e.g., a smaller hydrodynamic force $F_D$) (FIG. 40) than an inwardly adjacent one of the plurality of hydrodynamic drag members 128.

The plurality of hydrodynamic drag elements 128 may provide the hydrodynamic forces $F_D$ that are transmitted by the tension cables 130 into the aft portion of the aircraft 1200.

The sizes and/or shapes of the hydrodynamic drag elements 128 may be identical or may be different. For example, an uppermost (e.g., main) hydrodynamic drag element 128 may be larger than other lower hydrodynamic drag elements 128, and may be designed to provide primarily down force and not as much drag. A lowermost hydrodynamic drag element 128 may be designed to provide primarily drag, but sized small enough so that the force applied to the aircraft 1200 is moderate, and not enough to cause the aircraft 1200 to stall.

The lower hydrodynamic drag element 128c may be smaller than the middle hydrodynamic drag element 128b. The lower hydrodynamic drag element 128c may make contact with the water first. The hydrodynamic force $F_D$ from the lower hydrodynamic drag element 128c may be transmitted through the tension cable 130. The hydrodynamic force $F_D$ from the lower hydrodynamic drag element 128c may also provides moment restraint that may assist stabilize the angle of attack of the middle hydrodynamic drag element 128b. The middle hydrodynamic drag element 128b may be larger than the lower hydrodynamic drag element 128c. Similarly, the combined hydrodynamic forces $F_D$ of the middle hydrodynamic drag element 128b and the lower hydrodynamic drag element 128c may stabilize the upper hydrodynamic drag element 128a. The upper hydrodynamic drag element 128a may be larger than the middle hydrodynamic drag element 128b and the lower hydrodynamic drag element 128c.

One advantage to using the drag device 114 with multiple hydrodynamic drag element 128 may be that the drag force can be applied in increments as the aircraft 1200 approaches the water. The lower hydrodynamic drag element 128c may be sized to provide some drag force that slows the aircraft 1200, but not to a speed less than the stall speed. The middle hydrodynamic drag element 128b may slow the speed further. Finally, the upper hydrodynamic drag element 128a may slow the speed of the aircraft 1200 to a speed less than the stall speed. However at this point, the elevation of the aircraft 1200 above the water is small enough that it does not have far to fall after it has lost lift after stalling.

Referring to FIG. 42, and with reference to FIG. 39, in one example, the drag device 114 also includes a plurality of tension cables 130 connecting the hydrodynamic drag element 128 to the fuselage 1216 (aircraft 1200). At least one of the plurality of tension cables 130 is located aft of at least another one of the plurality of tension cables 130. Each one of the plurality of tension cables 130 may be identified individually as a first tension cable 130a, a second tension cable 130b, a third tension cable, etc. (FIG. 42).

A single tension cable 130 extending from the aft portion of the fuselage 1216 may provides a significant nose-up pitching moment $M_2$ to counteract the nose-down pitching moment $M_1$ caused by the reaction force $F_R$ and the inertial force $F_I$. Additional tension cables 130 may provide an additional nose-up pitching moment $M_2$.

Referring to FIG. 3, in one example, the emergency landing stability system 100 also includes a controller 146 configured to deploy the drag device 114 in response to at least one of a predetermined speed of the aircraft 1200 and a predetermined proximity of the aircraft 1200 to the landing surface 1000.

Referring to FIG. 3, in one example, the emergency landing stability system 100 also includes at least one proximity sensor 148 electronically coupled to the controller 146. The proximity sensor 148 determines (is configured to determine) a proximity of the aircraft 1200 relative to the landing surface 1000.

For the drag device 114 having a single hydrodynamic drag element 128, the timing of the deployment of the hydrodynamic drag device 114 may be important. For this reason, the proximity sensors 148 may be used to govern when the drag device 114 is deployed. Thus, as one example, the hydrodynamic drag device 114 may be an active emergency landing stability system 100.

For the drag device 114 having multiple hydrodynamic drag elements 128, deployment may not be governed by proximity to the landing surface 1000. The lengths of the tension cables 130 between adjacent hydrodynamic drag elements 128 may be designed such that they will function as a proximity device. The lengths may also be designed so that the hydrodynamic drag elements 128 engage at the correct time or proximity to the landing surface 1000.

In addition, if the aircraft 1200 is approaching the landing surface 1000 too fast, the lower hydrodynamic drag element 128c may be designed to provide more drag and less down force so that it slows the aircraft 1200.

In other embodiments, the disclosed landing stability system 100 includes the landing stability apparatus 102 (e.g., landing stability structure) having shapes or taking forms different from those explicitly illustrated herein. As one example, the landing stability apparatus 102 includes a rigid structure or protrusion projecting downwardly from the fuselage-underside surface 1228 of the fuselage 1216 (or the aircraft 1200). In such examples, the secondary contact surface 104 is located on the structure, for example, on a forward surface, an underside surface or a combination of the forward surface and the underside surface of the structure. The structure may project or protrude from the fuselage-underside surface 1228 proximate to the nose 1220 of the fuselage 1216 and, thus, locating the secondary contact surface 104 sufficiently forward (by distance $D_3$) of the center of gravity CG of the aircraft 1200 to mitigate (e.g., counter and/or overcome) the nose-down pitching moment $M_1$.

In one example, the structure includes a root connected to the fuselage-underside surface 1228 of the fuselage 1216 and terminating at a lower end or edge. As one example, the dimensions at the root of the structure are greater than the dimensions at the end of the structure. For example, the cross-sectional shape of the structure may progressively decrease from the root to the lower end. In one example, the structure may include a triangular-shaped profile shape and/or a wedge-shaped cross-sectional shape. Other shapes (profile shape and/or cross-sectional shapes) are also contemplated.

For example, a cross-sectional shape of the structure may vary from the root to the end of the structure. As one example, the structure may have an approximately elliptical cross-sectional shape having a large radius at a forward end defined by the major axis and a dimension along a minor axis proximate to (e.g., at or near) the root. The structure may have an approximately elliptical cross-sectional shape having progressively smaller radiuses at the forward end defined by the major axis and progressively smaller dimensions along the minor axis as the structure extends from the root to the lower end.

In still other embodiments, such a structure may also be combined with the sponsons 106 or the blister 108.

Although various examples of the disclosed system and apparatus have been shown and described, modifications may occur to those skilled in the art upon reading the specification. The present application includes such modifications and is limited only by the scope of the claims.

What is claimed is:

1. An aircraft comprising:
a fuselage, comprising a nose; and
a pair of sponsons projected from said fuselage; and wherein:
each one of said sponsons comprises a forward portion and an aft portion;
said forward portion is located forward of a center of gravity of said aircraft;
said aft portion is located aft of said center of gravity of said aircraft; and
during an emergency landing, said sponsons locate an initial contact surface of said aircraft on said aft portion of said sponsons and locate a secondary contact surface of said aircraft on said forward portion of said sponsons so that said forward portion of said sponsons contacts a landing surface to mitigate a nose-down pitching moment of said aircraft, created in response to contact of said aft portion of said sponsons with said landing surface, and to mitigate impact between said nose of said fuselage and said landing surface.

2. The aircraft of claim 1 wherein, during said emergency landing, said sponsons locate said secondary contact surface of said aircraft a sufficient distance forward of said center of gravity of said aircraft to create a nose-up pitching moment.

3. The aircraft of claim 1 wherein, during said emergency landing, said sponsons locate said secondary contact surface a sufficient distance forward of said center of gravity such that a reaction force passes forward of said center of gravity.

4. The aircraft of claim 1 wherein each one of said pair of sponsons project downwardly and outwardly from a fuselage-underside surface of said fuselage.

5. The aircraft of claim 1 further comprising a blister projecting downwardly from a fuselage-underside surface of said fuselage forward of said sponsons and proximate to said nose of said fuselage.

6. The aircraft of claim 1 further comprising at least one skid deployable from a fuselage-underside surface of said fuselage forward of said sponsons.

7. The aircraft of claim 1 further comprising at least one ski deployable from a fuselage-underside surface of said fuselage forward of said sponsons.

8. The aircraft of claim 1 wherein said sponsons locate said secondary contact surface so that a reaction force is applied to said forward portion of each one of said sponsons to counter said nose-down pitching moment created during said emergency landing to prevent impact between said nose of said aircraft and said landing surface.

9. The aircraft of claim 1 further comprising a drag device deployable from said fuselage, aft of said center of gravity of said aircraft, wherein said drag device produces a hydrodynamic drag sufficient to create a nose-up pitching moment.

10. The aircraft of claim 1 further comprising at least one skid deployable from said forward portion of each one of said sponsons, wherein said secondary contact surface is located on said skid.

11. The aircraft of claim 1 further comprising at least one ski deployable from said forward portion of each one of said sponsons, wherein said secondary contact surface is located on said ski.

12. An aircraft emergency landing stability system comprising:
an aircraft comprising a fuselage, comprising a nose and a fuselage-underside surface; and
a pair of sponsons projecting downwardly and outwardly from said fuselage-underside surface of said fuselage; and wherein:
each one of said sponsons comprises a forward portion and an aft portion;
at least a potion of said forward portion is located forward of a center of gravity of said aircraft;
at least a portion of said aft portion is located aft of said center of gravity of said aircraft; and
during an emergency landing, said pair of sponsons locates an initial contact surface of said aircraft on said aft portion of said pair of sponsons and locates a secondary contact surface of said aircraft on said forward portion of said pair of sponsons so that said forward portion of said pair of sponsons contacts a landing surface to mitigate a nose-down pitching moment of said aircraft, created in response to contact of said aft portion of said pair of sponsons with said landing surface during an emergency landing, and to mitigate impact between said nose of said fuselage and said landing surface.

13. The system of claim 12 wherein, during said emergency landing, said pair of sponsons locates said secondary contact surface a sufficient distance forward of said center of gravity such that a reaction force passes forward of said center of gravity.

14. The system of claim 12 wherein:
said aircraft further comprises a pair of nose landing gear; and
said forward portion of each one of said pair of sponsons accommodates one of said pair of nose landing gear.

15. The system of claim 12 wherein:
said forward portion of each one of said pair of sponsons comprises a forward portion-underside surface;
during said emergency landing, said secondary contact surface is located on said forward portion-underside surface; and
said forward portion-underside surface is structurally reinforced to withstand a contact force applied to said forward portion in response to contact with said landing surface.

16. The system of claim 15 wherein:
said forward portion of each one of said pair of sponsons comprises at least one sponson-underside skin panel, said sponson-underside skin panel comprising:
an exterior layer comprising a non-deformable, low friction material; and
an interior layer comprising a deformable, high friction material; and said exterior layer forms at least a portion of said forward portion-underside surface.

17. The system of claim 12 further comprising a skid deployable from said forward portion of each one of said pair of sponsons, wherein said secondary contact surface is located on said skid.

18. The system of claim 12 further comprising a ski deployable from said forward portion of each one of said pair of sponsons, wherein said secondary contact surface is located on said ski.

19. The system of claim 12 further comprising:
at least one hydrodynamic drag element; and
at least one tension cable interconnecting said hydrodynamic drag element to said fuselage,
wherein said hydrodynamic drag element comprises a shape configured to produce a hydrodynamic force acting downwardly sufficient to create a nose-up pitching moment.

20. The system of claim 12 wherein:
each one of said pair of sponsons defines an interior volume; and
said interior volume is sufficient to accommodate at least one cargo container.

21. The system of claim 12 further comprising a blister projecting downwardly from a fuselage-underside surface of said fuselage forward of said sponsons and proximate to said nose of said fuselage.

22. The system of claim 12 further comprising at least one skid deployable from a fuselage-underside surface of said fuselage forward of said sponsons.

23. The system of claim 12 further comprising at least one ski deployable from a fuselage-underside surface of said fuselage forward of said sponsons.

* * * * *